US012536349B2

(12) United States Patent
Watanabe

(10) Patent No.: US 12,536,349 B2
(45) Date of Patent: Jan. 27, 2026

(54) INFORMATION PROCESSING SYSTEM, INFORMATION PROCESSING APPARATUS, AND NON-TRANSITORY COMPUTER-READABLE STORAGE MEDIUM

(71) Applicant: FUJITSU LIMITED, Kawasaki (JP)

(72) Inventor: Yasuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1281 days.

(21) Appl. No.: 17/235,979

(22) Filed: Apr. 21, 2021

(65) Prior Publication Data
US 2021/0406422 A1    Dec. 30, 2021

(30) Foreign Application Priority Data

Jun. 25, 2020  (JP) .................................. 2020-109613

(51) Int. Cl.
*G06F 119/06*    (2020.01)
*G06F 30/20*    (2020.01)
*G06N 7/08*    (2006.01)

(52) U.S. Cl.
CPC ............... *G06F 30/20* (2020.01); *G06N 7/08* (2013.01); *G06F 2119/06* (2020.01)

(58) Field of Classification Search
CPC ...... G06F 30/20; G06F 2119/06; G06F 17/11; G06F 9/5027; G06N 7/08; G06N 3/044; G06N 5/01
See application file for complete search history.

(56) References Cited

U.S. PATENT DOCUMENTS 10,776,879 B1 * 9/2020 Floyd ...................... G06F 16/27
2015/0278408 A1 * 10/2015 Yoshimura ............... G06N 7/01
(Continued)

FOREIGN PATENT DOCUMENTS

JP    2019-179364 A    10/2019
JP    2020-004387 A    1/2020
(Continued)

OTHER PUBLICATIONS

Liu, Xiaoyuan et al., "On Modeling Local Search with Special-Purpose Combinatorial Optimization Hardware", Library Cornell University Ithaca, Jan. 27, 2020, pp. 1-24, XP055821555, Retrieved from the Internet:URL:https://arxiv.org/pdf/1911.09810v2.pdf[retrieved on Jul. 6, 2021].
(Continued)

*Primary Examiner* — Rehana Perveen
*Assistant Examiner* — Cuong V Luu
(74) *Attorney, Agent, or Firm* — Fujitsu Intellectual Property Center

(57) ABSTRACT

An information processing system searching for a solution to a problem represented by an energy function including a plurality of state variables, the information processing system includes a first node and second node. The first node searches for a first partial solution represented by a first state variable group, among the plurality of state variables, corresponding to a first subproblem assigned to the first node, the first subproblem being generated by dividing the problem. The first node holds a plurality of first solutions including a first solution corresponding to the problem, the first solution reflecting the first partial solution, and transmits one or more first solution among the plurality of first solutions. The second node updates, based on one or more first solution received from the first node, at least part of a plurality of second solution held in the second node.

17 Claims, 31 Drawing Sheets

(56) References Cited

U.S. PATENT DOCUMENTS

2016/0063391 A1* 3/2016 Hayashi ................. G06N 7/01
706/11
2018/0247691 A1 8/2018 Hitachi

FOREIGN PATENT DOCUMENTS

JP        2020156191 A * 9/2020
WO    2017/033326 A1    3/2017

OTHER PUBLICATIONS

Ushijima-Mwesigwa, Hayato et al., "Multilevel Combinatorial Optimization Across Quantum Architectures", arxiv.org, Cornell University Library, 201 Olin Library Cornell University Ithaca, NY 14853, Jun. 3, 2020, pp. 1-28, XP081680517.

Extended European Search Report dated Oct. 15, 2021 for corresponding European Patent Application No. 21169840.2, 8 pages.

European Office Action dated Jan. 9, 2025 for corresponding European Patent Application No. 21169840.2, 6 pages.

Chinese Office Action mailed Jun. 3, 2025 for corresponding Japanese Patent Application No. 202110517374.0, with English Translation, 17 pages.

Chinese Office Action issued Sep. 8, 2025 for corresponding Chinese Patent Application No. 202110517374.0, 15 pages, with English Translation.

* cited by examiner

FIG. 8

| # | SOLUTION | | | | ENERGY VALUE |
|---|---|---|---|---|---|
| 0 | X0_0 | X1_0 | X2_0 | X3_0 | E0 |
| 1 | X0_1 | X1_1 | X2_1 | X3_1 | E1 |
| 2 | X0_2 | X1_2 | X2_2 | X3_2 | E2 |
| 3 | X0_3 | X1_3 | X2_3 | X3_3 | E3 |

SOLUTION BUFFER — 130

INFORMATION PROCESSING SYSTEM, INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-109613, filed on Jun. 25, 2020, the entire contents of which are incorporated herein by reference.

FIELD

The embodiments discussed herein are related to an information processing system, an information processing apparatus, and a non-transitory computer-readable storage medium.

BACKGROUND

There is an information processing apparatus that performs calculation by replacing a multivariable combinatorial optimization problem that is difficult to handle with a Neumann computer with an Ising model, which is a model representing a behavior of a spin of a magnetic substance. As a method for solving the problem replaced with the Ising model in a practical time, there are various search algorithms such as simulated annealing (SA) and simulated quantum annealing (SQA). The combinatorial optimization problem is formulated by an energy function including a plurality of state variables. The energy function may also be referred to as an objective function, an evaluation function, or the like. The information processing apparatus uses the search algorithm to search for the ground state of the Ising model with which the value of the energy function is minimized. The ground state corresponds to the optimal solution of the combinatorial optimization problem.

A problem represented by an energy function may be solved with the problem divided into a plurality of subproblems in accordance with the reflecting the first partial solution, and transmit one or more first solution among the plurality of first solutions; and a second node configured to: receive the one or more first solution from the first node, and update, based on the one or more first solution, at least part of a plurality of second solution held in the second node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of information held in a solution buffer;

DESCRIPTION OF EMBODIMENTS

In the related art, the problem may be divided into a plurality of subproblems to be solved. For a relatively large scale problem, solution search may take some time, and thus the solution finding performance may be compromised. The proposed approaches in the related art have not sufficiently offered improvement of the solution finding performance relative to an increase in the scale of the problem.

An object of an aspect of the present invention is to provide an information processing system, an information processing method, and a program that improve solution finding performance.

Hereinafter, the embodiments will be described with reference to the drawings.

First Embodiment

A first embodiment will be described.

Figure 1:
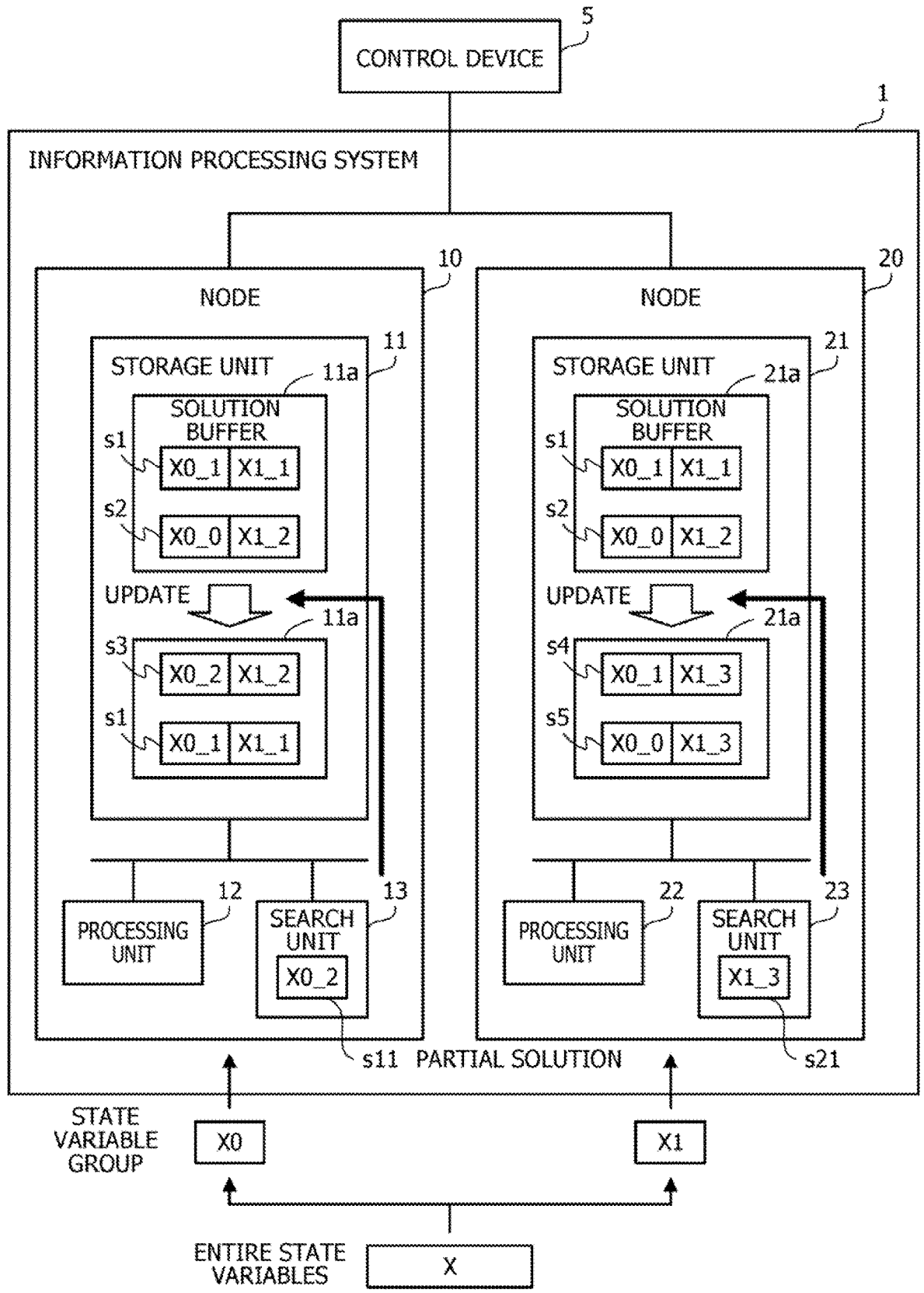
FIG. 1 is a first diagram illustrating an information processing system according to a first embodiment.

FIG. 1 is a first diagram illustrating an information processing system according to the first embodiment.

An information processing system 1 obtains a solution to a problem represented by an energy function of an Ising model, and outputs the obtained solution. The problem represented by the energy function of the Ising model includes a combinatorial optimization problem.

The energy function includes a plurality of state variables corresponding to a plurality of spins included in the Ising model. The state variables are binary variables each taking a value of 1 or 0. The solution is represented by a plurality of state variables. The combinatorial optimization problem is converted into a problem which obtain a solution minimizing the value of the energy function. The solution minimizing the value of the energy function corresponds to a ground state of the Ising model, and corresponds to an optimal solution to the combinatorial optimization problem.

The information processing system 1 includes a plurality of nodes. The information processing system 1 divides the problem represented by the energy function into a plurality of subproblems, and processes the plurality of subproblems in a distributed manner by the plurality of nodes. The information processing system 1 may be implemented by a single housing having a plurality of nodes coupled to an internal bus, or may be implemented by a plurality of nodes coupled to a network such as a local area network (LAN), a wide area network (WAN), or the Internet.

In the example illustrated in FIG. 1, the information processing system 1 includes nodes 10 and 20. The number of nodes of the information processing system 1 may be three or more. In one example, the problem is divided into two subproblems which are a first subproblem and a second subproblem. The first subproblem is assigned to the node 10, and the second subproblem is assigned to the node 20. As described later, two or more subproblems may be assigned to one node.

The energy of the Ising model of the entire problem is defined by, for example, an energy function E(x) in Equation (1).

[Equation 1]

$$E(x) = -\sum_{(i,j)} W_{ij} x_i x_j - \sum_{i=1}^{N} b_i x_i + c \qquad (1)$$

A state vector x has a plurality of state variables as elements, and represents a state of an Ising model. In the case of a problem of maximizing the value of the energy function, a sign of the energy function may be reversed.

The first term on the right side of Equation (1) represents the products of two state variable values and weight coefficients without missing and overlapping among all combinations of two state variables selectable from N state variables included in the Ising model. $x_i$ is an i-th state variable. $x_j$ is a j-th state variable. Wo is a weight coefficient indicating the weight (for example, the strength of binding) between the i-th state variable and the j-th state variable. $W_{ii}=0$. $W_{ij}=W_{ji}$.

The second term on the right side of Equation (1) is a sum of products of values of state variables and respective bias coefficients of all the state variables. $b_i$ indicates a bias coefficient for the i-th state variable. c is a constant.

For example, "−1" of a spin in the Ising model corresponds to a value "0" of the state variable. "+1" of a spin in the Ising model corresponds to a value "1" of the state variable. Thus, the state variable may also be referred to as a bit taking a value of 0 or 1.

A combination of the values of the state variables that minimizes the value of the energy function of Equation (1) is the optimal solution to the problem. The value of the energy function may be simply referred to as an energy value.

The energy of the Ising model regarding a subproblem handling the state variables i=1 to K (K<N), which are a part of N (N is an integer equal to or larger than 2) state variables, is defined by, for example, an energy function E'(x) in the following Equation (2).

[Equation 2]

$$E'(x) = -\sum_{(i,j)}^{K} W_{ij} x_i x_j - \sum_{i=1}^{K} b'_i x_i + c' \qquad (2)$$

$b'_i$ and c' in Equation (2) may be respectively represented by Equations (3) and (4).

[Equation 3]

$$b'_i = b_i + \sum_{j=K+1}^{N} W_{ij} x_j \qquad (3)$$

[Equation 4]

$$c' = c - \sum_{i=K+1}^{N} b_i x_i - \sum_{i=K+1}^{N} \sum_{j>i}^{N} W_{ij} x_i x_j \qquad (4)$$

When searching for a solution to the subproblem handling the state variables i=1 to K (K<N), the values of the state variables i=K+1 to N are fixed. The second term on the right side of Equation (3) represents a contribution to the bias coefficient by the state variables set to be the fixed values, and the second term and the third term on the right side of Equation (4) represent contributions to the constant by the state variables set to be the fixed values.

For example, for n (n is an integer equal to or larger than 2) subproblems, N state variables are divided into n subsets each containing K state variables. For example, a set of K=N/n state variables, for example, a state variable group corresponds to one subproblem. The entire state variables are represented as X. For example, a state variable group X0 in the entire state variables X corresponds to the above-described first subproblem. The state variable group X0

Includes state variables $x_1$ to $x_K$. A state variable group X1 in the entire state variables X corresponds to the second subproblem. The state variable group X1 includes state variables $x_{K+1}$ to $x_N$.

For example, the information processing system 1 is connected to a control device 5. Based on information on the combinatorial optimization problem input by a user, the control device 5 formulates the combinatorial optimization problem by an energy function of the Ising model. The control device 5 divides the problem represented by the energy function into a plurality of subproblems, and assigns the plurality of subproblems to the nodes 10 and 20. The control device 5 may be included in the information processing system 1. Any of the nodes 10 and 20 may have the function of the control device 5.

The node 10 includes a storage unit 11, a processing unit 12, and a search unit 13. The node 20 includes a storage unit 21, a processing unit 22, and a search unit 23.

The storage units 11 and 21 may be a volatile storage device such as a dynamic random-access memory (DRAM), and may be a nonvolatile storage device such as a hard disk drive (HDD) or a flash memory.

The processing units 12 and 22 may include a central processing unit (CPU), a digital signal processor (DSP), an application-specific integrated circuit (ASIC), a field-programmable gate array (FPGA), or the like. The processing unit 12 may be a processor configured to execute a program. The "processor" may include a set (multiprocessor) of a plurality of processors.

The search units 13 and 23 each search for a solution to the subproblem assigned to the corresponding node. For example, the search units 13 and 23 are implemented by dedicated hardware. For example, a search circuit implemented by using an integrated circuit such as an FPGA may function as the search unit 13 or the search unit 23. At least one of the search units 13 and 23 may be Implemented by a processor executing a predetermined program. Examples of a search method used by the search units 13 and 23 include SA, genetic algorithms (GA), SQA, tabu search, and the like. The search method is not limited to these, and other search methods may be used. The search units 13 and 23 may use the same search method or different search methods.

A solution to a subproblem is referred to as "partial solution". The partial solution is represented by a state variable group corresponding to the subproblem. For example, the partial solution corresponding to the first subproblem is a set of values of the state variables $x_1$ to $x_K$ belonging to the state variable group X0. The partial solution corresponding to the second subproblem is a set of values of the state variables $x_{K+1}$ to $x_N$ belonging to the state variable group X1.

Although not illustrated, the search unit 13 includes a storage unit such as a static random-access memory (SRAM) that stores the state variable group X0, a weight coefficient between the state variables belonging to the state variable group X0, and the like. Similarly, the search unit 23 includes a storage unit that stores the state variable group X1, a weight coefficient between the state variables belonging to the state variable group X1, and the like. The information stored in the respective storage units of the search units 13 and 23 is used by the respective search units 13 and 23 to search for solutions to subproblems.

The search for the partial solution by each of the search units 13 and 23 is repeatedly executed, for example, for a predetermined period, and the partial solution obtained by each search is output. As described later, the information on the subproblem in each of the search units 13 and 23 is changed immediately before the search for the next partial solution starts. The information on the subproblem includes information on a state variable group, in the entire state variables, that has a fixed value and is other than the state variable group handled by the corresponding node. Examples of such information include b', c', and the like in the energy function E'(x) in Equation (2) described above.

The storage unit 11 stores information used for processing by the processing unit 12. The storage unit 11 stores weight coefficients. The weight coefficients stored in the storage unit 11 may be $W_{i1}$ to $W_{iK}$ ($1 \leq i \leq N$). For example, the storage unit 11 may store N×K weight coefficients among N×N weight coefficients. The weight coefficients are used for calculating an energy value corresponding to a solution or changing information on a subproblem.

The storage unit 11 includes a solution buffer 11a. The solution buffer 11a stores a solution selected based on the energy function E(x) for the entire problem represented by Equation (1). The solution stored in the solution buffer 11a may be referred to as a "complete solution". The solution buffer 11a holds a plurality of solutions. The number of solutions held in the solution buffer 11a is a predetermined number set in advance to the node 10. As an example, the solution buffer 11a holds two solutions. Although not illustrated in FIG. 1, the energy value of Equation (1), corresponding to a solution, is held in the solution buffer 11a in association with the solution.

The processing unit 12 updates the solution held in the solution buffer 11a. The processing unit 12 executes, for example, the following processing.

First processing is for updating the solution held in the solution buffer 11a based on the partial solution acquired as a result of the search by the search unit 13.

Second processing is for transmitting the solution held in the solution buffer 11a to the node 20.

Third processing is for updating the solution held in the solution buffer 11a based on the solution received from the node 20.

As described later, the processing unit 12 also changes information on a subproblem set to the search unit 13 based on the solution held in the solution buffer 11a.

FIG. 1 illustrates an example of the first processing.

The solution buffer 11a stores, for example, solutions s1 and s2 as results of the search by the nodes 10 and 20. The search for obtaining the solutions s1 and s2 is performed with a method that is similar to the one described later. For example, in the initial stage, no solution is stored in the solution buffer 11a. A solution reflecting the partial solution, as a result of the first search by the search unit 13 with an initial solution given in advance being a starting point, is stored in the solution buffer 11a. The following processing is then executed.

A set of values of each state variable in a certain state variable group is identified with a sign representing the state variable group, such as X0, combined with an underscore "_" and a number (for example, "X0_1"). The solution s1 is "X0_1, X1_1". The solution s2 is "X0_0, X1_2".

In one example, upon acquiring a partial solution s1 obtained by the search unit 13, the processing unit 12 updates the solution buffer 11a based on the partial solution s11 as follows. The partial solution s11 is "X0_2". The processing unit 12 generates a solution candidate by replacing a part of the state variable group X0 for each of the solutions s1 and s2 with the partial solution s11. The solution candidate is a solution serving as a candidate to replace a solution in the solution buffer 11a. For example, the processing unit 12 generates a first solution candidate "X0_2, X11_" for the solution s1 and generates a second solution candidate "X0_2, X1_2" for the solution s2.

The processing unit 12 updates a predetermined number of solutions held in the solution buffer 11a according to the value of the energy function E(x) of Equation (1) for each of the solutions s1 and s2, the first solution candidate, and the second solution candidate. For example, the processing unit 12 stores, in the storage unit 11, a predetermined number of solutions in ascending order of energy values and discards the other solution(s). The energy value corresponding to each of the first solution candidate and the second solution candidate may be calculated based on the weight coefficients stored in the storage unit 11 and the energy values stored in the storage unit 11 in association with each of the solutions s1 and s2.

For example, the solutions s1 and s2, the first solution candidate, and the second solution candidate are considered. These four solutions in ascending order of energy values will be the second solution candidate, the solution s1, the first solution candidate, and the solution s2. In this case, the processing unit 12 stores the second solution candidate and the solution s1 in the solution buffer 11a and discards the first solution candidate and the solution s2. A solution s3 stored in the solution buffer 11a as a result of the update corresponds to the second solution candidate "X0_2, X1_2" described above. In this case, the processing unit 12 also stores the energy value corresponding to the solution s3 in the solution buffer 11a in association with the solution s3.

The storage unit 21, the processing unit 22, and the search unit 23 respectively have the same functions as the storage unit 11, the processing unit 12, and the search unit 13.

The storage unit 21 includes a solution buffer 21a. The solution buffer 21a stores, for example, solutions s1 and s2 as results of the search by the nodes 10 and 20 so far.

The processing unit 22 acquires a partial solution s21 obtained by the search unit 23. The partial solution s21 is "X1_3". The processing unit 22 updates the solutions held in the solution buffer 21a to, for example, solutions s4 and s5 based on the partial solution s21, as with the case of the processing unit 12. The solution s4 is "X0_1, X1_3". The solution s5 is "X0_0, X1_3". The solution buffer 21a also stores energy values corresponding to the respective solutions s4 and s5.

The above-described method of updating the solution held in the solution buffer 11a based on the partial solution s11 is an example, and other methods may also be performed. For example, the processing unit 12 may make a predetermined number of solutions in ascending order of energy values, among the solutions s1 and s2 and solutions as combinations of the partial solution s11 and values of state variables in the state variable group X1 used for searching the partial solution s11, remain in the solution buffer 11a. The same applies to the processing unit 22.

The nodes 10 and 20 may asynchronously execute their processing.

Next, the second processing and the third processing mentioned above will be described.

Figure 2:
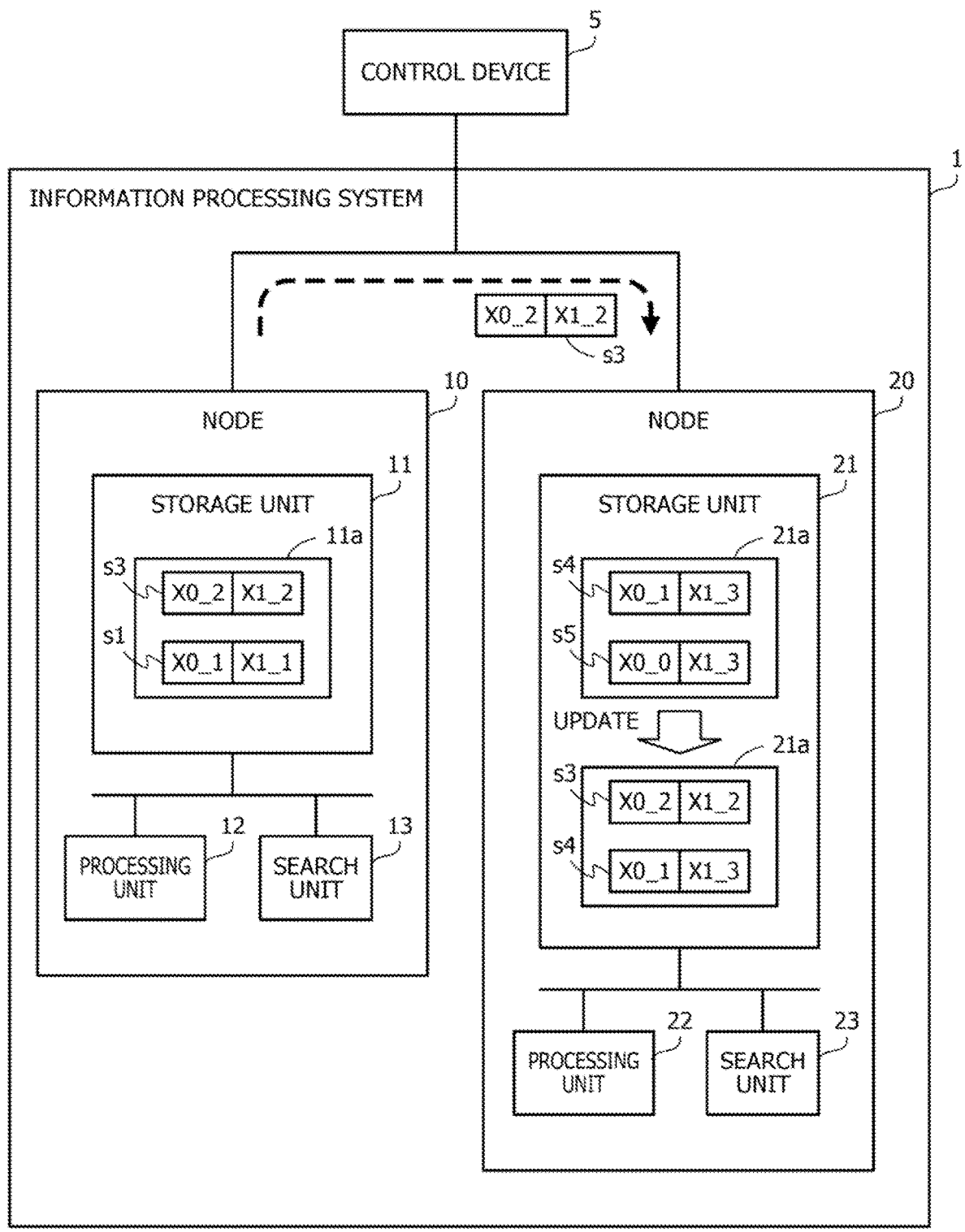
FIG. 2 is a second diagram illustrating the information processing system according to the first embodiment.

FIG. 2 is a second diagram Illustrating the information processing system according to the first embodiment.

The processing unit 12 transmits at least one solution of the plurality of solutions held in the solution buffer 11a, to the node 20. The timing of the transmission may be any timing. For example, the timing may be a fixed interval, or a timing after the solution in the solution buffer 11a has been updated based on the partial solution s11.

In one example, the processing unit 12 transmits the solution s3, which is one of the solutions s1 and s3 held in the solution buffer 11a, corresponding to the smallest energy value to the node 20 together with the energy value corresponding to the solution s3. When the solution buffer 11a holds p or more solutions (p is an Integer that is equal to or larger than 2), the processing unit 12 may transmit to the node 20, q solutions (q is an integer satisfying q<p) in ascending order of energy values, among the solutions included in the solution buffer 11a. This transmission of the solution by the processing unit 12 corresponds to the second processing executed by the processing unit 12.

The processing unit 22 updates the solution held in the solution buffer 21a based on the solution received from the node 10. For example, upon receiving the solution s3 and the energy value corresponding to the solution s3 from the node 10, the processing unit 22 makes two solutions in ascending order of energy values, among the solution s3 and the solutions s4 and s5 held in the solution buffer 21a, be held in the solution buffer 21a, and discards the other solution. The ascending order of energy values corresponding to the solutions s3, s4, and s5 is assumed to be the solutions s3, s4, and s5. In this case, the processing unit 22 stores the solutions s3 and s4 in the solution buffer 21a and discards the solution s5. The solution buffer 21a also stores energy values corresponding to the respective solutions s3 and s4. The update of the solution buffer 21a by the processing unit 22 corresponds to the third processing executed by the processing unit 22.

In this manner, a good solution obtained by the node 10, for example, a solution corresponding to a small energy value is shared between the nodes 10 and 20.

Similarly, the node 20 may transmit a solution to the node 10, to share a good solution obtained by the node 20 between the nodes 10 and 20.

For example, the processing unit 22 transmits at least one solution among the predetermined number of solutions held in the solution buffer 21a, to the node 10 at a predetermined timing. For example, the processing unit 22 transmits a solution corresponding to the smallest energy value, among a predetermined number of solutions held in the solution buffer 21a, to the node together with an energy value corresponding to the solution. This transmission of the solution by the processing unit 22 corresponds to the second processing executed by the processing unit 22.

The processing unit 12 updates the solution held in the solution buffer 11a based on the solution received from the node 20. For example, the processing unit 12 makes a predetermined number of solutions in ascending order of energy values, among a predetermined number of solutions held in the solution buffer 11a and the solution received from the node 20, be held in the solution buffer 11a, and discards the other solution(s). The update of the solution in the solution buffer 11a based on the solution received from the node by the processing unit 12 corresponds to the third processing executed by the processing unit 12.

In this manner, the good solution obtained by the node 20 may be shared by the nodes 10 and 20.

The transmission of a solution from the node 10 to the node 20 and the transmission of a solution from the node 20 to the node 10 may be synchronized or not synchronized.

In this manner, each of the nodes 10 and 20 updates the solution it holds based on the partial solution it found through the first processing described above and updates the solution it holds based on the solution held by the other node through the second and the third processing described above.

Each of the nodes 10 and 20 may change the Information on the subproblem in the node based on the solution in its solution buffer thus updated, and may search for the next partial solution.

For example, after the partial solution s11 has been obtained by the search unit 13 as illustrated in FIG. 1 and immediately before the next search is performed, the processing unit 12 determines a value of each state variable in the state variable group X1 for the next search based on the solutions s3 and s1 held in the solution buffer 11a and changes b' and c' in Equation (2). The processing unit 22 executes processing similar to that executed by the processing unit 12.

The processing unit 12 may determine the value of each state variable belonging to the state variable group X1 based on the solution held in the solution buffer 11a in various ways.

In one example, the processing unit 12 selects a solution corresponding to the smallest energy value obtained by Equation (1) among the plurality of solutions held in the solution buffer 11a, and uses the value of each state variable in the state variable group X1 for the selected solution.

Alternatively, the processing unit 12 may randomly select one solution of the plurality of solutions held in the solution buffer 11a, and use the value of each state variable in the state variable group X1 for the selected solution. In this case, when the solution buffer 11a holds three or more solutions, the processing unit 12 may randomly select the one solution of k solutions (k is about two or three for example) in ascending order of energy values. Alternatively, the processing unit 12 may perform comparison among the values of the state variables in the state variable groups X1 for the plurality of respective solutions held in the solution buffer 11a, select a solution with the largest number of state variables the values of which matching those in the other solutions, and use the value of each state variable in the state variable group X1 for such a solution.

In this manner, the processing unit 12 determines the value of each state variable belonging to the state variable group X1 based on the solution held in the solution buffer 11a, and changes the information on the subproblem set to the search unit 13. For the state variable group X0, the search unit 13 starts the search for the next partial solution corresponding to the state variable group X0, with the current partial solution serving as the initial state.

As with the case of the processing unit 12, the processing unit 22 determines the value of each state variable belonging to the state variable group X0 based on the solution held in the solution buffer 21a, changes the information on the subproblem set to the search unit 23, and causes the search unit 23 to start the search for the next partial solution.

The nodes 10 and 20 repeatedly execute the above-described processing, and when a predetermined time elapses, output the solutions held in the respective solution buffers 11a and 21a, to the control device 5. The control device 5 converts the solution acquired from the nodes 10 and 20 into a form of a solution to the combinatorial optimization problem, and causes a display device to display the solution or transmits the solution to a terminal device used by the user via a network, to provide the solution to the user. For example, the control device 5 may provide the user with a solution corresponding to the smallest energy value acquired from the nodes 10 and 20, or may provide the user with a plurality of solutions acquired from the nodes 10 and 20.

In this manner, in the information processing system 1, each of the plurality of nodes searches for a partial solution represented by the state variable group corresponding to the subproblem assigned to the node among the plurality of state variables. Each of the plurality of nodes holds a plurality of solutions including the first solution to the problem, reflecting the partial solution. A first node among the plurality of nodes transmits at least one solution of the plurality of solutions held in the first node to a second node among the plurality of nodes. Based on the solution received from the first node, the second node updates at least part of the plurality of solutions held in the second node.

Thus, solution finding performance may be improved. For example, since a good solution found by the node 10 is shared with the node 20, the nodes 10 and 20 cooperate to improve the solutions, whereby the solution finding performance is improved. A good solution found by the node 20 may be shared with the node 10.

For example, in the information processing system 1, each of a plurality of nodes shares the best solution, among a plurality of solutions it has obtained, with another node, and determines a value of each state variable in a state variable group fixed in the next search by each node, based on the shared solution. An even better solution is estimated to be likely to be in the proximity of a better solution. Thus, with a good solution found by each node shared with another node and with the value of each state variable in the state variable group to be fixed based on the shared solution determined, the search space may be narrowed to the proximity of a better solution, whereby the chance of any of the nodes finding the optimal solution may be increased. For example, the chance of any of the plurality of nodes finding the optimal solution, or a solution corresponding to an energy value smaller than a predetermined target value within a predetermined period of time Increases. Thus, the solution finding performance of the information processing system 1 may be improved.

When the scale of the problem increases, all the subproblems may not be processable at once with the current number of nodes, due to limitation of a memory capacity of a single search unit usable for the search by each node.

For example, when the number of search units prepared in advance is insufficient for solving all the subproblems at once, one search unit may process several subproblems one by one, by switching the search target subproblem. In this case, for example, a plurality of weight coefficient groups corresponding to a plurality of subproblems to be processed are stored in an auxiliary storage device such as an HDD or a solid-state drive (SSD) provided to a node or the like, and the weight coefficient group corresponding to the subproblem that is the current search target is stored in a memory of the search unit. With this approach, the size of the weight coefficient stored in the memory for performing the search is reduced, but the switching of the subproblems involves switching of the weight coefficients between the memory and the auxiliary storage device. The switching of the weight coefficients takes time, and might be a cause of a delay.

In the information processing system 1, a plurality of nodes may asynchronously search for solutions to subproblems using different search methods. Therefore, when all the subproblems may not be processable at once with the current number of nodes, a node may be easily added. Thus, the information processing system 1 features high extensibility to handle an increase in the scale of the problem, and thus may easily Improve the solution finding performance.

Second Embodiment

Next, a second embodiment will be described.

Figure 3:
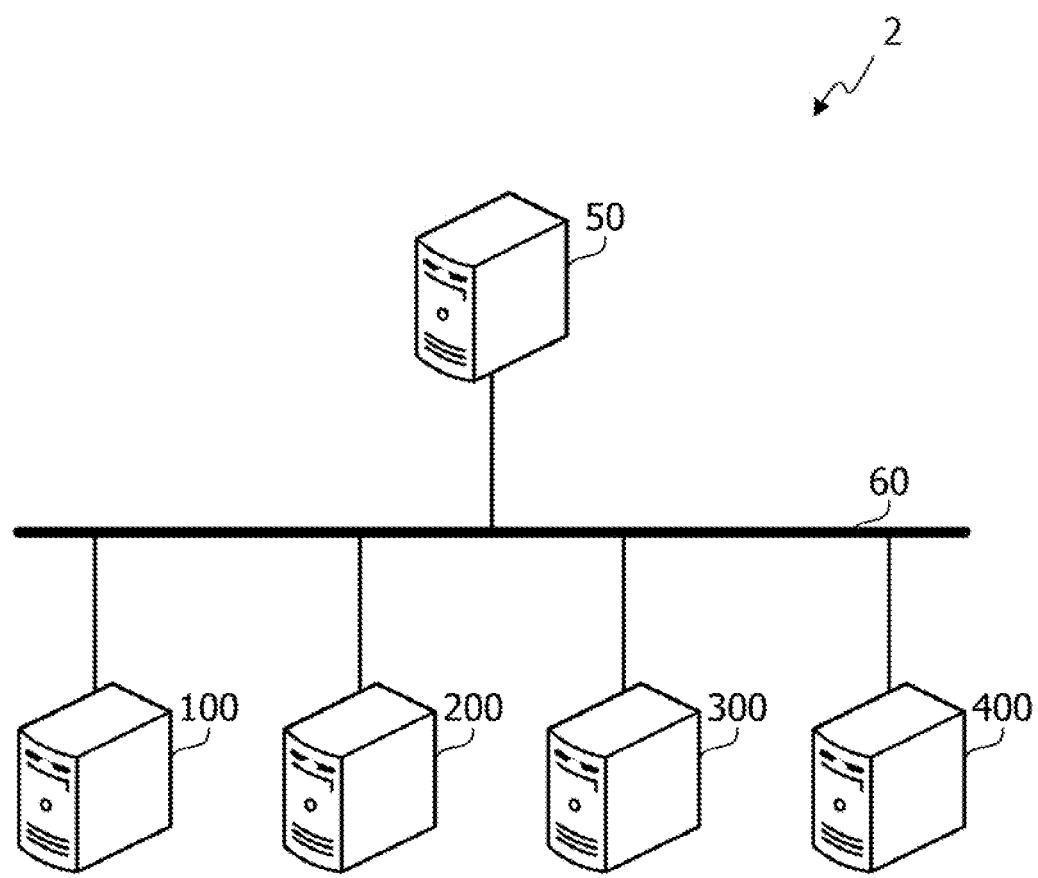
FIG. 3 is a diagram illustrating an example of an information processing system according to a second embodiment.

FIG. 3 is a diagram illustrating an example of an information processing system according to the second embodiment.

An information processing system 2 includes a control device 50 and nodes 100, 200, 300, and 400. The control device 50 and the nodes 100, 200, 300, and 400 are connected to a network 60. The network 60 may be a LAN, a WAN, the Internet, or the like.

The control device 50 receives problem data on a combinatorial optimization problem input from the user. The control device 50 converts the problem data into a problem represented by the energy function of the Ising model. The problem is a problem of minimizing the energy function of the Ising model. The energy function may include a cost term representing a cost to be minimized and a penalty term representing a constraint. The energy function of the entire problem is formulated as in Equation (1). Equation (1) is an energy function formulated in a quadratic unconstrained binary optimization (QUBO) form. $W_{ij}$, $b_i$, and c in Equation (1) are calculated when the formulation is implemented.

The control device 50 divides the problem represented by the energy function of the Ising model into a plurality of subproblems and assigns the subproblems to the nodes 100, 200, 300, and 400. After the information processing system 2 has performed solution search for a predetermined period of time, the control device 50 acquires the solutions held by the nodes 100, 200, 300, and 400, converts the solutions into solutions in a form for the combinatorial optimization problem, and provides the solutions to the user. The control device 50 may be implemented by an information processing apparatus such as a server computer, for example. The control device 50 is an example of the control device 5 according to the first embodiment.

Each of the nodes 100, 200, 300, and 400 searches for a solution to the subproblem assigned to the node, for example, a partial solution. The nodes 100, 200, 300, and 400 include accelerators that search for the solution. The accelerator is hardware for obtaining as the solution, values of the state variable group minimizing the value of the energy function. However, a solution search function provided by at least one of the nodes 100, 200, 300, and 400 may be implemented by software. The nodes 100, 200, 300, and 400 may be implemented by an information processing apparatus such as a computer, for example.

The accelerators of the respective nodes 100, 200, 300, and 400 may use different search methods, for example, search algorithms to search for solutions, or at least two of the accelerators may use the same search method to search for solutions. Examples of the search method include SA, GA, SQA, tabu search, and the like.

Figure 4:
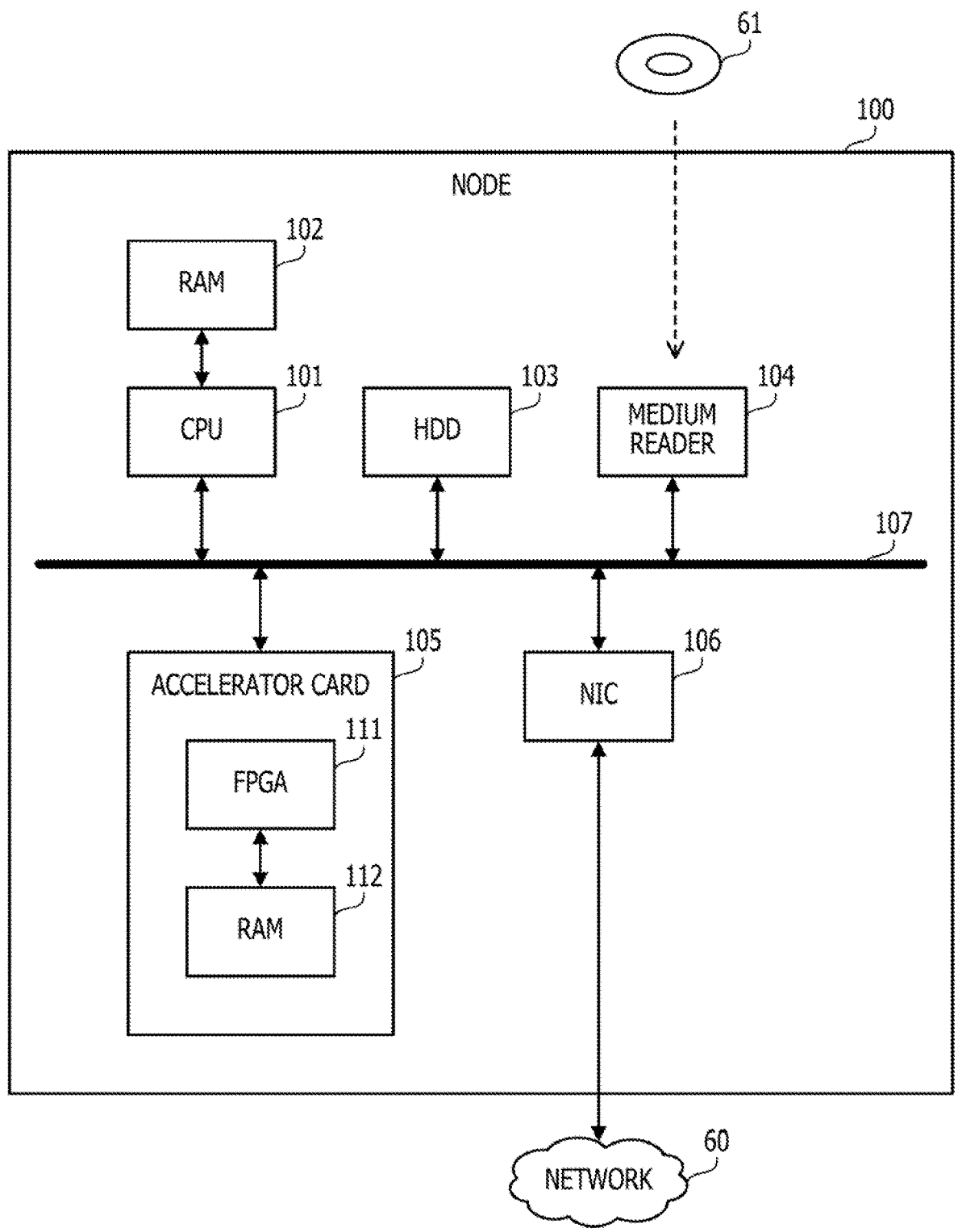
FIG. 4 is a diagram illustrating a hardware example of nodes.

FIG. 4 is a diagram illustrating a hardware example of the nodes.

The node 100 includes a CPU 101, a RAM 102, an HDD 103, a medium reader 104, an accelerator card 105, a network interface card (NIC) 106, and a bus 107.

The CPU 101 is a processor that executes a command of a program. The CPU 101 loads at least a part of a program or data stored in the HDD 103 into the RAM 102, and executes the program. The CPU 101 may include a plurality of processor cores. The node 100 may include a plurality of processors. Processing described below may be executed in parallel by using a plurality of processors or processor cores. A set of the plurality of processors may be referred to as a "multiprocessor" or merely referred to as a "processor" in some cases.

The RAM 102 is a volatile semiconductor memory that temporarily stores the program executed by the CPU 101 and data used for the operation by the CPU 101. The node 100 may include a memory of a type different from the RAM, or include a plurality of memories.

The HDD 103 is a non-volatile storage device that stores data as well as programs of software such as an operating system (OS), middleware, and application software. The node 100 may include a storage device of a different type such as a flash memory and an SSD, or include a plurality of non-volatile storage devices.

The medium reader 104 is a reading device that reads programs and data recorded in a recording medium 61. As the recording medium 61, for example, a magnetic disk, an optical disk, a magneto-optical disk (MO), a semiconductor memory, or the like may be used. The magnetic disk includes a flexible disk (FD) or an HDD. The optical disk includes a compact disc (CD) or a digital versatile disc (DVD).

The medium reader 104 copies, for example, the program and data read from the recording medium 61 to another recording medium such as the RAM 102 or the HDD 103. The read program is executed by, for example, the CPU 101. The recording medium 61 may be a portable recording medium, or may be used to distribute the program and data. The recording medium 61 and the HDD 103 may be referred to as a computer-readable recording medium.

The accelerator card 105 is a hardware accelerator that searches for a solution to a problem represented by the energy function of the Ising model. The accelerator card 105 includes an FPGA 111 and a RAM 112. The FPGA 111 implements a search function in the accelerator card 105. The search function may be implemented by another type of integrated circuit such as a GPU or an ASIC. The RAM 112 stores data used for the search in the FPGA 111 and the solution to the subproblem found by the FPGA 111.

The hardware accelerator that searches for the solution to an Ising form problem such as the accelerator card 105 may be referred to as an Ising machine, a Boltzmann machine, or the like. As described later, the node 100 may include a plurality of accelerator cards.

The NIC 106 is connected to the network 60 and is a communication interface that communicates with the control device 50 and the nodes 200, 300, and 400 via the network 60. The NIC 106 is connected, for example, to a communication device such as a switch or a router via a cable.

The bus 107 is an internal bus of the node 100. The CPU 101, the RAM 102, the HDD 103, the medium reader 104, the accelerator card 105, and the NIC 106 are coupled to the bus 107. For the bus 107, for example, Peripheral Component Interconnect Express (PCIe) is used.

The nodes 200, 300, and 400 are also implemented by hardware similar to that for implementing the node 100. The control device 50 is also implemented by hardware similar to that for implementing the node 100. The control device 50 may not include hardware corresponding to the accelerator card 105.

Figure 5:
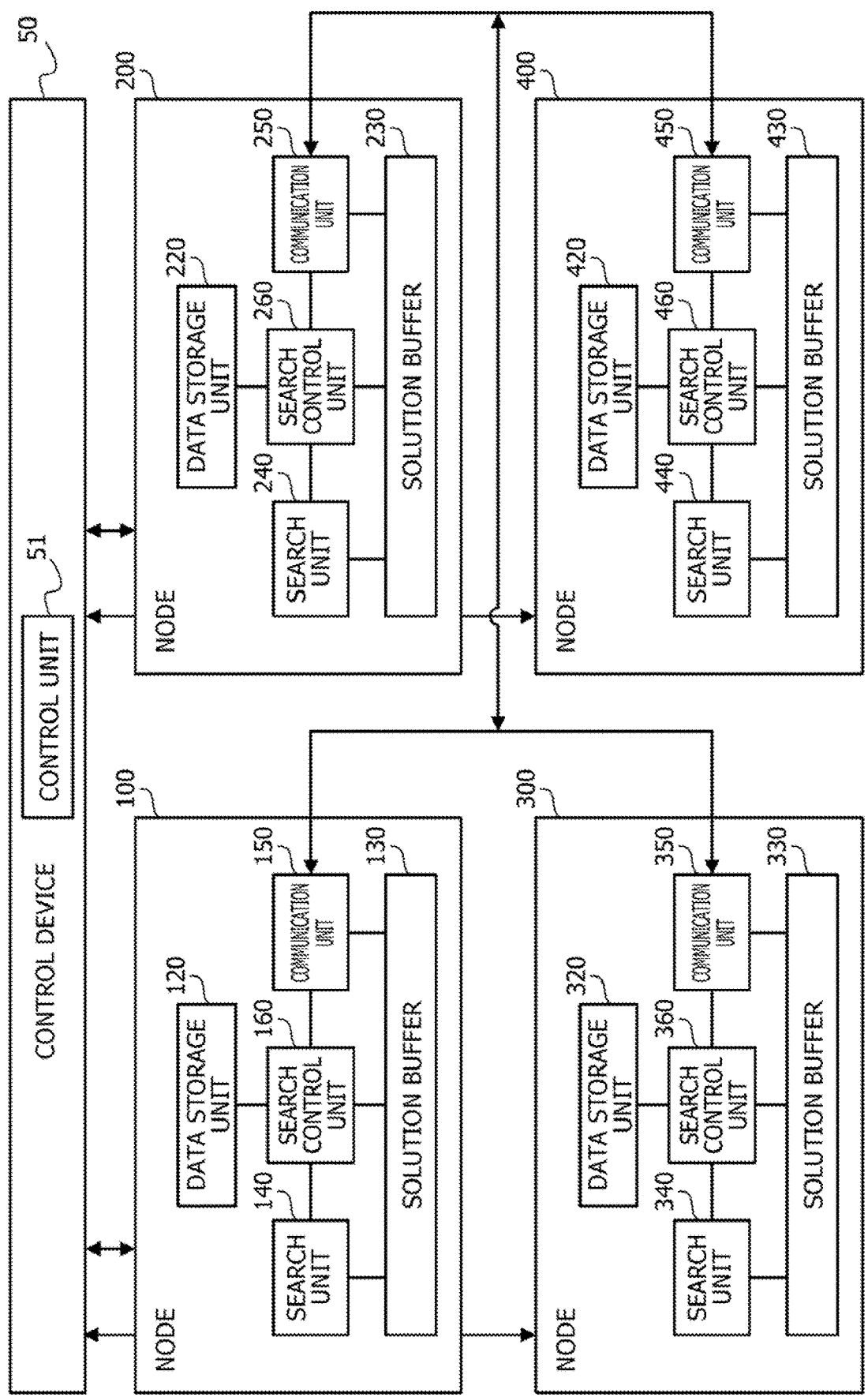
FIG. 5 is a diagram illustrating an example of functions of the information processing system.

FIG. 5 is a diagram Illustrating an example of functions of the information processing system.

The control device 50 includes a control unit 51. The control unit 51 is implemented, for example, with the CPU of the control device 50 executing a program stored in the RAM of the control device 50.

The control unit 51 receives problem data on the combinatorial optimization problem input, converts the problem data into the Ising form, divides the problem converted Into the Ising form into a plurality of subproblems, and assigns the plurality of subproblems to the nodes 100, 200, 300, and 400.

In the example of the second embodiment, the control unit 51 divides the problem into four subproblems. All the state variables X are $x_1$ to $x_N$, where N represents the number of all the state variables used for representing the problem. The number of state variables assigned to each of the nodes 100, 200, 300, and 400 is K=N/4.

For example, the state variable group X0 handled by the node 100 is $x_1$ to xx. The state variable group X1 handled by the node 200 is $x_{K+1}$ to $x_{2K}$. A state variable group X2 handled by the node 300 is $x_{2K+1}$ to XX A state variable group X3 handled by the node 400 is $x_{3K+1}$ to $x_N$.

The control unit 51 acquires solutions from the nodes 100, 200, 300, and 400, and provides a solution to the combinatorial optimization problem based on the acquired solutions, to the user.

The nodes 100, 200, 300, and 400 respectively include data storage units 120, 220, 320, and 420, solution buffers 130, 230, 330, and 430, search units 140, 240, 340, and 440, communication units 150, 250, 350, and 450, and search control units 160, 260, 360, and 460.

Storage regions of RAMs (for example, the RAM 102) of the nodes 100, 200, 300, and 400 are used for the data storage units 120, 220, 320, and 420 and the solution buffers 130, 230, 330, and 430, respectively. The search units 140, 240, 340, and 440 are Implemented by the accelerator cards of the nodes 100, 200, 300, and 400, respectively. The communication units 150, 250, 350, and 450 and the search control units 160, 260, 360, and 460 are implemented with the CPUs of the respective nodes 100, 200, 300, and 400 executing programs stored in the RAMs of the nodes.

The following description is given mainly using the node 100 as an example. The content of the description similarly applies to the functions of the nodes 200, 300, and 400 with similar names.

The data storage unit 120 stores data used by the search control unit 160 for executing processing. For example, the data storage unit 120 stores the weight coefficient between the state variables related to the state variable group handled by the node 100. The number of weight coefficients stored in the data storage unit 120 is K×N.

The solution buffer 130 holds a solution obtained by the node 100. The solution buffer 130 holds a solution to the entire problem, for example, the complete solution. The solution held in the solution buffer 130 is updated based on the partial solution found by the search unit 140 or a solution received from another node.

The search unit 140 searches for a solution to the subproblem assigned to the node 100. The solution to the subproblem searched for by the search unit 140 is a partial solution to the entire problem. The partial solution is represented by the state variable group assigned to the node 100.

The search unit 140 searches for a solution to the subproblem by using any of the search methods such as SA, GA, SQA, and tabu search described above. Here, as an example, a case of using SA or replica exchange method (in other word is parallel tempering) is considered.

For example, the search unit 140 calculates, for each of the state variables $x_1$ to $x_K$, an amount of change in the value of the energy function E'(x) due to a change in the value of one of the state variables $x_1$ to $x_K$, and stochastically accepts the change with a change to reduce the E'(x) prioritized. The change amount $\Delta E'_i$ of the energy value due to a change in $x_i$ among the state variables $x_1$ to $x_K$ may be represented by the following Equation (5).

[Equation 5]

$$\Delta E'_i = -\delta x_i \left( \sum_j^K W_{ij} x_j + b'_i \right) \quad (5)$$

In Equation (5), when $x_i$ changes from 1 to 0, $\delta x_i$ is −1, and when the state variable $x_i$ changes from 0 to 1, $\delta x_i$ is 1.

The search unit 140 fixes the values of the state variables $x_{K+1}$ to $x_N$ handled by the nodes other than the corresponding node.

When the SA or replica exchange method is used, a Metropolis method or a Gibbs method is used to determine a probability of transitioning of a certain Ising model from a certain state to the next state due to a change in a certain state variable. For example, the search unit 140 also stochastically accepts a change of increasing the value of the energy function E'(x), in accordance with comparison between the amount of change in the energy value and a noise value. The noise value is obtained based on a temperature value or a random number. As the temperature value increases, the amplitude of the noise value increases. As the amplitude of the noise value increases, a chance of the state transition involving a large increase amount of the energy value being acceptable increases.

The search unit 140 repeats such processing until a search end condition for a single search for the partial solution is satisfied, and obtains the values of $x_1$ to $x_K$ at the point when the search end condition is satisfied as the present partial solution. For example, whether the search end condition is satisfied is determined based on whether a predetermined unit time has elapsed, whether the state variable change test count has reached a predetermined unit count, or the like.

Although not illustrated in the figure, the search unit 140 includes a local memory that stores the values of the respective state variables $x_1$ to $x_K$ and a weight coefficient between each state variables of the state variables $x_1$ to xx. A storage area such as an SRAM mounted to the accelerator card 105 is used as the local memory. For example, the RAM 112 may be the SRAM providing the local memory.

The communication unit 150 transmits the solutions held in the solution buffer 130 to other nodes and receives solutions from the other nodes.

The search control unit 160 controls the search unit 140 and the communication unit 150. The search control unit 160 may cause the search unit 140 and the communication unit 150 to asynchronously operate. The search control unit 160 updates the solutions held in the solution buffer 130 based on the partial solution acquired by the search unit 140. The search control unit 160 instructs the communication unit 150 to transmit the solution held in the solution buffer 130. The search control unit 160 updates the solution held in the solution buffer 130 based on the solution received by the communication unit 150 from another node. The search control unit 160 changes information on the subproblem in the search unit 140 based on the solution held in the solution buffer 130.

Figure 6:
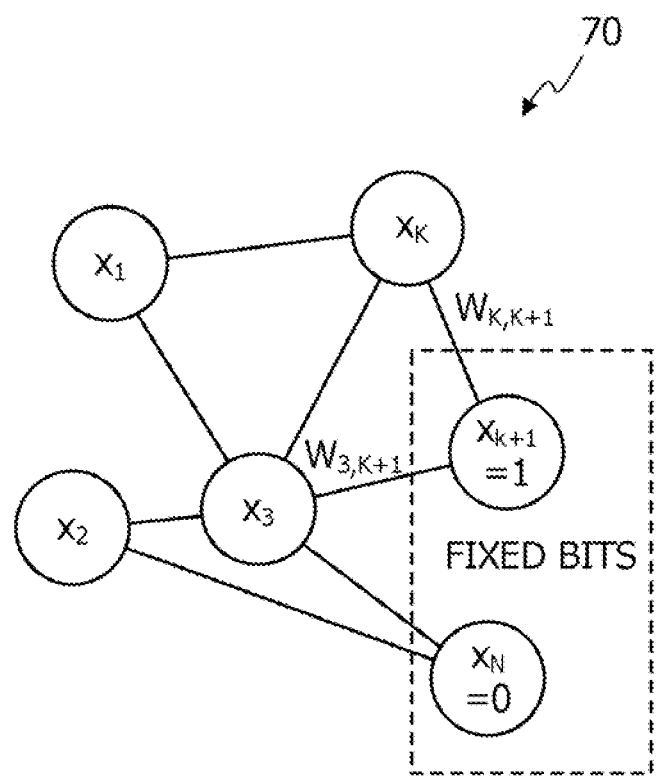
FIG. 6 is a diagram illustrating an example of fixed bits in a subproblem.

FIG. 6 is a diagram Illustrating an example of fixed bits in a subproblem.

A chart 70 illustrates an example of a relationship among state variables $x_1$, $x_2$, $x_3$, $x_K$, $x_{K+1}$, and $x_N$. In the node 100, $x_{K+1}$ included in the state variable group handled by the node 200 and $x_N$ included in the state variable group handled by the node 400 are determined to be fixed bits. In the example of the chart 70, $x_{K+1}=1$ and $x_N=0$ hold.

The search control unit 160 may determine the bias value $b'_i$ with Equation (3), using the values of the fixed bits and the weight coefficient between the state variables included in the state variable group handled by the search unit 140 and the fixed bits. For example, a weight coefficient $W_{K,K+1}$ between $x_K$ and $x_{K+1}$ is used for calculating $b'_K$, and a weight coefficient $W_{3,K+1}$ between $x_3$ and $x_{K+1}$ is used for calculating $b'_3$.

Figure 7:
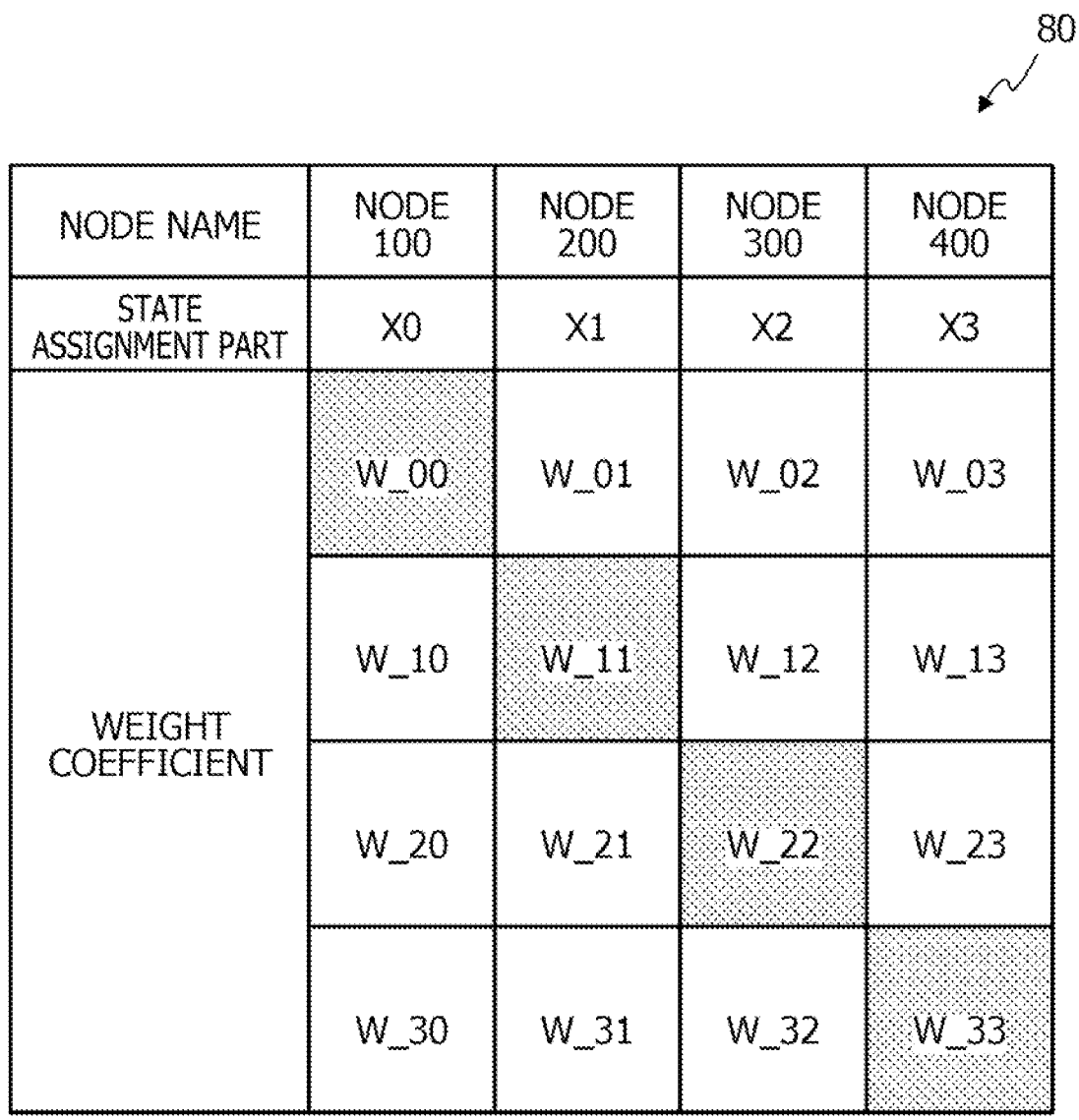
FIG. 7 is a diagram illustrating an example of information held by each node.

FIG. 7 is a diagram illustrating an example of information held by each node.

In a matrix 90, partial energy values E_00 to E_33 that may be calculated for the respective weight coefficient groups W_00 to W_33 are illustrated. The numerical values after the underscore "_" in the signs of the partial energy values E_00 to E_33 respectively correspond to the numerical value parts of W_00 to W_33. The elements in the matrix 90 are diagonally symmetric. For example, E_01=E_10.

Upon acquiring the partial solution found by the search unit 140 for the state variable group X0, the search control unit 160 calculates the energy value for a solution candidate as a result of reflecting the partial solution on the solution held in the solution buffer 130. Meanwhile, the data storage unit 120 stores only the weight coefficient group for calculating the partial energy value (a portion 91 in the matrix 90) for the state variable having binding with each state variable in the state variable group X0 assigned to the node 100. For example, the node 100 is capable of calculating each of the partial energy values E_00, E_10, E_20, and E_30, but is incapable of calculating each of the partial energy values E_11 to E_13, E_21 to E_23, and E_31 to E_33. Therefore, the search control unit 160 calculates an energy value when changing the part of the state variable group X0 to a new partial solution in the solution held in the solution buffer 130, as follows.

The entirety of the state variables is denoted by Sn. An energy value corresponding to Sn is denoted by En.

Sn is expressed as Sn=Sa & So. Sa represents a state variable group handled by the corresponding node, and corresponds to the state variable group X0 in a case of the node 100. So represents a state variable group handled by another node, and corresponds to the state variable groups X1, X2, and X3, in a case of the node 100. The ampersand symbol "&" indicates a combination between the state variable group on the right side of & and the state variable group on the left side of &.

The energy value En is expressed as En=Ea+Eo. The partial energy value Ea is an energy value corresponding to Sa. The partial energy value Eo is an energy value corresponding to So.

A case is considered where a node obtains an updated energy value En' for the energy value En, when the state variable group handled by the node is updated from Sa to Sa'.

The node is able to calculate partial energy value Ea for Sa. For example, the node 100 may calculate the partial energy value Ea from the value of each state variable in the state variable group X0 for the solution held in the solution buffer 130 and W_00. The node is able to calculate a partial energy value Ea' for Sa'. For example, the node 100 may calculate the partial energy value Ea' from the new partial solution and W_00.

Thus, the updated energy value En' for the entire state variables is En'=Ea'+Eo=Ea'+(En−Ea), and may be calculated solely by the node.

Figure 10:
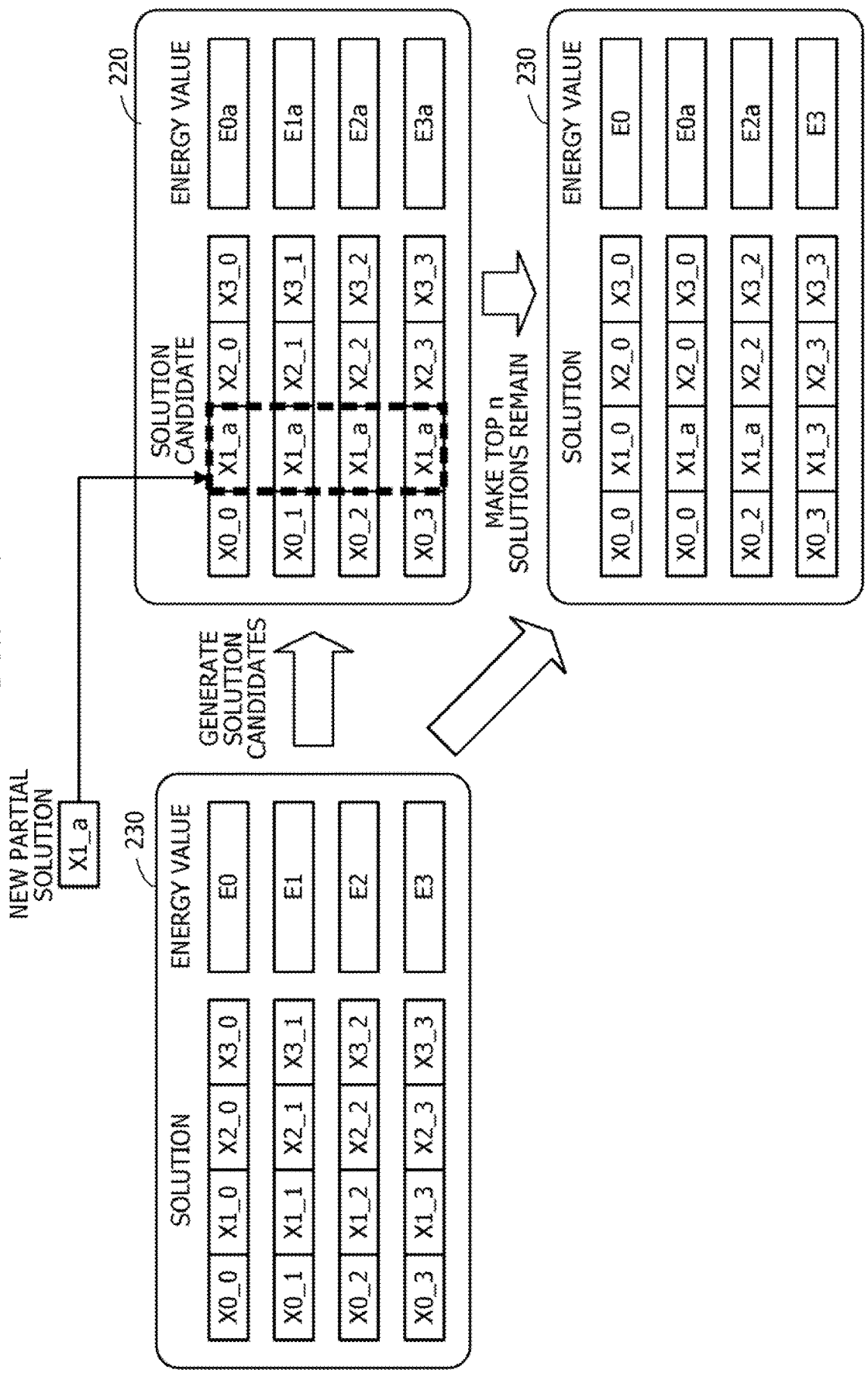
FIG. 10 is a diagram illustrating an example of how a solution buffer is updated using a partial solution.

FIG. 10 is a diagram illustrating an example of how a solution buffer is updated using a partial solution.

FIG. 10 illustrates processing executed by the node 200. Each of the nodes 100, 300, and 400 similarly updates the solutions in the solution buffers using the partial solutions it has obtained.

Upon acquiring a new partial solution X1_a from the search unit 240, the search control unit 260 updates the solutions stored in the solution buffer 230 as follows.

Figure 9:
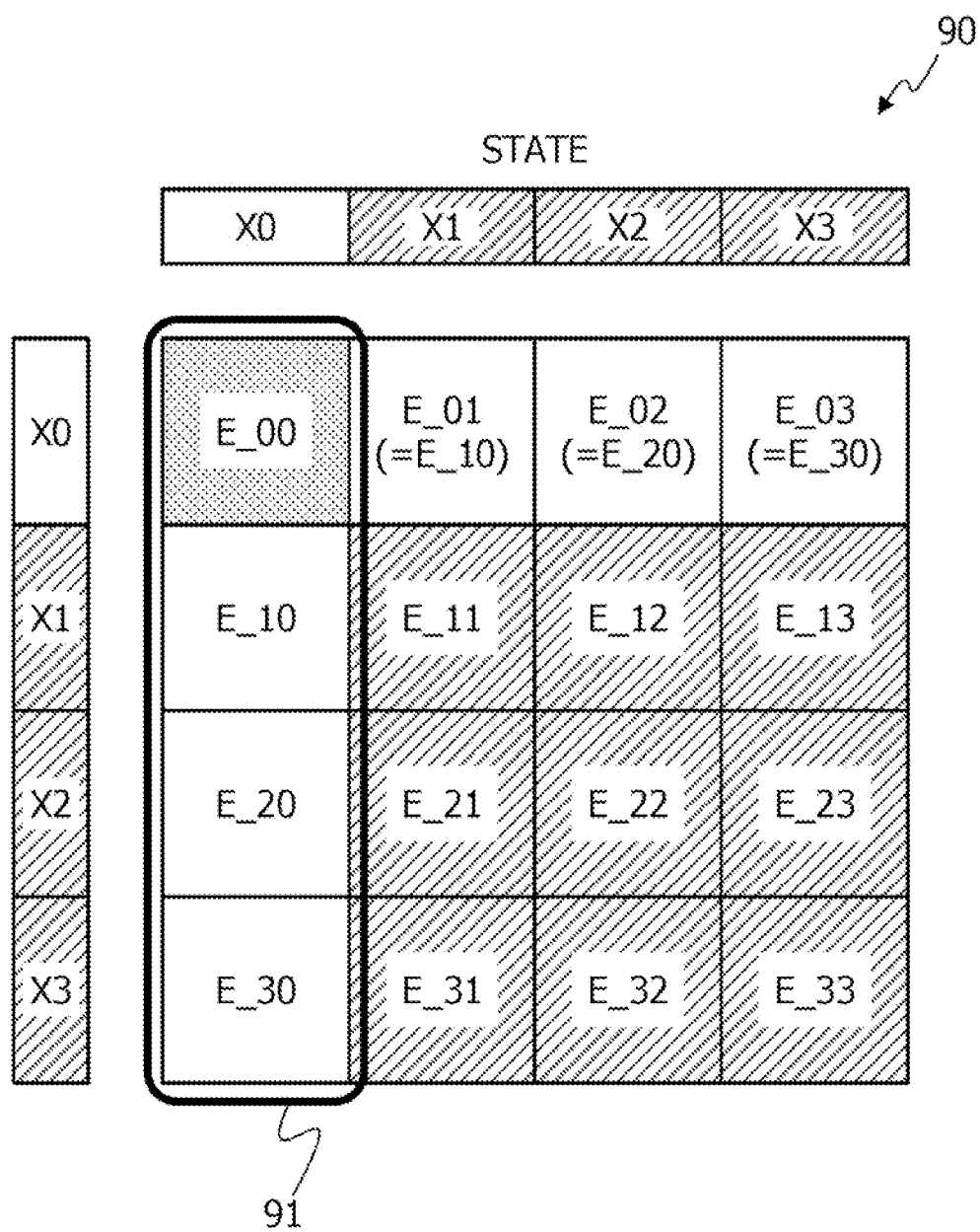
FIG. 9 is a diagram for illustrating a method of calculating an energy value.

The search control unit 260 generates a solution candidate by replacing a part of the solutions stored in the solution buffer 230 corresponding to the state variable group X1, with the partial solution X1_a. The solution candidate is stored, for example, in the data storage unit 220. In this state, the search control unit 260 calculates an energy value corresponding to the solution candidate by using the method described with reference to FIG. 9. In this example, since four solutions are held in the solution buffer 230, four solution candidates are generated.

The search control unit 260 compares the energy values corresponding to the four solutions stored in the solution buffer 230 and the energy values corresponding to the four generated solution candidates with each other, and makes the top n (n=4 in this example) solutions and solution candidates remain in the solution buffer 230. The top n solutions and solution candidates mean n solutions and solution candidates extracted in order from the one with the lowest energy value.

For example, the search control unit 260 generates four solution candidates with energy values E0a to E3a by replacing, with the partial solution X1_a, parts of the four solutions with the energy values E0 to E3 held in the solution buffer 230, corresponding to the state variable group X1. The energy values are assumed to satisfy the relationship E0<E0a<E2a<E3<... in terms of their magnitudes. In this case, the search control unit 260 makes the four solutions corresponding to the energy values E0, E0a, E2a, and E3 held in the solution buffer 230, and discards the other solutions and energy values.

Figure 11:
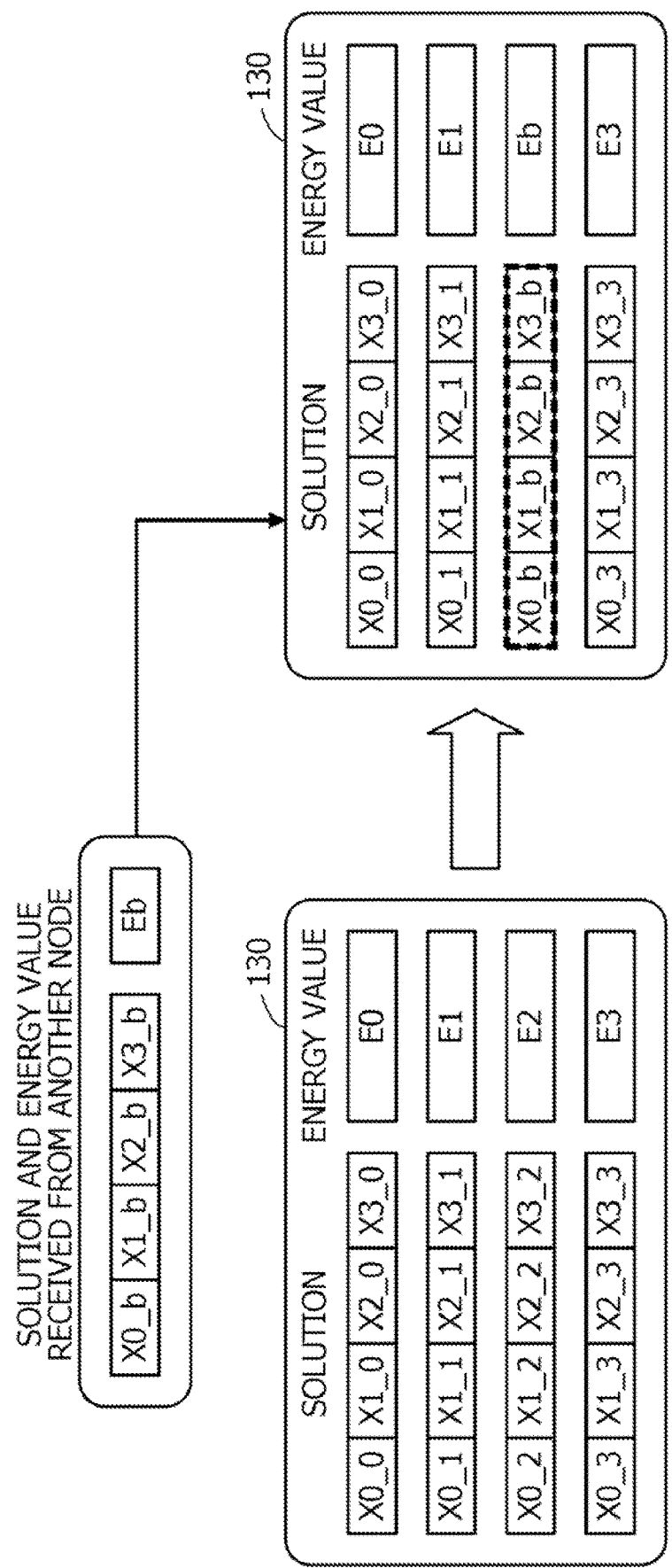
FIG. 11 is a diagram illustrating an example of how a solution buffer is updated using solutions received from other nodes.

FIG. 11 is a diagram illustrating an example of how a solution buffer is updated using solutions received from other nodes.

FIG. 11 illustrates processing executed by the node 100. The nodes 200, 300, and 400 similarly update the solutions in the solution buffers using the solutions obtained from other nodes.

For example, the search control unit 160 acquires a solution received by the communication unit 150 from another node. The energy value corresponding to the solution is denoted by Eb. The communication unit 150 receives a solution and an energy value corresponding to the solution from another node.

The search control unit 160 compares the energy values corresponding to the four solutions stored in the solution buffer 130 and the energy values corresponding to the solutions received from the other nodes with each other, and makes the top n (n=4 in this example) solutions remain in the solution buffer 130.

For example, the search control unit 160 compares the four solutions corresponding to the energy values E0 to E3 held in the solution buffer 130 with the energy value Eb corresponding to the solution received from another node. The energy values are assumed to satisfy the relationship E0<E1<Eb<E3<E2 in terms of their magnitudes. In this case, the search control unit 160 makes the four solutions corresponding to the energy values E0, E1, Eb, and E3 remained in the solution buffer 130, and discards the other solutions and energy values.

Figure 12:
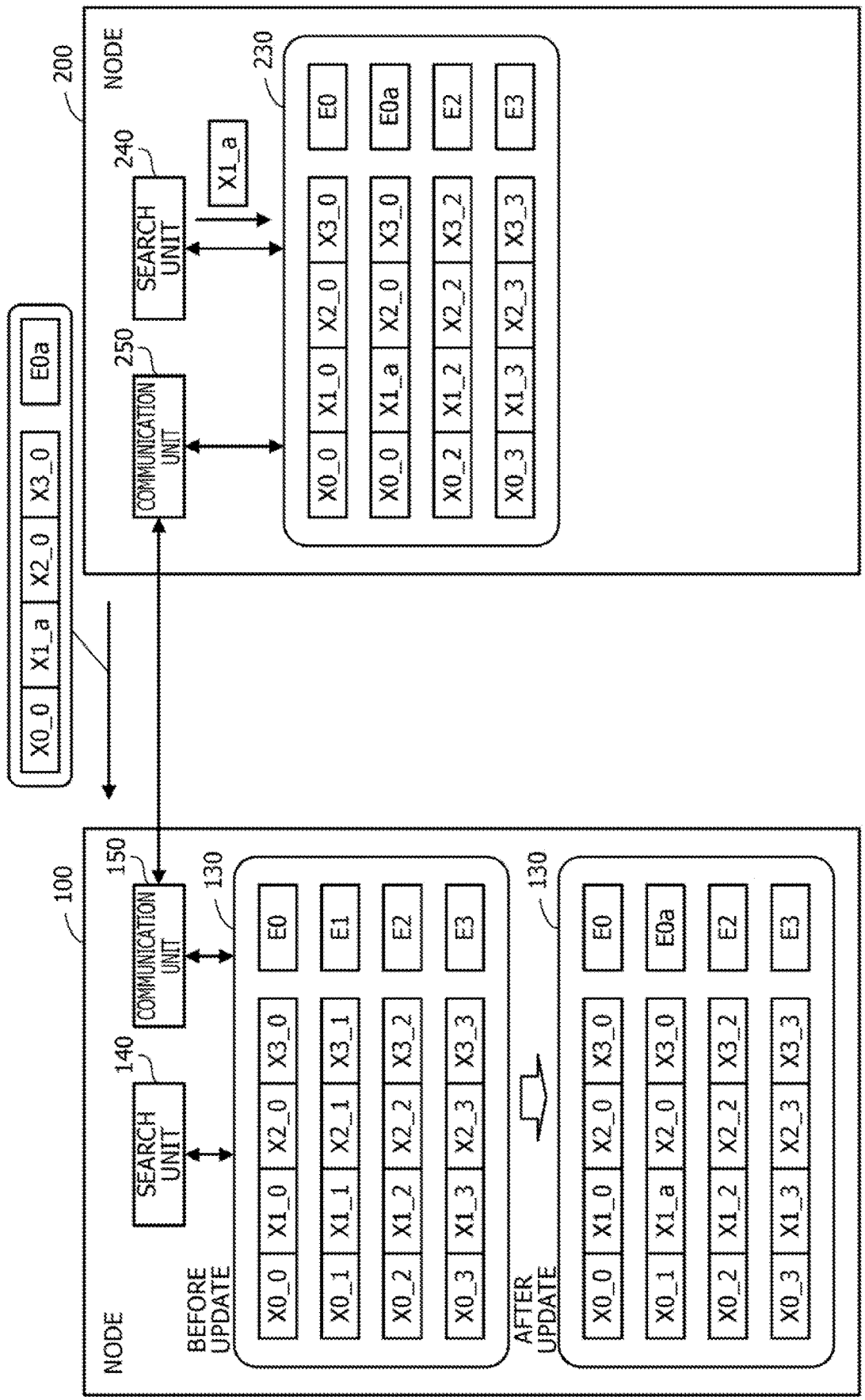
FIG. 12 is a diagram illustrating an example of how a solution is shared between nodes.

FIG. 12 is a diagram illustrating an example of how a solution is shared between nodes.

For example, the search control unit 260 updates the solutions held in the solution buffer 230 based on the partial solution X1_a obtained by the search unit 240. In the example illustrated in FIG. 12, a solution corresponding to the energy value E0a including the partial solution X1_a is newly stored in the solution buffer 230. The solution corresponding to the energy value E0a is assumed to be a solution corresponding to the smallest energy value among the solutions held in the solution buffer 230.

The nodes 100 and 200 share solutions held by the nodes and energy values corresponding to the solutions via the communication units 150 and 250 as follows. In this example, a solution corresponding to the smallest energy value is transmitted from one node to another node. Alternatively, a plurality of solutions selected in ascending order of energy values may be transmitted.

For example, the communication unit 250 transmits to the node 100, the solution corresponding to the smallest energy value among the solutions held in the solution buffer 230 and the energy value E0a corresponding to the solution.

The communication unit 150 receives the solution and the energy value E0a transmitted from the node 200. The energy values E0 to E3 held in the solution buffer 130 are compared with the energy value E0a. For example, when E0<E0a<E2<E3<E1 holds, the four solutions corresponding to the energy values E0, E0a, E2, and E3 are held in the solution buffer 130, and the solution corresponding to the energy value E1 is discarded. In this manner, the solutions held in the solution buffer 130 is updated with the solution received from the node 200.

Similarly, the node 200 transmits the solution and the energy value to the nodes 300 and 400. Like the node 100, the nodes 300 and 400 update the solutions held in their solution buffers based on the solutions and the energy values received from the node 200.

Figure 13:
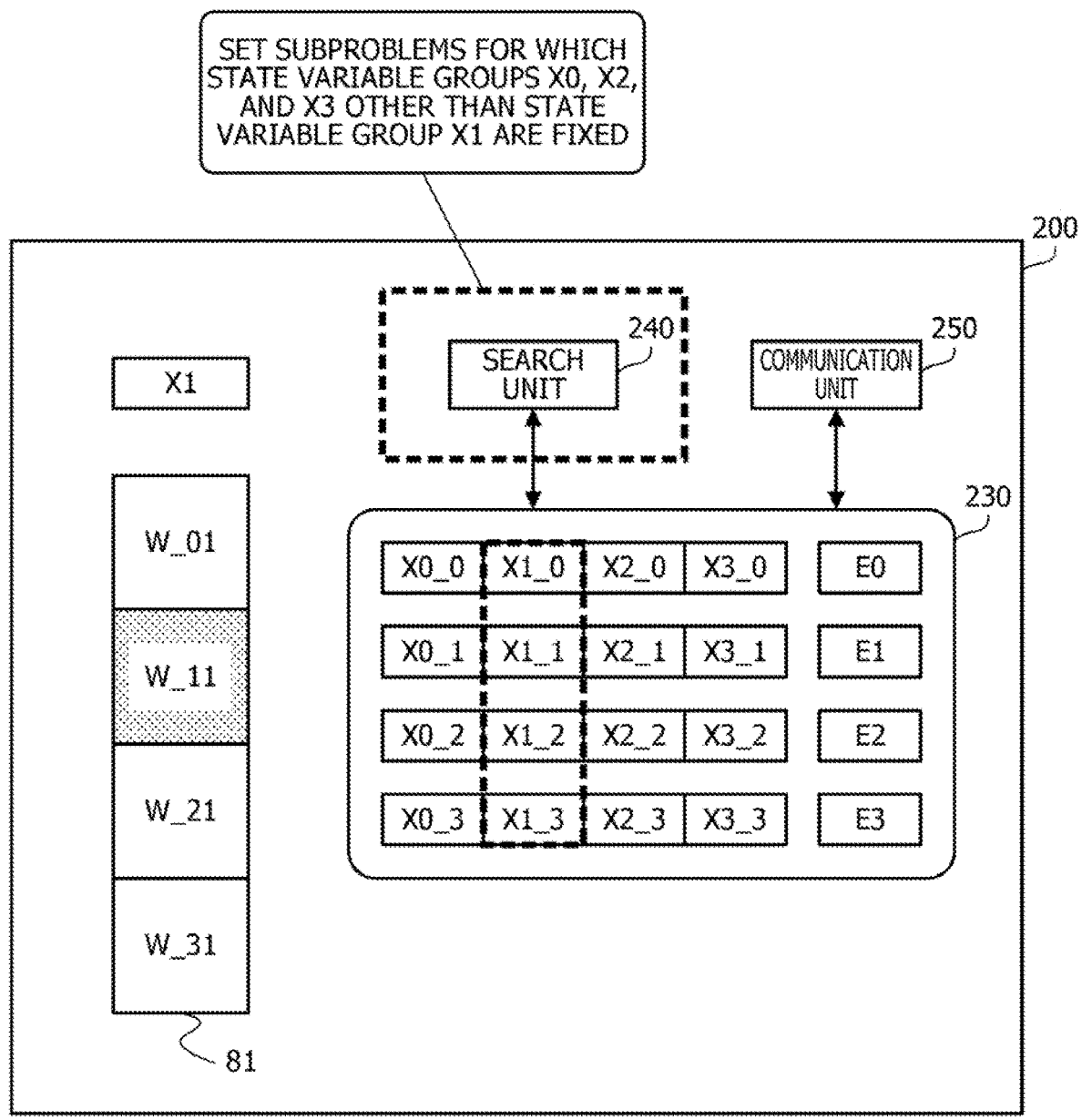
FIG. 13 is a diagram for illustrating how a subproblem is changed for a search unit.

FIG. 13 is a diagram for illustrating how a subproblem is changed for the search unit.

A description with reference to FIG. 13 is given with the node 200 used as an example, but the nodes 100, 300, and 400 execute similar processing.

Based on the solutions stored in the solution buffer 230, the search control unit 260 determines the value of each state variable belonging to the state variable groups handled by the other nodes. The search control unit 260 sets subproblems for which the state variable groups X0, X2, and X3 other than the state variable group X1 assigned to the node 200 are fixed, for the search unit 240.

For example, the search control unit 260 selects a solution corresponding to the smallest energy value among the plurality of solutions held in the solution buffer 230, and uses the value of each state variable in the state variable group X0, X2, and X3 for the selected solution.

Alternatively, the search control unit 260 may randomly select one solution among the plurality of solutions held in the solution buffer 230, and use the value of each state variable in the state variable groups X0, X2, and X3 for the selected solution. In this case, the search control unit 260 may randomly select one solution among k solutions (k is about two or three for example) in ascending order of energy values, among the solutions held in the solution buffer 230. Alternatively, the search control unit 260 may compare the values of the state variables in the state variable groups X0, X2, and X3 for the plurality of respective solutions held in the solution buffer 230, to determine the value of each of the state variables in the state variable groups X0, X2, and X3. For example, the search control unit 260 may select a solution with the largest number of state variables values of which matching those in other solutions, and use the values of the state variables in the state variable groups X0, X2, and X3 for the solution.

In this manner, the search control unit 260 selects one solution from the solution buffer 230, determines the value of each state variable belonging to the state variable groups X0, X2, and X3 based on the solution, and changes the information on the subproblem, for example, b' in Equation (2) based on a weight coefficient group 81. For the state variable group X1, the search control unit 260 recalculates the energy value based on b' after the change and the weight coefficient group 81 as the partial solution currently held in the local memory of the search unit 240, and sets the result of the recalculation to the search unit 240. The method described with reference to FIG. 9 may be used for calculating the energy value. The search control unit 260 causes the search unit 240 to start the next search, with the partial solution held by the search unit 240 in the local memory serving as the initial state.

A processing procedure of the Information processing system 2 is described. The control device 50 first assigns a subproblem to each of the nodes 100, 200, 300, and 400. The nodes 100, 200, 300, and 400 then execute the following processing. Although the description is given with the node 100 mainly used as an example, the nodes 200, 300, and 400 perform a procedure similar to that performed by the node 100.

Figure 14:
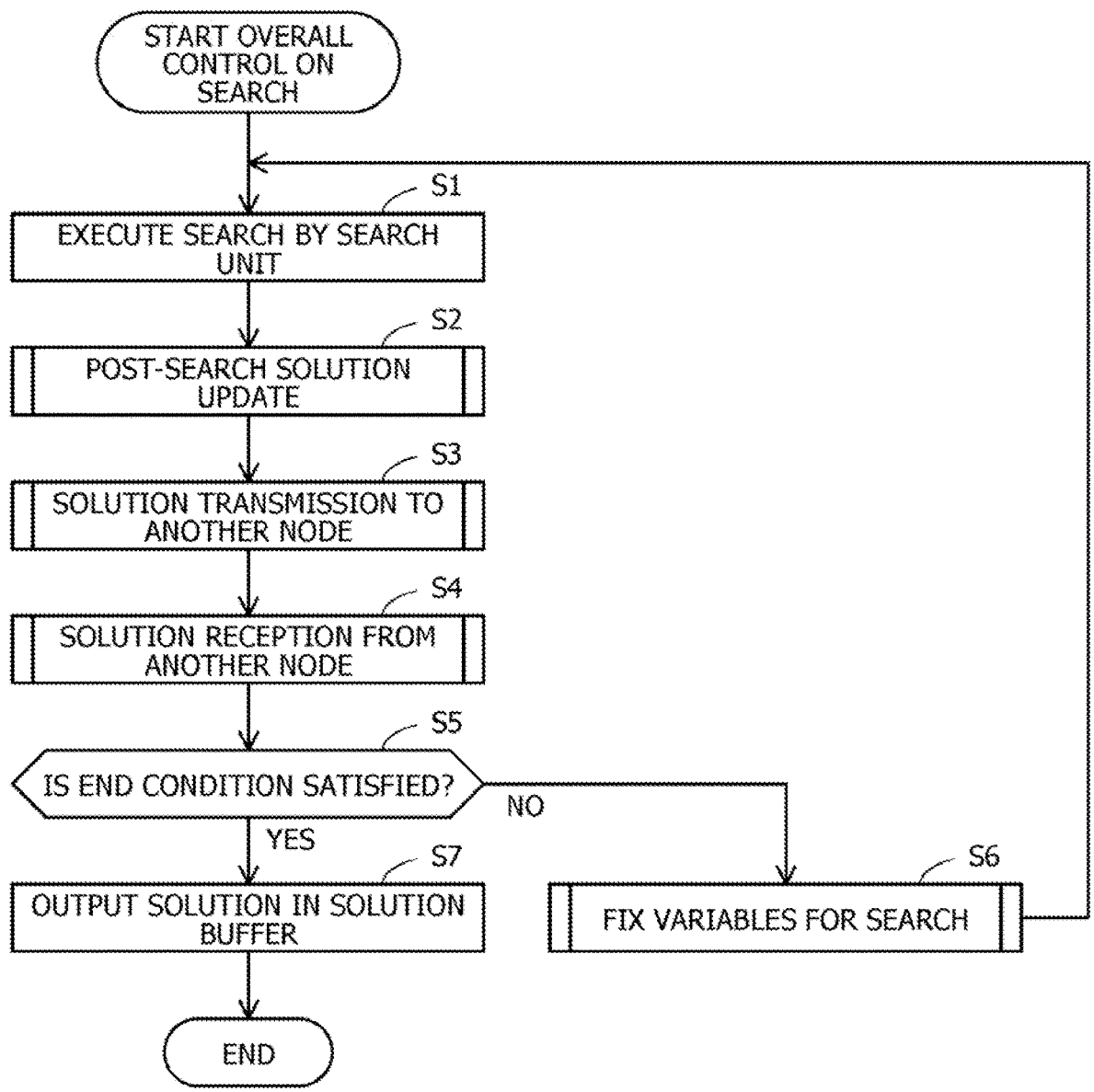
FIG. 14 is a flowchart illustrating an example of overall control on a search.

FIG. 14 is a flowchart illustrating an example of overall control on the search.

(S1) The search unit 140 executes a search for a solution to a subproblem. Through the search, the search unit 140 obtains a partial solution. The search control unit 160 acquires the partial solution obtained by the search unit 140.

(S2) The search control unit 160 executes post-search solution update. Details of the processing of post-search solution update will be described later.

(S3) The search control unit 160 executes solution transmission to another node via the communication unit 150. Details of the processing of solution transmission to another node will be described later.

(S4) The search control unit 160 executes solution reception from another node via the communication unit 150. Details of processing of solution reception from another node will be described later.

(S5) The search control unit 160 determines whether or not an end condition for the overall control on the search is satisfied. When the end condition is not satisfied, the search control unit 160 advances the processing to step S6. When the end condition is satisfied, the search control unit 160 advances the processing to step S7. Examples of the end condition include elapse of a predetermined period of time from the start of the processing for the overall control, execution of step S1 described above for a predetermined number of times, or the like.

(S6) The search control unit 160 executes processing of fixing a variable for the search. The processing of fixing the variable for the search includes changing information on a subproblem. Details of the processing of fixing the variable for the search will be described later. The search control unit 160 then advances the processing to step S1.

(S7) The search control unit 160 outputs the solution held in the solution buffer 130 to the control device 50. The search control unit 160 then ends the processing of the overall control on the search.

The solution transmission to another node in step S3 and the solution reception from another node in step S4 may not be executed after step S2 as described above, and may be executed at any timing, such as at a predetermined interval, asynchronous with the search by the search unit 140. For example, the interval of the solution transmission to another node may be the same as or longer than an interval at which the solution in the solution buffer 130 is updated based on the partial solution found by the search unit 140. The solution reception from another node may be executed when the other node performs push transmission of the solution. Thus, the search by the corresponding node, the solution transmission to another node, and the solution reception from another node may each be executed as independent processing. The solution transmission to the other node in step S3 and the solution reception from the other node in step S4 may be executed in any order. For example, steps S3 and S4 may be executed in the opposite order. One node may successively receive solutions from a plurality of other nodes.

Figure 15:
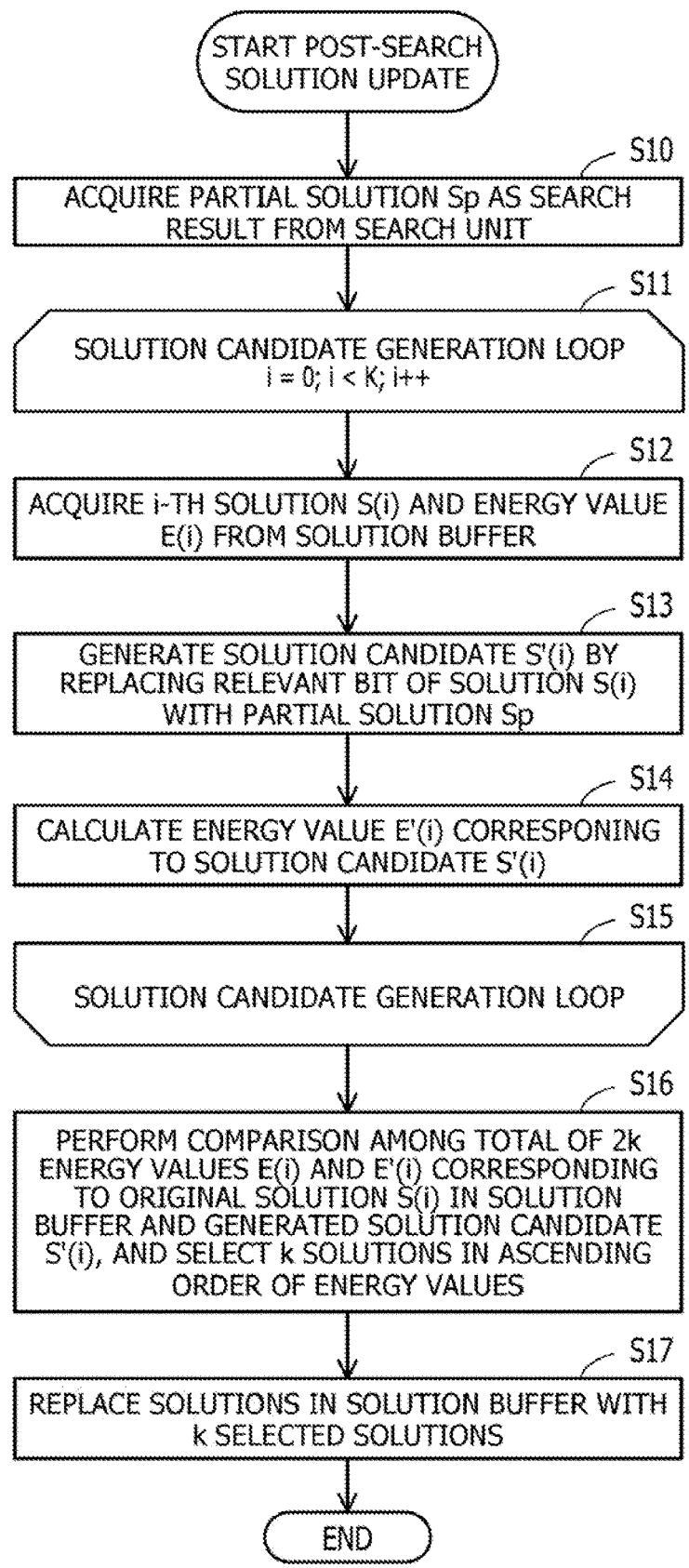
FIG. 15 is a flowchart illustrating a first example of post-search solution update.

FIG. 15 is a flowchart illustrating a first example of post-search solution update.

The processing of post-search solution update corresponds to step S2.

(S10) The search control unit 160 acquires a partial solution Sp as a search result from the search unit 140.

(S11) The search control unit 160 executes a solution candidate generation loop. In the procedure illustrated in FIG. 15, i represents the number of times the loop is executed. An initial value of I is 0. K represents the number of solutions stored in the solution buffer 130. Every time a single loop is executed, i is incremented. The following steps S12 to S14 are repeatedly executed as long as i<K holds.

(S12) The search control unit 160 acquires an i-th solution S(i) and energy value E(i) from the solution buffer 130.

(S13) The search control unit 160 generates a solution candidate S'(i) by replacing, with the partial solution Sp, a relevant bit, for example, a part of the solution S(i) corresponding to the state variable in the state variable group X0 handled by the node 100.

(S14) The search control unit 160 calculates the energy value E'(i) corresponding to the solution candidate S'(i). The method described with reference to FIG. 9 may be used for calculating the energy value E'(i).

(S15) Every time a single loop is executed, the search control unit 160 increments i. When i reaches K, the search control unit 160 ends the solution candidate generation loop, and advances the processing to step S16.

(S16) The search control unit 160 performs comparison among a total of 2K energy values E(i) and E'(i) corresponding to the original solution S(i) in the solution buffer 130 and the generated solution candidate S'(i), and selects K solutions in ascending order of energy values. The K solutions to be selected may include the solution candidate S'(i).

(S17) The search control unit 160 replaces the solutions in the solution buffer 130 with the K solutions selected in step S16. The search control unit 160 then ends the processing of post-search solution update.

Figure 16:
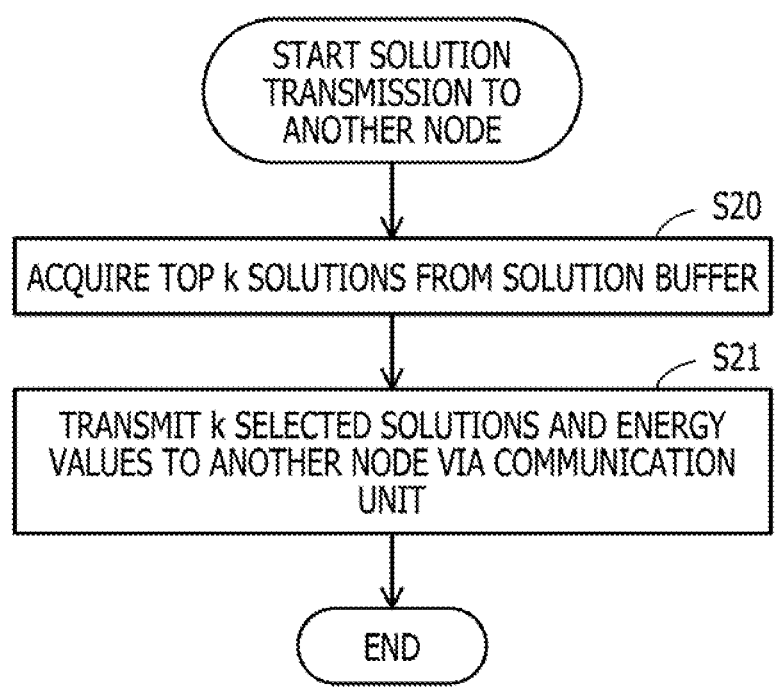
FIG. 16 is a flowchart illustrating an example of solution transmission to another node.

FIG. 16 is a flowchart illustrating an example of solution transmission to another node.

The processing of solution transmission to another node corresponds to step S3.

(S20) The search control unit 160 acquires the top k solutions, for example, k solutions with the lowest energy values from the solution buffer 130. In the procedure in FIG. 16, k is an integer equal to or larger than 1 and smaller than the number of solutions held in the solution buffer 130. For example, the value of k is determined in advance from values of about 1 to 3.

(S21) The search control unit 160 transmits the k selected solutions and the energy values to another node via the communication unit 150. The transmission destination of the solutions is all nodes other than the corresponding node. The search control unit 160 then ends the processing of solution transmission to the other node.

Figure 17:
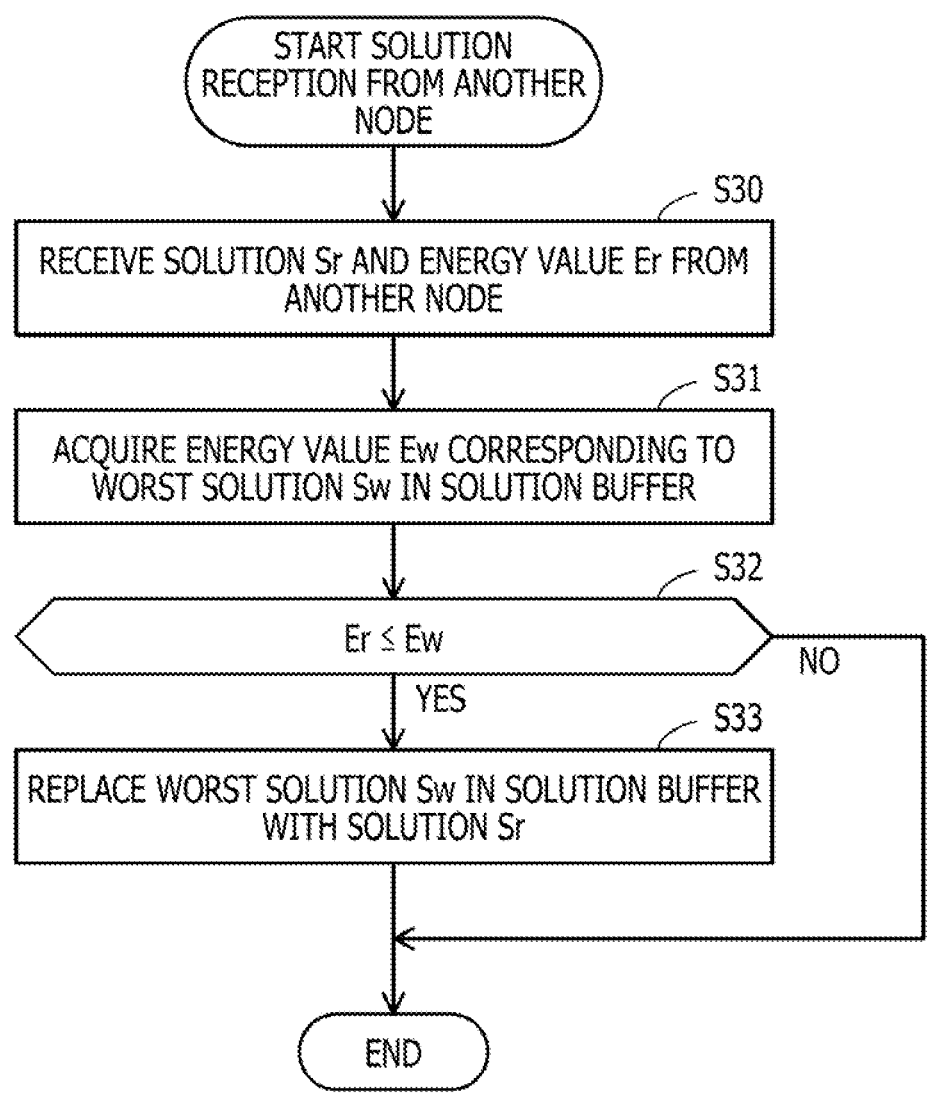
FIG. 17 is a flowchart illustrating an example of solution reception from another node.

FIG. 17 is a flowchart illustrating an example of solution reception from another node.

The processing of solution reception from another node corresponds to step S4.

(S30) The communication unit 150 receives a solution Sr and an energy value Er from another node. The search control unit 160 acquires the solution Sr and the energy value Er received by the communication unit 150.

(S31) The search control unit 160 acquires an energy value Ew corresponding to a worst solution Sw, for example, the solution Sw with the maximum energy value in the solution buffer 130.

(S32) The search control unit 160 determines whether or not Er≤Ew holds. When Er≤Ew holds, the search control unit 160 advances the processing to step S33. When Er>Ew holds, the search control unit 160 discards the solution Sr received from the other node and ends the processing of solution reception from the other node.

(S33) The search control unit 160 replaces the worst solution Sw in the solution buffer 130 with the solution Sr. The search control unit 160 discards the worst solution Sw. The search control unit 160 then ends the processing of solution reception from the other node.

FIG. 17 illustrates an example in which one solution is received from another node. When a plurality of solutions are received from another node, the search control unit 160 makes the solution buffer 130 hold a predetermined number of solutions in ascending order of energy values, among the solutions in the solution buffer 130 and the received solutions.

The execution of the procedures illustrated in FIGS. 16 and 17 by the nodes 100, 200, 300, and 400 provides an effect of making the same solution shared among the solution buffers 130, 230, 330, and 430. However, the same solution may not necessarily be held in the solution buffers 130, 230, 330, and 430.

Figure 18:
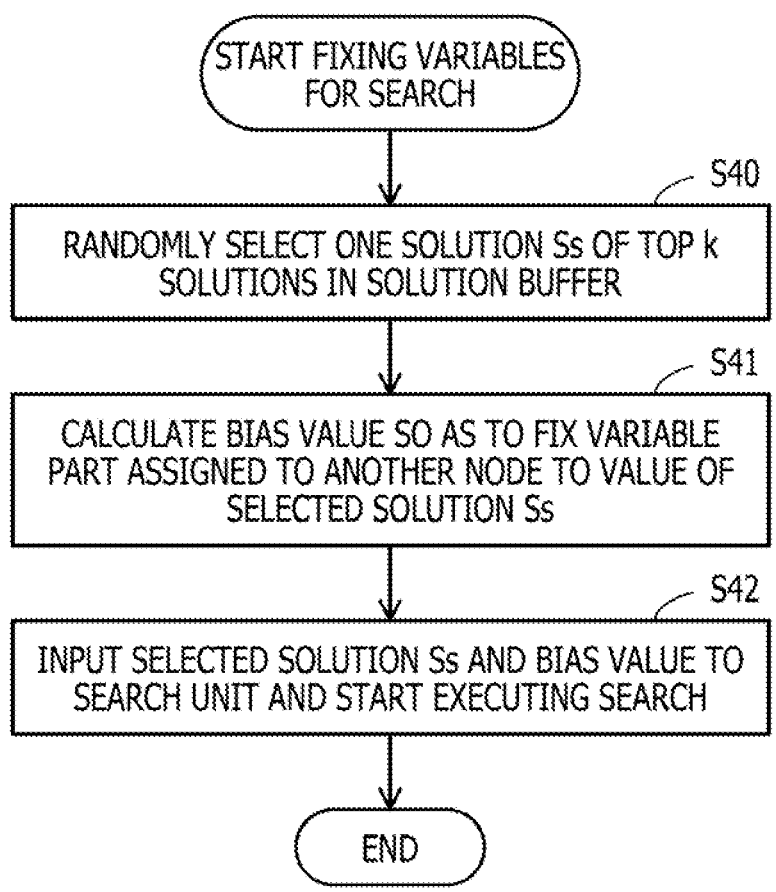
FIG. 18 is a flowchart illustrating an example of how variables are fixed for a search.

FIG. 18 is a flowchart illustrating an example of how variables are fixed for a search.

The processing of fixing the variables for a search corresponds to step S6.

(S40) The search control unit 160 randomly selects one solution Ss of top k solutions in the solution buffer 130, for example, k solutions in ascending order of energy values. In the procedure in FIG. 18, k Is an integer equal to or larger than 1 and smaller than the number of solutions held in the solution buffer 130.

(S41) The search control unit 160 calculates a bias value so as to fix a variable part assigned to another node to the value of the selected solution Ss. The bias value corresponds to b' in Equation (2).

(S42) The search control unit 160 inputs the selected solution Ss and the bias value b' to the search unit 140, and causes the search unit 140 to execute a search. The partial solution held by the search unit 140 at the point of step S42 serves as the initial state of the search by the search unit 140. The search control unit 160 may input an energy value in a case where a variable part handled by another node is fixed to the selected solution Ss to the search unit 140, and cause the search unit 140 to update the energy value. The search control unit 160 then ends the processing of fixing the variables for the search.

Next, an example of updating solutions held in each of the solution buffers 130, 230, 330, and 430 based on the procedures illustrated in FIGS. 14 to 18 will be described.

Figure 19:
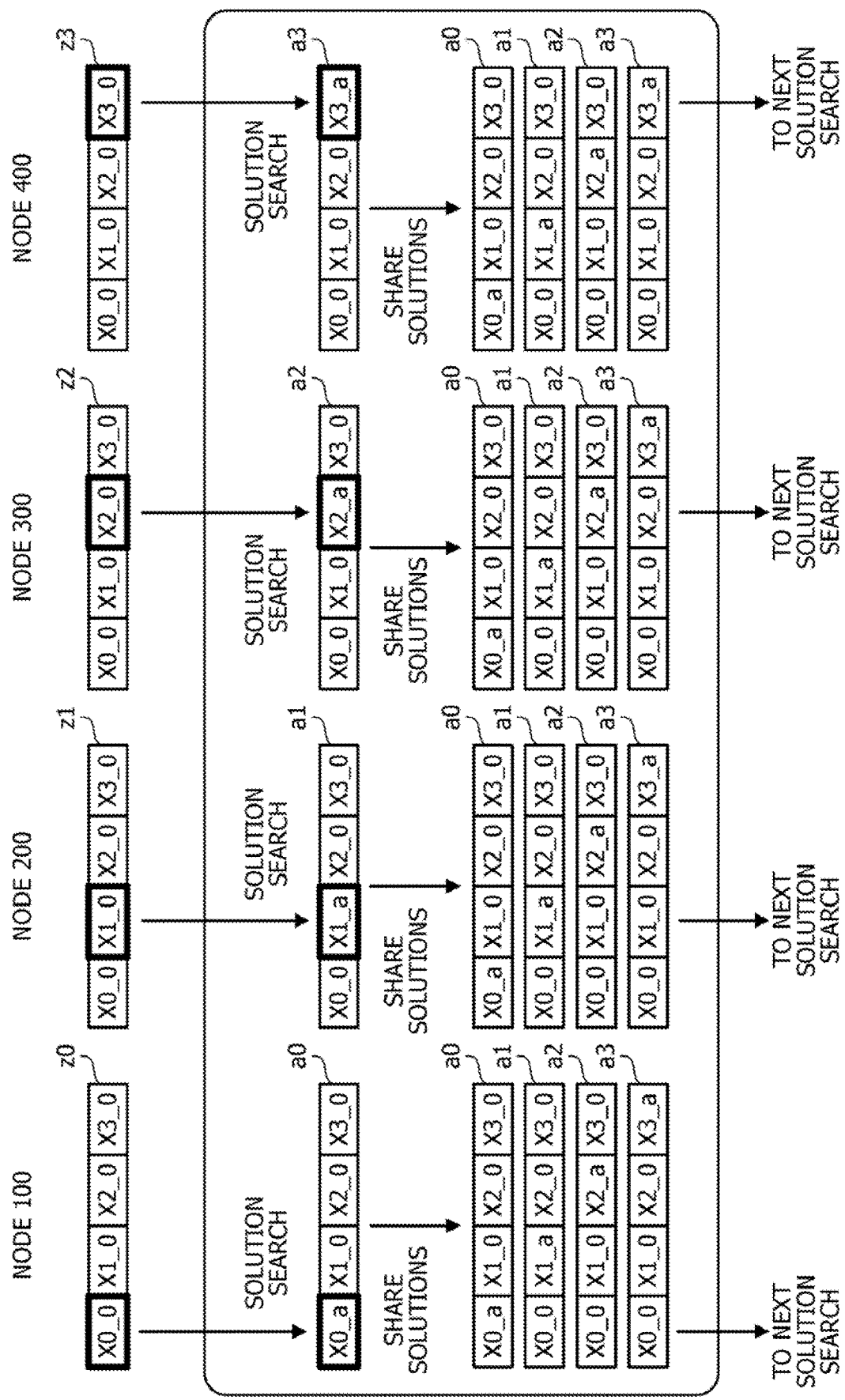
FIG. 19 is a diagram illustrating a first example of how solutions held in solution buffers are updated.

FIG. 19 is a diagram illustrating a first example of how solutions held in the solution buffers are updated.

Initial solutions z0, z1, z2, and z3 are solutions initially held respectively in the nodes 100, 200, 300, and 400. The initial solutions z0, z1, z2, and z3 may be the same or different from each other. In the example of FIG. 19, the initial solutions z0, z1, z2, and z3 are the same, and are each "X0_0, X1_0, X2_0, X3_0". In the initial stage, no solutions are held in the solution buffers 130, 230, 330, and 430. The energy values are stored in the solution buffers 130, 230, 330, and 430 together with the solutions, but the energy values corresponding to the solutions may be omitted in the figure. The number of solutions held in each of the solution buffers 130, 230, 330, and 430 is four.

The node 100 obtains a partial solution X0_*a* represented by the state variable group X0 by searching for a solution to the subproblem assigned to the node 100. The node 100 generates a solution a0 by replacing the part of the state variable group X0 for the initial solution z0 with the partial solution X0_*a*, and stores the solution a0 in the solution buffer 130.

The node 200 obtains a partial solution X1_*a* represented by the state variable group X1 by searching for a solution to the subproblem assigned to the node 200. The node 200 generates a solution a1 by replacing the part of the state variable group X1 for the initial solution z1 with the partial solution X1_*a*, and stores the solution a1 in the solution buffer 230.

The node 300 obtains a partial solution X2_*a* represented by the state variable group X2 by searching for a solution to the subproblem assigned to the node 300. The node 300 generates a solution a2 by replacing the part of the state variable group X2 for the initial solution z2 with the partial solution X2_*a*, and stores the solution a2 in the solution buffer 330.

The node 400 obtains a partial solution X3_*a* represented by the state variable group X3 by searching for a solution to the subproblem assigned to the node 400. The node 400 generates a solution a3 by replacing the part of the state variable group X3 for the initial solution z3 with the partial solution X3_*a*, and stores the solution a3 in the solution buffer 430.

The node 100 transmits the solution a0 and the energy value corresponding to the solution a0 to the nodes 200, 300, and 400. The nodes 200, 300, and 400 receive the solution a0 and the energy value corresponding to the solution a0, and store the solution and the energy value in their solution buffers.

The node 200 transmits the solution a1 and the energy value corresponding to the solution a1 to the nodes 100, 300, and 400. The nodes 100, 300, and 400 receive the solution a1 and the energy value corresponding to the solution a1, and store the solution and the energy value in their solution buffers.

The node 300 transmits the solution a2 and the energy value corresponding to the solution a2 to the nodes 100, 200, and 400. The nodes 100, 200, and 400 receive the solution a2 and the energy value corresponding to the solution a2, and store the solution and the energy value in their solution buffers.

The node 400 transmits the solution a3 and the energy value corresponding to the solution a3 to the nodes 100, 200, and 300. The nodes 100, 200, and 300 receive the solution a3 and the energy value corresponding to the solution a3, and store the solution and the energy value in their solution buffers.

As a result, the solutions a0 to a3 are shared among the nodes 100, 200, 300, and 400.

For example, the nodes 100, 200, 300, and 400 fix, based on the best solution held in their solution buffers, the state variables handled by the other nodes, and proceed to the search for the next solution.

Figure 20:
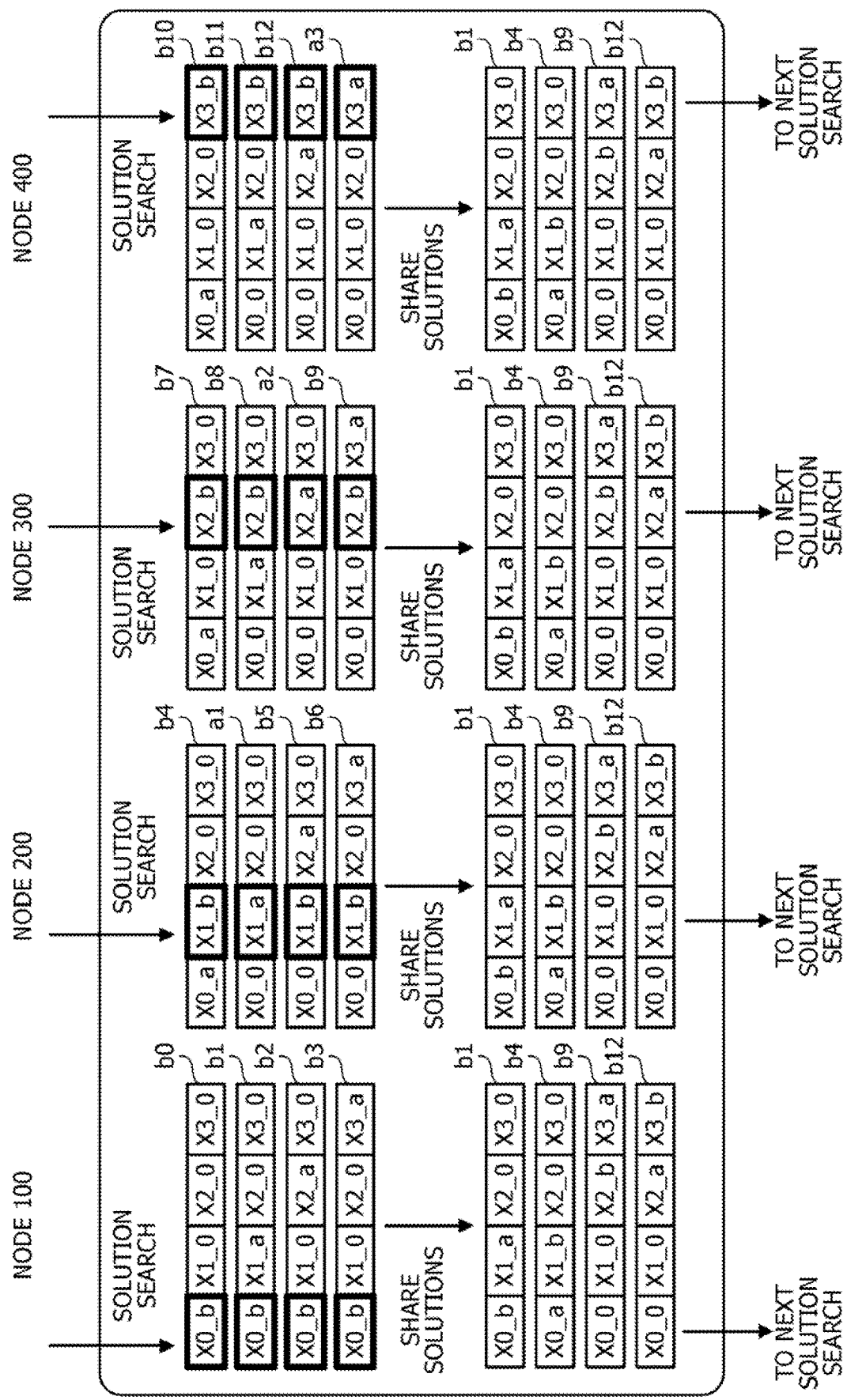
FIG. 20 is a diagram illustrating (continuation of) the first example of how the solutions held in the solution buffers are updated.

FIG. 20 is a diagram illustrating (continuation of) the first example of how the solutions held in the solution buffers are updated.

The node 100 obtains a partial solution X0_*b* by searching for a solution to the subproblem. The node 100 generates four solution candidates by replacing a part of the state variable group X0 for the solutions a0 to a3 held in the solution buffer 130, with the partial solution X0_*b*. The node 100 compares the energy values corresponding to the solutions a0 to a3 and to the four solution candidates with each other, and updates the solutions a0 to a3 held in the solution buffer 130 to solutions b0 to b3. The solutions b0 to b3 are solutions obtained by replacing the part of the state variable group X0 for the respective solutions a0 to a3 with the partial solution X0_*b*.

The node 200 obtains a partial solution X1_*b* by searching for a solution to the subproblem. The node 200 generates four solution candidates by replacing the part of the state variable group X1 for the solutions a0 to a3 held in the solution buffer 230 with the partial solution X1_*b*. The node 200 compares the energy values corresponding to the solutions a0 to a3 and to the four solution candidates with each other, and updates the solutions a0 to a3 held in the solution buffer 230 to a solution b4, the solution a1, and solutions b5 and b6. The solutions b4, b5, and b6 are solutions obtained by replacing the part of the state variable group X1 for the respective solutions a0, a2, and a3 with the partial solution X1_*b*.

The node 300 obtains a partial solution X2_*b* by searching for a solution to the subproblem. The node 300 generates four solution candidates by replacing a part of the state variable group X2 for the solutions a0 to a3 held in the solution buffer 330, with the partial solution X2_*b*. The node 300 compares the energy values corresponding to the solutions a0 to a3 and to the four solution candidates with each other, and updates the solutions a0 to a3 held in the solution buffer 330 to solutions b7 and b8, the solution a2, and a solution b9. The solutions b7, b8, and b9 are solutions obtained by replacing the part of the state variable group X2 for the respective solutions a0, a1, and a3 with the partial solution X2_*b*.

The node 400 obtains a partial solution X3_*b* by searching for a solution to the subproblem. The node 400 generates four solution candidates by replacing a part of the state variable group X3 for the solutions a0 to a3 held in the solution buffer 430, with the partial solution X3_*b*. The node 400 compares the energy values corresponding to the solutions a0 to a3 and to the four solution candidates with each other, and updates the solutions a0 to a3 held in the solution buffer 430 to solutions b10, b11, and b12 and the solution a3. The solutions b10, b11, and b12 are solutions obtained by replacing the part of the state variable group X3 for the respective solutions a0, a1, and a2 with the partial solution X3_b.

The node 100 transmits the solution b1 corresponding to the smallest energy value among the solutions b0 to b3 and the energy value corresponding to the solution b1 to the nodes 200, 300, and 400. Alternatively, as described above, the node 100 may transmit a predetermined number of solutions in ascending order of energy values and the energy values corresponding to the solutions to the nodes 200, 300, and 400. The same applies to the nodes 200, 300, and 400. Upon receiving the solution b1, the nodes 200, 300, and 400 compare the energy value corresponding to the solution b1 with the energy values corresponding to the solutions held in their solution buffers, and preferentially hold the four of the solutions in ascending order of energy values.

The node 200 transmits the solution b4 corresponding to the smallest energy value among the solutions b4, a1, b5, and b6 and the energy value corresponding to the solution b4 to the nodes 100, 300, and 400. Upon receiving the solution b4, the nodes 100, 300, and 400 compare the energy value corresponding to the solution b4 with the energy values corresponding to the solutions held in their solution buffers, and preferentially hold the four of the solutions in ascending order of energy values.

The node 300 transmits the solution b9 corresponding to the smallest energy value among the solutions b7, b8, a2, and b9 and the energy value corresponding to the solution b9 to the nodes 100, 200, and 400. Upon receiving the solution b9, the nodes 100, 200, and 400 compare the energy value corresponding to the solution b9 with the energy values corresponding to the solutions held in their solution buffers, and preferentially hold the four of the solutions in ascending order of energy values.

The node 400 transmits the solution b12 corresponding to the smallest energy value among the solutions b10, b11, b12, and a3 and the energy value corresponding to the solution b12 to the nodes 100, 200, and 300. Upon receiving the solution b12, the nodes 100, 200, and 300 compare the energy value corresponding to the solution b12 with the energy values corresponding to the solutions held in their solution buffers, and preferentially hold the four of the solutions in ascending order of energy values.

As a result, for example, the solutions b1, b4, b9, and b12 are shared among the nodes 100, 200, 300, and 400.

For example, the nodes 100, 200, 300, and 400 fix, based on the best solution held in their solution buffers, the state variables handled by the other nodes, and proceed to the search for the next solution.

Figure 21:
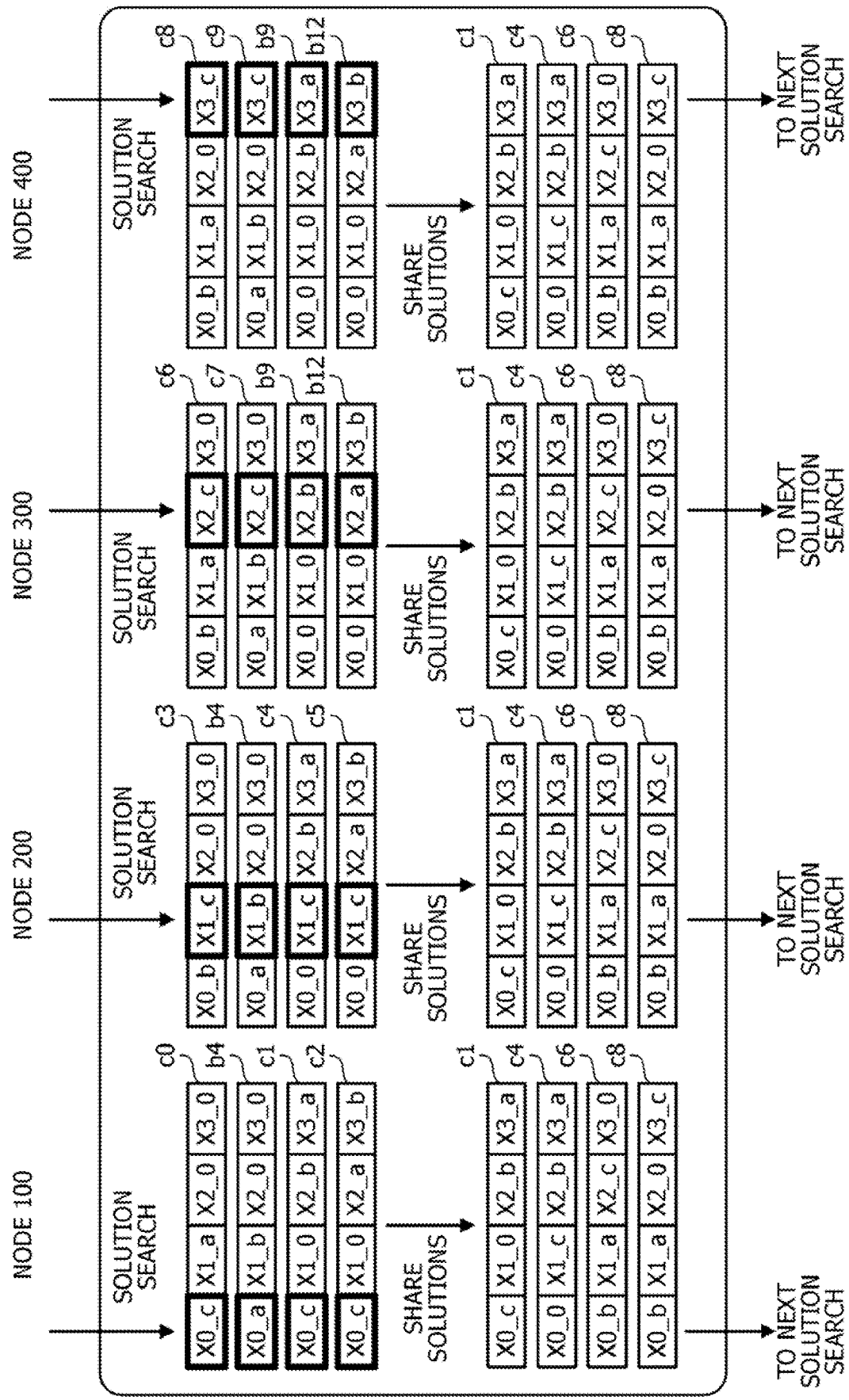
FIG. 21 is a diagram illustrating (continuation of) the first example of how the solutions held in the solution buffers are updated.

FIG. 21 is a diagram illustrating (continuation of) the first example of how the solutions held in the solution buffers are updated.

The node 100 obtains a partial solution X0_c by searching for a solution to the subproblem. The node 100 generates four solution candidates by replacing a part of the state variable group X0 for the solutions b1, b4, b9, and b12 held in the solution buffer 130, with the partial solution X0_c. The node 100 compares the energy values corresponding to the solutions b1, b4, b9, and b12 and to the four solution candidates with each other, and updates the solutions b1, b4, b9, and b12 held in the solution buffer 130 to a solution c0, the solution b4, and solutions c1 and c2. The solutions c0, c1, and c2 are solutions obtained by replacing the part of the state variable group X0 for the respective solutions b1, b9, and b12 with the partial solution X0_c.

The node 200 obtains a partial solution X1_c by searching for a solution to the subproblem. The node 200 generates four solution candidates by replacing a part of the state variable group X1 for the solutions b1, b4, b9, and b12 held in the solution buffer 230, with the partial solution X1_c. The node 200 compares the energy values corresponding to the solutions b1, b4, b9, and b12 and to the four solution candidates with each other, and updates the solutions b1, b4, b9, and b12 held in the solution buffer 230 to a solution c3, the solution b4, and solutions c4 and c5. The solutions c3, c4, and c5 are solutions obtained by replacing the part of the state variable group X1 for the respective solutions b1, b9, and b12 with the partial solution X1_c.

The node 300 obtains a partial solution X2_c by searching for a solution to the subproblem. The node 300 generates four solution candidates by replacing a part of the state variable group X2 for the solutions b1, b4, b9, and b12 held in the solution buffer 330, with the partial solution X2_c. The node 300 compares the energy values corresponding to the solutions b1, b4, b9, and b12 and to the four solution candidates with each other, and updates the solutions b1, b4, b9, and b12 held in the solution buffer 330 to solutions c6 and c7 and the solutions b9 and b12. The solutions c6 and c7 are solutions obtained by replacing the part of the state variable group X2 for the respective solutions b1 and b4 with the partial solution X2_c.

The node 400 obtains a partial solution X3_c by searching for a solution to the subproblem. The node 400 generates four solution candidates by replacing a part of the state variable group X3 for the solutions b1, b4, b9, and b12 held in the solution buffer 430, with the partial solution X3_c. The node 400 compares the energy values corresponding to the solutions b1, b4, b9, and b12 and to the four solution candidates with each other, and updates the solutions b1, b4, b9, and b12 held in the solution buffer 430 to solutions c8 and c9 and the solutions b9 and b12. The solutions c8 and c9 are solutions obtained by replacing the part of the state variable group X3 for the respective solutions b1 and b4 with the partial solution X3_c.

The node 100 transmits the solution c1 corresponding to the smallest energy value among the solutions c0, b4, c1, and c2 and the energy value corresponding to the solution c1 to the nodes 200, 300, and 400. Upon receiving the solution c1, the nodes 200, 300, and 400 compare the energy value corresponding to the solution c1 with the energy values corresponding to the solutions held in their solution buffers, and preferentially hold the four of the solutions in ascending order of energy values.

The node 200 transmits the solution c4 corresponding to the smallest energy value among the solutions c3, b4, c4, and c5 and the energy value corresponding to the solution c4 to the nodes 100, 300, and 400. Upon receiving the solution c4, the nodes 100, 300, and 400 compare the energy value corresponding to the solution c4 with the energy value corresponding to the solution held in their solution buffers, and preferentially hold the four of the solutions in ascending order of energy values.

The node 300 transmits the solution c6 corresponding to the smallest energy value among the solutions c6, c7, b9, and b12 and the energy value corresponding to the solution c6 to the nodes 100, 200, and 400. Upon receiving the solution c6, the nodes 100, 200, and 400 compare the energy value corresponding to the solution c6 with the energy values corresponding to the solutions held in their solution buffers, and preferentially hold the four of the solutions in ascending order of energy values.

The node 400 transmits the solution c8 corresponding to the smallest energy value among the solutions c8, c9, b9, and b12 and the energy value corresponding to the solution c8 to the nodes 100, 200, and 300. Upon receiving the solution c8, the nodes 100, 200, and 300 compare the energy value corresponding to the solution c8 with the energy values corresponding to the solutions held in their solution buffers, and preferentially hold the four of the solutions in ascending order of energy values.

As a result, for example, the solutions c1, c4, c6, and c8 are shared among the nodes 100, 200, 300, and 400.

For example, the nodes 100, 200, 300, and 400 fix, based on the best solution held in their solution buffers, the state variables handled by the other nodes, and proceed to the search for the next solution.

Figure 22:
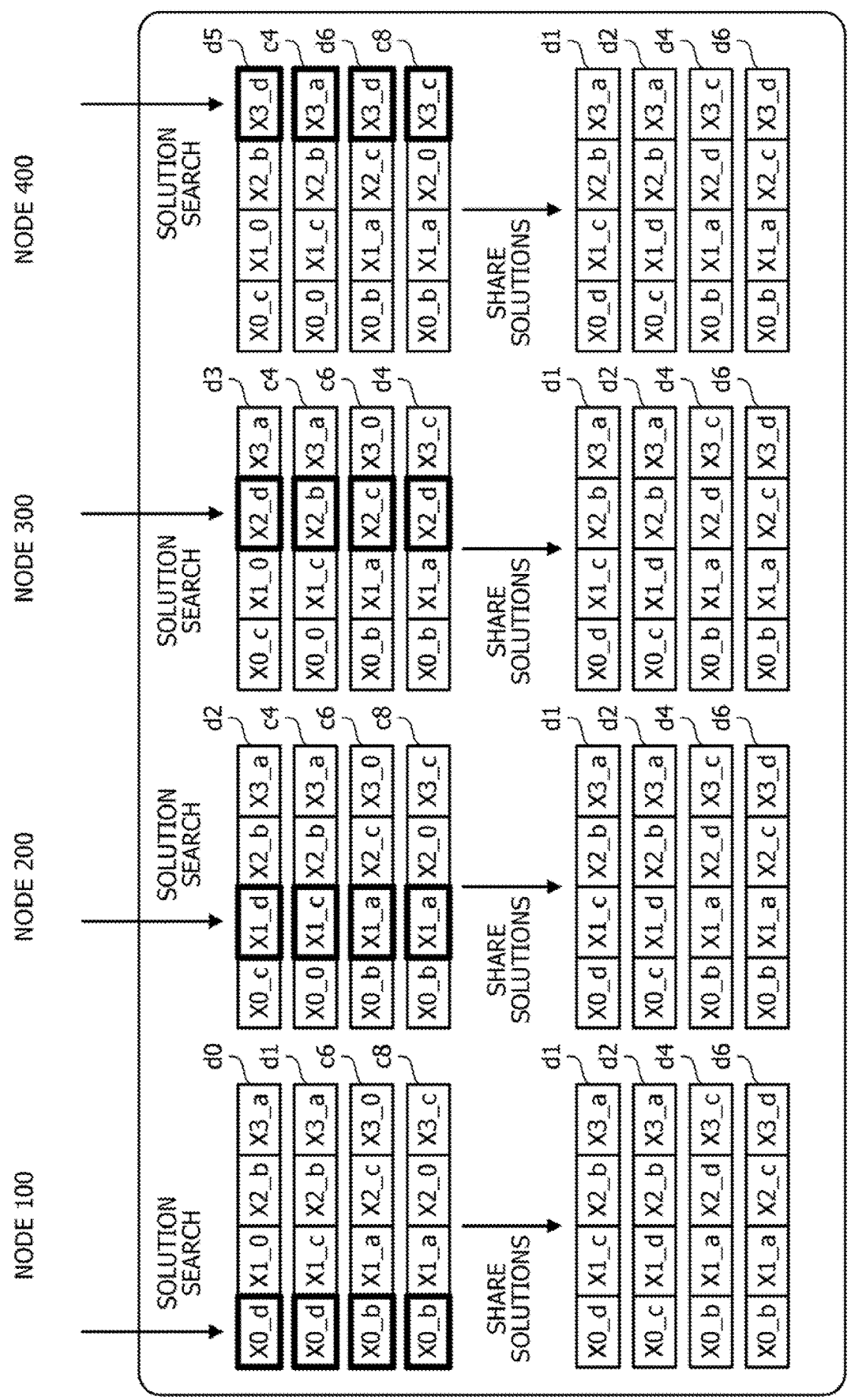
FIG. 22 is a diagram illustrating (continuation of) the first example of how the solutions held in the solution buffers are updated.

FIG. 22 is a diagram illustrating (continuation of) the first example of how the solutions held in the solution buffers are updated.

The node 100 obtains a partial solution X0_d by searching for a solution to the subproblem. The node 100 generates four solution candidates by replacing a part of the state variable group X0 for the solutions c1, c4, c6, and c8 held in the solution buffer 130, with the partial solution X0_d. The node 100 compares the energy values corresponding to the solutions c1, c4, c6, and c8 and of the four solution candidates with each other, and updates the solutions c1, c4, c6, and c8 held in the solution buffer 130 to solutions d0 and d1 and the solutions c6 and c8. The solutions d0 and d1 are solutions obtained by replacing the part of the state variable group X0 for the respective solutions c1 and c4 with the partial solution X0_d.

The node 200 obtains a partial solution X1_d by searching for a solution to the subproblem. The node 200 generates four solution candidates by replacing a part of the state variable group X1 for the solutions c1, c4, c6, and c8 held in the solution buffer 230, with the partial solution X1_d. The node 200 compares the energy values corresponding to the solutions c1, c4, c6, and c8 and to the four solution candidates with each other, and updates the solutions c1, c4, c6, and c8 held in the solution buffer 230 to a solution d2 and the solutions c4, c6, and c8. The solution d2 is a solution obtained by replacing the part of the state variable group X1 for the solution c1 with the partial solution X1_d.

The node 300 obtains a partial solution X2_d by searching for a solution to the subproblem. The node 300 generates four solution candidates by replacing a part of the state variable group X2 for the solutions c1, c4, c6, and c8 held in the solution buffer 330, with the partial solution X2_d. The node 300 compares the energy values corresponding to the solutions c1, c4, c6, and c8 and to the four solution candidates with each other, and updates the solutions c1, c4, c6, and c8 held in the solution buffer 330 to a solution d3, the solutions c4 and c6, and a solution d4. The solutions d3 and d4 are solutions obtained by replacing the part of the state variable group X2 for the respective solutions c1 and c8 with the partial solution X2_d.

The node 400 obtains a partial solution X3_d by searching for a solution to the subproblem. The node 400 generates four solution candidates by replacing a part of the state variable group X3 for the solutions c1, c4, c6, and c8 held in the solution buffer 430, with the partial solution X3_d. The node 400 compares the energy values corresponding to the solutions c1, c4, c6, and c8 and to the four solution candidates with each other, and updates the solutions c1, c4, c6, and c8 held in the solution buffer 430 to a solution d5, the solution c4, a solution d6, and the solution c8. The solutions d5 and d6 are solutions obtained by replacing the part of the state variable group X3 for the respective solutions c1 and c6 with the partial solution X3_d.

The node 100 transmits the solution d1 corresponding to the smallest energy value among the solutions d0, d1, c6, and c8 and the energy value corresponding to the solution d1 to the nodes 200, 300, and 400. Upon receiving the solution d1, the nodes 200, 300, and 400 compare the energy value corresponding to the solution d1 with the energy values corresponding to the solutions held in their solution buffers, and preferentially hold the four of the solutions in ascending order of energy values.

The node 200 transmits the solution d2 corresponding to the smallest energy value among the solutions d2, c4, c6, and c8 and the energy value corresponding to the solution d2 to the nodes 100, 300, and 400. Upon receiving the solution d2, the nodes 100, 300, and 400 compare the energy value corresponding to the solution d2 with the energy values corresponding to the solutions held in their solution buffers, and preferentially hold the four of the solutions in ascending order of energy values.

The node 300 transmits the solution d4 corresponding to the smallest energy value among the solutions d3, c4, c6, and d4 and the energy value corresponding to the solution d4 to the nodes 100, 200, and 400. Upon receiving the solution d4, the nodes 100, 200, and 400 compare the energy value corresponding to the solution d4 with the energy values corresponding to the solutions held in their solution buffers, and preferentially hold the four of the solutions in ascending order of energy values.

The node 400 transmits the solution d6 corresponding to the smallest energy value among the solutions d5, c4, d6, and c8 and the energy value corresponding to the solution d6 to the nodes 100, 200, and 300. Upon receiving the solution d6, the nodes 100, 200, and 300 compare the energy value corresponding to the solution d6 with the energy values corresponding to the solutions held in their solution buffers, and preferentially hold the four of the solutions in ascending order of energy values.

As a result, for example, the solutions d1, d2, d4, and d6 are shared among the nodes 100, 200, 300, and 400.

The nodes 100, 200, 300, and 400 repeatedly update the solutions in the solution buffers thereafter, and output the solutions finally held in their solution buffers to the control device 50. Only a representative node of the nodes 100, 200, 300, and 400 may output the final solution to the control device 50. The final solution output to the control device 50 may be a solution corresponding to the smallest energy value held in each node, for example, the best solution, or may be all the solutions or a predetermined number of solutions in ascending order of energy values held in each node.

The flows for updating each solution buffer illustrated in FIGS. 19 to 22 are an example, and each of the nodes 100, 200, 300, and 400 may solve a subproblem in the node and transmit a solution from the node to other nodes asynchronously with the other nodes.

With the method illustrated in FIG. 15 and FIGS. 19 to 22, the nodes 100, 200, 300, and 400 evaluate the solution candidates as a result of replacement with the partial solution for all the solutions in the solution buffer of each node. Thus, there is an advantage in that the search result is likely to be quickly reflected on many good solutions.

In the above described example, the solution candidate is generated by replacing, with a partial solution found by each node, a part corresponding to the partial solution in the solution buffer of the node, and a solution in the solution buffer is replaced with the solution candidate. Alternatively, the solutions in the solution buffer may be updated by other methods.

For example, the nodes 100, 200, 300, and 400 may use as the solution candidates, solutions including the partial solutions obtained by their search units and values of the state variables handled by other nodes that are fixed for obtaining the partial solutions, to update the solutions in their solution buffers. In this case, each node obtains one solution candidate for one partial solution for the node. In order to obtain the energy value corresponding to the solution candidate, for example, the search control unit 160 may cause the data storage unit 120 to store the solution used for fixing the variables for the search and the energy value corresponding to the solution. For example, the search control unit 160 compares the energy value corresponding to the solution candidate with the energy values corresponding to the solutions held in the solution buffer 130, and when the energy value corresponding to the solution candidate is larger than the energy value corresponding to the worst solution held in the solution buffer 130, replaces the worst solution with the solution candidate. Next, an example of a procedure for thus updating the solutions in the solution buffers will be described.

Figure 23:
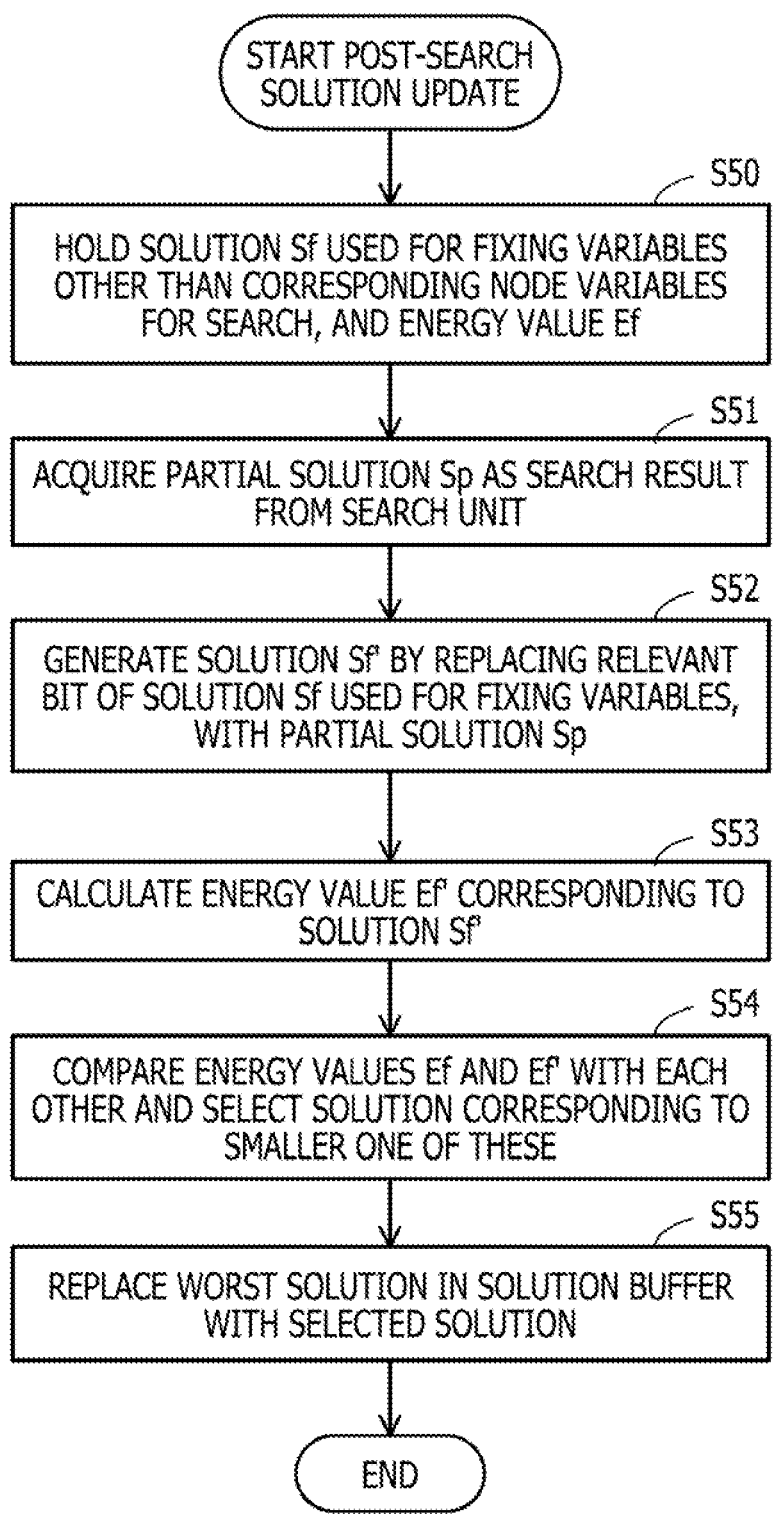
FIG. 23 is a flowchart illustrating a second example of post-search solution update.

FIG. 23 is a flowchart illustrating a second example of post-search solution update.

The processing of post-search solution update corresponds to step S2. The procedure illustrated in FIG. 23 is executed in place of the procedure of FIG. 15.

(S50) The search control unit 160 causes the data storage unit 120 to store a solution Sf used for fixing the variables other than corresponding node variables for the search, and an energy value Ef corresponding to the solution Sf. The corresponding node variables are state variables included in the state variable group handled by the node 100.

(S51) The search control unit 160 acquires a partial solution Sp as a search result from the search unit 140.

(S52) The search control unit 160 generates a solution Sf' by replacing the relevant bit of the solution Sf used for fixing the variables, with the partial solution Sp.

(S53) The search control unit 160 calculates an energy value Ef' corresponding to the solution Sf'. The method described with reference to FIG. 9 may be used for calculating the energy value Ef'.

(S54) The search control unit 160 compares the energy values Ef and Ef' with each other and selects a solution corresponding to the smaller one of these.

(S55) The search control unit 160 replaces the worst solution in the solution buffer 130 with the solution selected in step S54. The search control unit 160 then ends the processing of post-search solution update.

The search unit 140 may update the energy value corresponding to the current state based on Equation (5) in response to a change in the value of the state variable. In this case, the search control unit 160 may acquire the energy value Ef from the search unit 140 in step S53.

Next, an example of updating solutions held in each of the solution buffers 130, 230, 330, and 430 based on the procedures illustrated in FIGS. 16 to 18 and FIG. 23 will be described.

Figure 24:
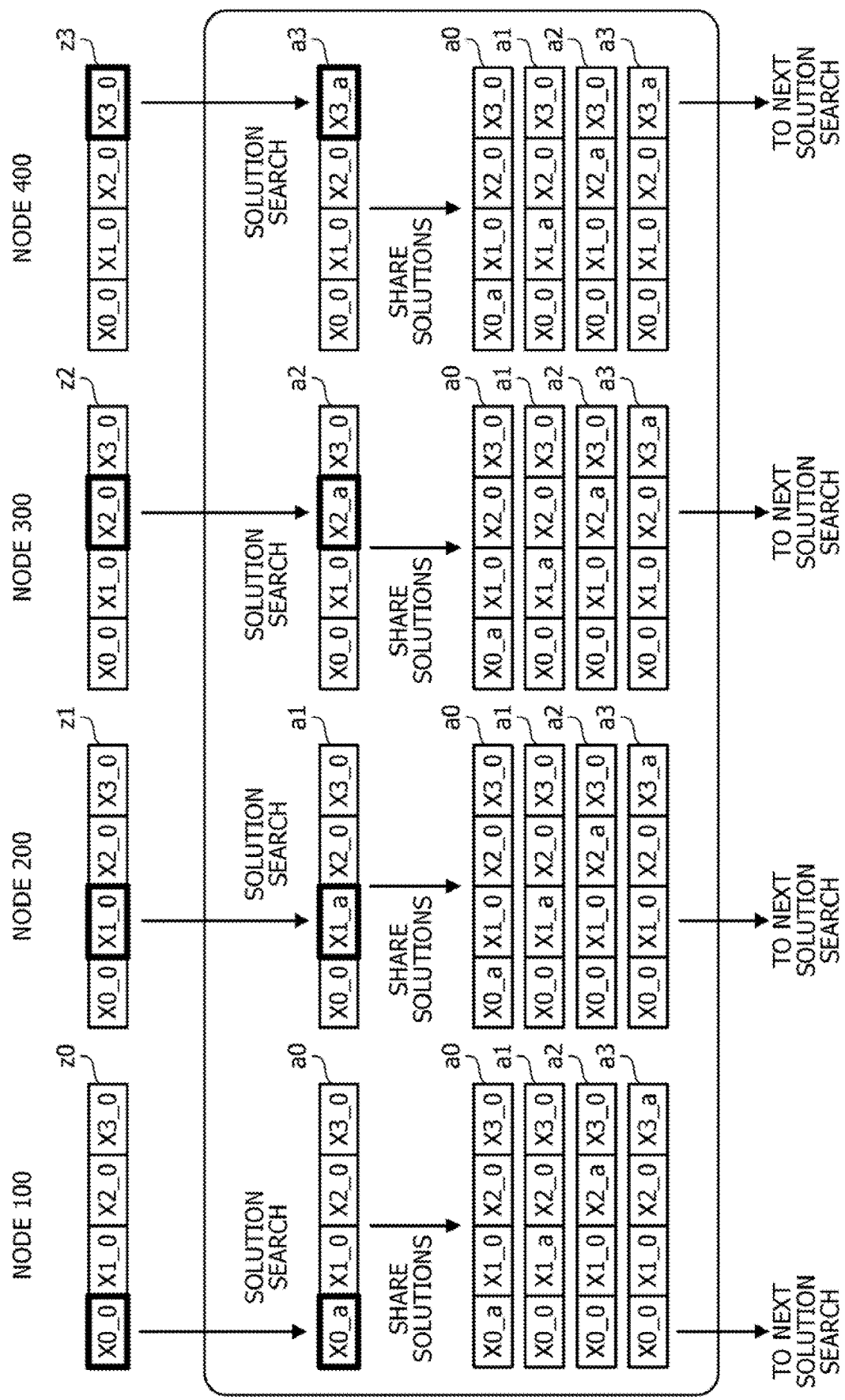
FIG. 24 is a diagram illustrating a second example of how the solutions held in the solution buffers are updated.

FIG. 24 is a diagram illustrating a second example of how the solutions held in the solution buffers are updated.

Initial solutions z0, z1, z2, and z3 are solutions initially held respectively in the nodes 100, 200, 300, and 400. The initial solutions z0, z1, z2, and z3 may be the same or different from each other. In the example of FIG. 24, the initial solutions z0, z1, z2, and z3 are the same, and are each "X0_0, X1_0, X2_0, X3_0". In the initial stage, no solutions are held in the solution buffers 130, 230, 330, and 430. The energy values are stored in the solution buffers 130, 230, 330, and 430 together with the solutions, but the energy values corresponding to the solutions may be omitted in the figure. The number of solutions held in each of the solution buffers 130, 230, 330, and 430 is four.

The node 100 obtains a partial solution X0_a represented by the state variable group X0 by searching for a solution to the subproblem assigned to the node 100. The node 100 generates a solution a0 by replacing the part of the state variable group X0 for the initial solution z0 with the partial solution X0_a, and stores the solution a0 in the solution buffer 130.

The node 200 obtains a partial solution X1_a represented by the state variable group X1 by searching for a solution to the subproblem assigned to the node 200. The node 200 generates a solution a1 by replacing the part of the state variable group X1 for the initial solution z1 with the partial solution X1_a, and stores the solution a1 in the solution buffer 230.

The node 300 obtains a partial solution X2_a represented by the state variable group X2 by searching for a solution to the subproblem assigned to the node 300. The node 300 generates a solution a2 by replacing the part of the state variable group X2 for the initial solution z2 with the partial solution X2_a, and stores the solution a2 in the solution buffer 330.

The node 400 obtains a partial solution X3_a represented by the state variable group X3 by searching for a solution to the subproblem assigned to the node 400. The node 400 generates a solution a3 by replacing the part of the state variable group X3 for the initial solution z3 with the partial solution X3_a, and stores the solution a3 in the solution buffer 430.

The node 100 transmits the solution a0 and the energy value corresponding to the solution a0 to the nodes 200, 300, and 400. The nodes 200, 300, and 400 receive the solution a0 and the energy value corresponding to the solution a0, and store the solution and the energy value in their solution buffers.

The node 200 transmits the solution a1 and the energy value corresponding to the solution a1 to the nodes 100, 300, and 400. The nodes 100, 300, and 400 receive the solution a1 and the energy value corresponding to the solution a1, and store the solution and the energy value in their solution buffers.

The node 300 transmits the solution a2 and the energy value corresponding to the solution a2 to the nodes 100, 200, and 400. The nodes 100, 200, and 400 receive the solution a2 and the energy value corresponding to the solution a2, and store the solution and the energy value in their solution buffers.

The node 400 transmits the solution a3 and the energy value corresponding to the solution a3 to the nodes 100, 200, and 300. The nodes 100, 200, and 300 receive the solution a3 and the energy value corresponding to the solution a3, and store the solution and the energy value in their solution buffers.

As a result, the solutions a0 to a3 are shared among the nodes 100, 200, 300, and 400. These solutions in ascending order of energy values are the solutions a0, a1, a2, and a3. Among the solutions a0 to a3, the solution a0 is the best solution. Among the solutions a0 to a3, the solution a3 is the worst solution.

For example, the nodes 100, 200, 300, and 400 fix, based on the best solution a0 held in their solution buffers, the state variables handled by the other nodes, and proceed to the search for the next solution.

Figure 25:
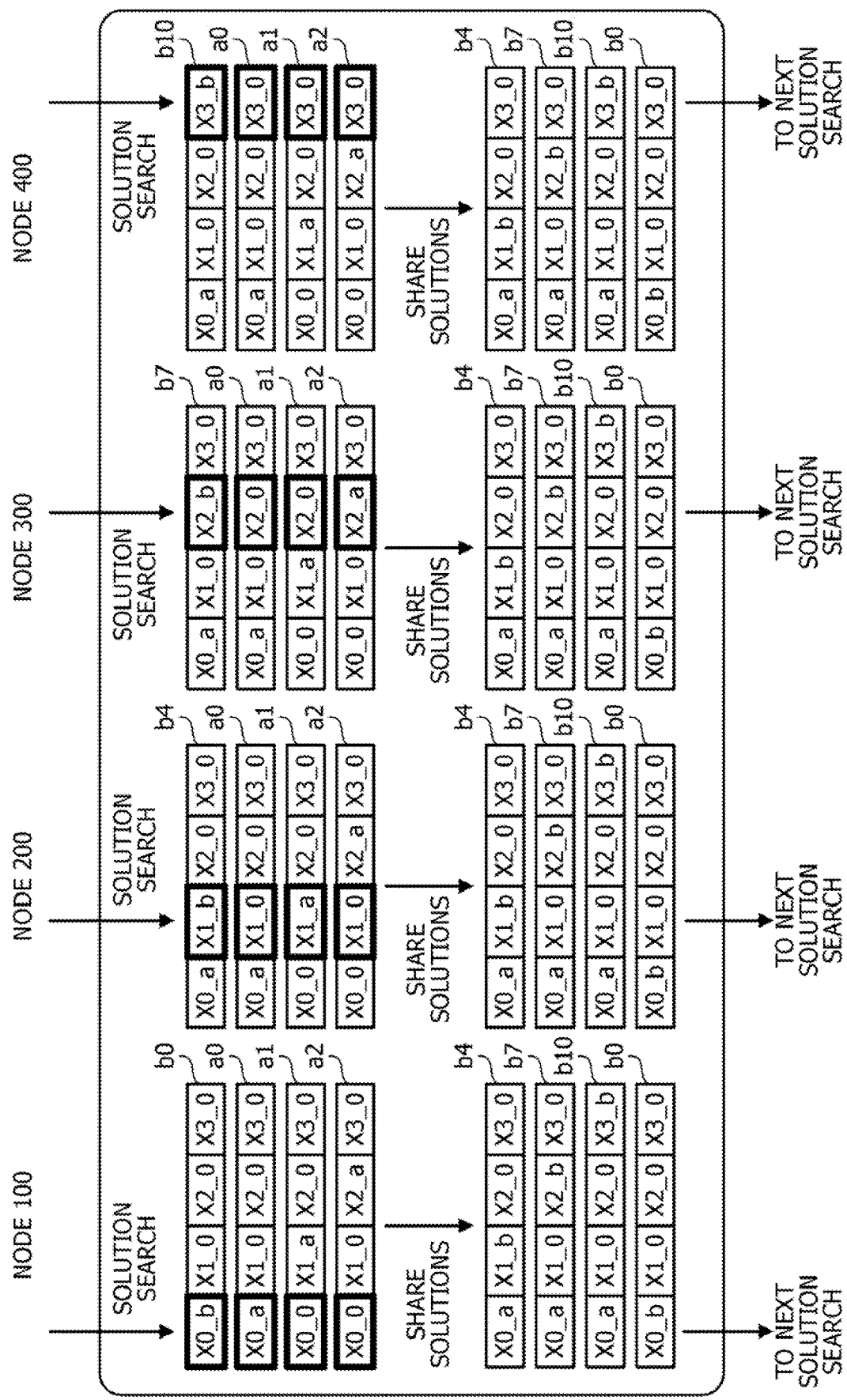
FIG. 25 is a diagram illustrating (continuation of) the second example of how the solutions held in the solution buffers are updated.

FIG. 25 is a diagram illustrating (continuation of) the second example of how the solutions held in the solution buffers are updated.

The node 100 obtains a partial solution X0_b by searching for a solution to the subproblem. The node 100 generates a solution b0 by replacing a part of the state variable group X0 for the solution a0 with the partial solution X0_b. The solution b0 Is one example of the solution candidate obtained by replacing a part of the state variable group handled by the corresponding node for the solution a0 used for fixing the variables, with the partial solution obtained by the corresponding node. The node 100 compares the energy values corresponding to the solutions a0 to a3 and b0 with each other, and updates the solutions a0 to a3 held in the solution buffer 130 to the solutions b0 and a0 to a2. For example, the node 100 replaces the solution a3 in the solution buffer 130 with the solution b0. The node 100 may also replace the solution a3 with the solution b0 when the energy value corresponding to the solution b0 is smaller than the energy value corresponding to the solution a0, and may otherwise replace the solution a3 with the solution a0. The same applies to the nodes 200, 300, and 400.

The node 200 obtains a partial solution X1_b by searching for a solution to the subproblem. The node 200 generates a solution b4 by replacing a part of the state variable group X1 for the solution a0 with the partial solution X1_b. The node 200 compares the energy values corresponding to the solutions a0 to a3 and b4 with each other, and updates the solutions a0 to a3 held in the solution buffer 230 to the solutions b4 and a0 to a2. For example, the node 200 replaces the solution a3 in the solution buffer 230 with the solution b4.

The node 300 obtains a partial solution X2_b by searching for a solution to the subproblem. The node 300 generates a solution b7 by replacing a part of the state variable group X2 for the solution a0 with the partial solution X2_b. The node 300 compares the energy values corresponding to the solutions a0 to a3 and b7 with each other, and updates the solutions a0 to a3 held in the solution buffer 330 to the solutions b7 and a0 to a2. For example, the node 300 replaces the solution a3 in the solution buffer 330 with the solution b7.

The node 400 obtains a partial solution X3_b by searching for a solution to the subproblem. The node 400 generates a solution b10 by replacing a part of the state variable group X3 for the solution a0 with the partial solution X3_b. The node 400 compares the energy values corresponding to the solutions a0 to a3 and b10 with each other, and updates the solutions a0 to a3 held in the solution buffer 430 to the solutions b10 and a0 to a2. For example, the node 400 replaces the solution a3 in the solution buffer 430 with the solution b10.

The node 100 transmits the solution b0 corresponding to the smallest energy value among the solutions b0 and a0 to a2 and the energy value corresponding to the solution b0 to the nodes 200, 300, and 400. Alternatively, as described above, the node 100 may transmit a predetermined number of solutions in ascending order of energy values and the energy values corresponding to the solutions to the nodes 200, 300, and 400. The same applies to the nodes 200, 300, and 400. Upon receiving the solution b0, the nodes 200, 300, and 400 compare the energy value corresponding to the solution b0 with the energy values corresponding to the solutions held in their solution buffers, and preferentially hold the four of the solutions in ascending order of energy values.

The node 200 transmits the solution b4 corresponding to the smallest energy value among the solutions b4 and a0 to a2 and the energy value corresponding to the solution b4 to the nodes 100, 300, and 400. Upon receiving the solution b4, the nodes 100, 300, and 400 compare the energy value corresponding to the solution b4 with the energy values corresponding to the solutions held in their solution buffers, and preferentially hold the four of the solutions in ascending order of energy values.

The node 300 transmits the solution b7 corresponding to the smallest energy value among the solutions b7 and a0 to a2 and the energy value corresponding to the solution b7 to the nodes 100, 200, and 400. Upon receiving the solution b7, the nodes 100, 200, and 400 compare the energy value corresponding to the solution b7 with the energy values corresponding to the solutions held in their solution buffers, and preferentially hold the four of the solutions in ascending order of energy values.

The node 400 transmits the solution b10 corresponding to the smallest energy value among the solutions b10 and a0 to a2 and the energy value corresponding to the solution b10 to the nodes 100, 200, and 300. Upon receiving the solution b10, the nodes 100, 200, and 300 compare the energy value corresponding to the solution b10 with the energy values corresponding to the solutions held in their solution buffers, and preferentially hold the four of the solutions in ascending order of energy values.

As a result, for example, the solutions b4, b7, b10, and b0 are shared among the nodes 100, 200, 300, and 400. These solutions in ascending order of energy values are the solutions b4, b7, b10, and b0. Among the solutions b4, b7, b10, and b0, the solution b4 is the best solution. Among the solutions b4, b7, b10, and b0, the solution b0 is the worst solution.

For example, the nodes 100, 200, 300, and 400 fix, based on the best solution b4 held in their solution buffers, the state variables handled by the other nodes, and proceed to the search for the next solution.

Figure 26:
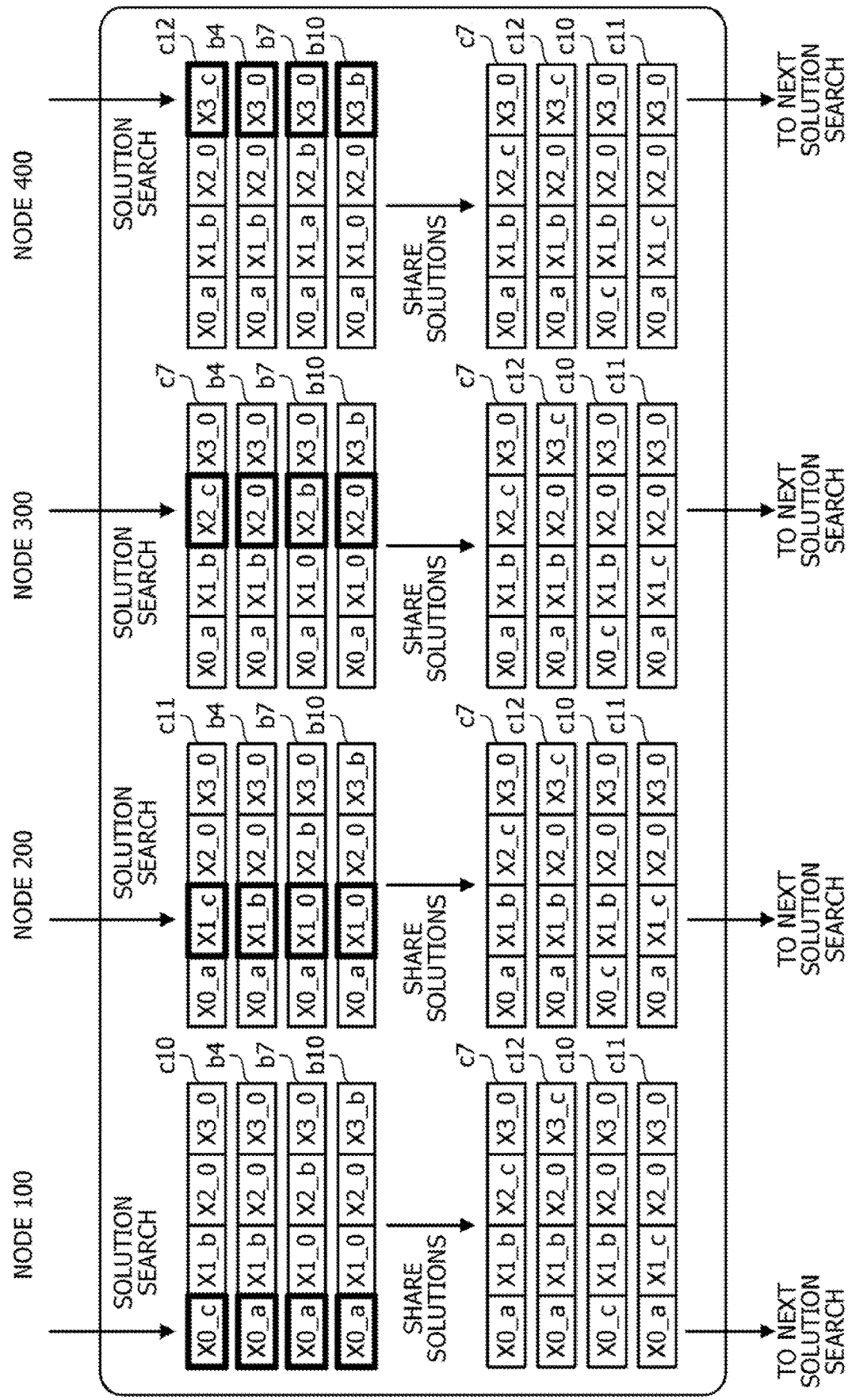
FIG. 26 is a diagram illustrating (continuation of) the second example of how the solutions held in the solution buffers are updated.

FIG. 26 is a diagram illustrating (continuation of) the second example of how the solutions held in the solution buffers are updated.

The node 100 obtains a partial solution X0_c by searching for a solution to the subproblem. The node 100 generates a solution c10 by replacing a part of the state variable group X0 for the solution b4 with the partial solution X0_c. The node 100 compares the energy values corresponding to the solutions b4, b7, b10, b0, and c10 with each other, and updates the solutions b4, b7, b10, and b0 held in the solution buffer 130 to the solutions c10, b4, b7, and b10. For example, the node 100 replaces the solution b0 in the solution buffer 130 with the solution c10.

The node 200 obtains a partial solution X1_S by searching for a solution to the subproblem. The node 200 generates a solution c11 by replacing a part of the state variable group X1 for the solution b4 with the partial solution X1_c. The node 200 compares the energy values corresponding to the solutions b4, b7, b10, b0, and c11 with each other, and updates the solutions b4, b7, b10, and b0 held in the solution buffer 230 to the solutions c11, b4, b7, and b10. For example, the node 200 replaces the solution b0 in the solution buffer 230 with the solution c11.

The node 300 obtains a partial solution X2_c by searching for a solution to the subproblem. The node 300 generates a solution c7 by replacing a part of the state variable group X2 for the solution b4 with the partial solution X2_c. The node 300 compares the energy values corresponding to the solutions b4, b7, b10, b0, and c7 with each other, and updates the solutions b4, b7, b10, and b0 held in the solution buffer 330 to the solutions c7, b4, b7, and b10. For example, the node 300 replaces the solution b0 in the solution buffer 330 with the solution c7.

The node 400 obtains a partial solution X3_c by searching for a solution to the subproblem. The node 400 generates a solution c12 by replacing a part of the state variable group X3 for the solution b4 with the partial solution X3_c. The node 400 compares the energy values corresponding to the solutions b4, b7, b10, b0, and c12 with each other, and updates the solutions b4, b7, b10, and b0 held in the solution buffer 430 to the solutions c12, b4, b7, and b10. For example, the node 400 replaces the solution b0 in the solution buffer 430 with the solution c12.

The node 100 transmits the solution c10 corresponding to the smallest energy value among the solutions c10, b4, b7, and b10 and the energy value corresponding to the solution c10 to the nodes 200, 300, and 400. Upon receiving the solution c10, the nodes 200, 300, and 400 compare the energy value corresponding to the solution c10 with the energy values corresponding to the solutions held in their solution buffers, and preferentially hold the four of the solutions in ascending order of energy values.

The node 200 transmits the solution c1l corresponding to the smallest energy value among the solutions c11, b4, b7, and b10 and the energy value corresponding to the solution c11 to the nodes 100, 300, and 400. Upon receiving the solution c11, the nodes 100, 300, and 400 compare the energy value corresponding to the solution c11 with the energy values corresponding to the solutions held in their solution buffers, and preferentially hold the four of the solutions in ascending order of energy values.

The node 300 transmits the solution c7 corresponding to the smallest energy value among the solutions c7, b4, b7, and b10 and the energy value corresponding to the solution c7 to the nodes 100, 200, and 400. Upon receiving the solution c7, the nodes 100, 200, and 400 compare the energy value corresponding to the solution c7 with the energy values corresponding to the solutions held in their solution buffers, and preferentially hold the four of the solutions in ascending order of energy values.

The node 400 transmits the solution c12 corresponding to the smallest energy value among the solutions c12, b4, b7, and b10 and the energy value corresponding to the solution c12 to the nodes 100, 200, and 300. Upon receiving the solution c12, the nodes 100, 200, and 300 compare the energy value corresponding to the solution c12 with the energy values corresponding to the solutions held in their solution buffers, and preferentially hold the four of the solutions in ascending order of energy values.

As a result, for example, the solutions c7, c12, c10, and c1l are shared among the nodes 100, 200, 300, and 400. These solutions in ascending order of energy values are the solutions c7, c12, c10, and c11. Among the solutions c7, c12, c10, and c11, the solution c7 is the best solution. Among the solutions c7, c12, c10, and c1i, the solution c11 is the worst solution.

For example, the nodes 100, 200, 300, and 400 fix, based on the best solution c7 held in their solution buffers, the state variables handled by the other nodes, and proceed to the search for the next solution.

Figure 27:
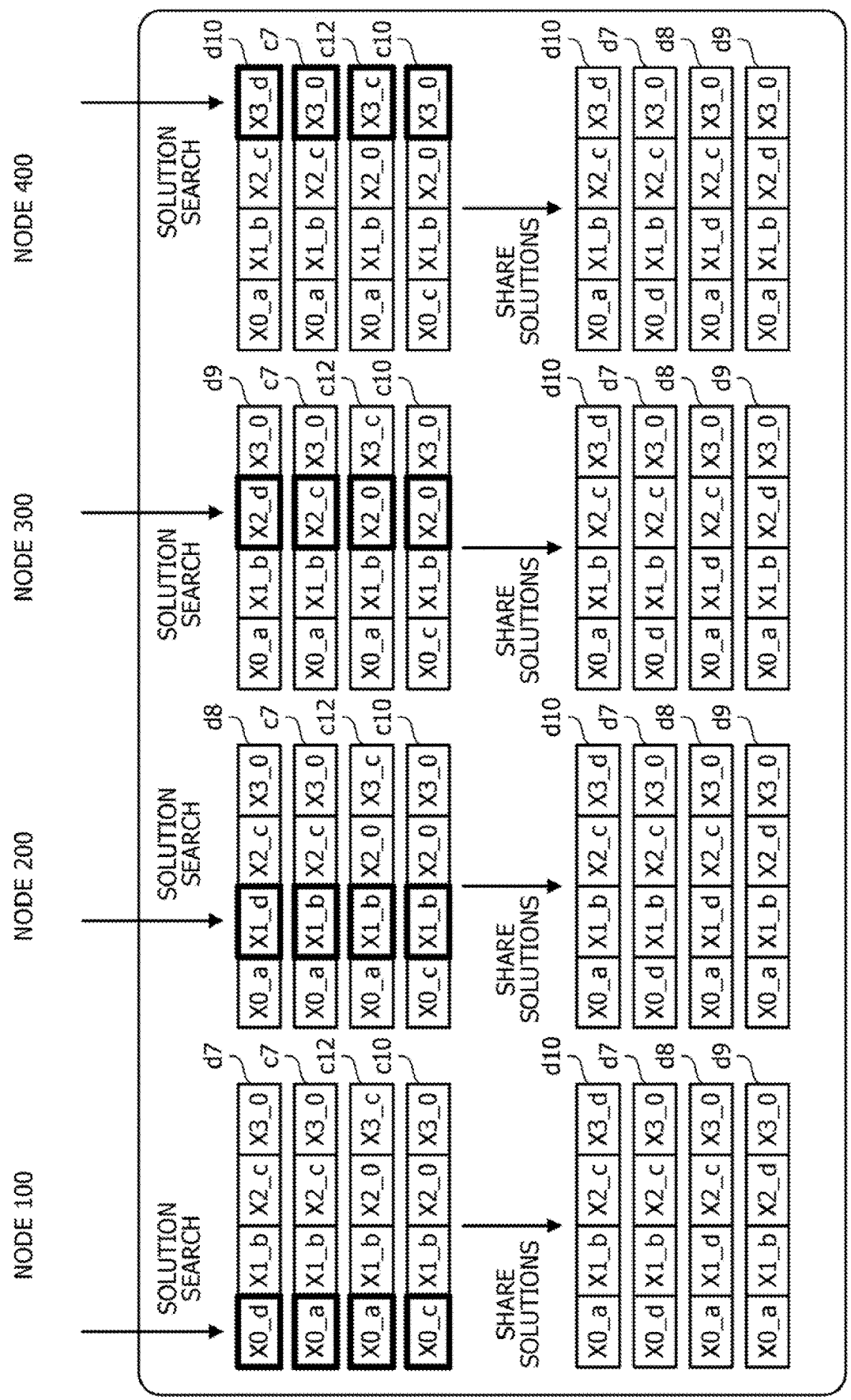
FIG. 27 is a diagram illustrating (continuation of) the second example of how the solutions held in the solution buffers are updated.

FIG. 27 is a diagram illustrating (continuation of) the second example of how the solutions held in the solution buffers are updated.

The node 100 obtains a partial solution X0_d by searching for a solution to the subproblem. The node 100 generates a solution d7 by replacing a part of the state variable group X0 for the solution c7 with the partial solution X0_d. The node 100 compares the energy values corresponding to the solutions c7, c12, c10, c1l, and d7 with each other, and updates the solutions c7, c12, c10, and c1i held in the solution buffer 130 to the solutions d7, c7, c12, and c10. For example, the node 100 replaces the solution c1i in the solution buffer 130 with the solution d7.

The node 200 obtains a partial solution X1_d by searching for a solution to the subproblem. The node 200 generates a solution d8 by replacing a part of the state variable group X1 for the solution c7 with the partial solution X1_d. The node 200 compares the energy values corresponding to the solutions c7, c12, c10, c1i, and d8 with each other, and updates the solutions c7, c12, c10, and c11 held in the solution buffer 230 to the solutions d8, c7, c12, and c10. For example, the node 200 replaces the solution c11 in the solution buffer 230 with the solution d8.

The node 300 obtains a partial solution X2_d by searching for a solution to the subproblem. The node 300 generates a solution d9 by replacing a part of the state variable group X2 for the solution c7 with the partial solution X2_d. The node 300 compares the energy values corresponding to the solutions c7, c12, c10, c11, and d9 with each other, and updates the solutions c7, c12, c10, and c11 held in the solution buffer 330 to the solutions d9, c7, c12, and c10. For example, the node 300 replaces the solution c11 in the solution buffer 330 with the solution d9.

The node 400 obtains a partial solution X3_d by searching for a solution to the subproblem. The node 400 generates a solution d10 by replacing a part of the state variable group X3 for the solution c7 with the partial solution X3_d. The node 400 compares the energy values corresponding to the solutions c7, c12, c10, c11, and d10 with each other, and updates the solutions c7, c12, c10, and c11 held in the solution buffer 430 to the solutions d10, c7, c12, and c10. For example, the node 400 replaces the solution c11 in the solution buffer 430 with the solution d10.

The node 100 transmits the solution d7 corresponding to the smallest energy value among the solutions d7, c7, c12, and c10 and the energy value corresponding to the solution d7 to the nodes 200, 300, and 400. Upon receiving the solution d7, the nodes 200, 300, and 400 compare the energy value corresponding to the solution d7 with the energy values corresponding to the solutions held in their solution buffers, and preferentially hold the four of the solutions in ascending order of energy values.

The node 200 transmits the solution d8 corresponding to the smallest energy value among the solutions d8, c7, c12, and c10 and the energy value corresponding to the solution d8 to the nodes 100, 300, and 400. Upon receiving the solution d8, the nodes 100, 300, and 400 compare the energy value corresponding to the solution d8 with the energy values corresponding to the solutions held in their solution buffers, and preferentially hold the four of the solutions in ascending order of energy values.

The node 300 transmits the solution d9 corresponding to the smallest energy value among the solutions d9, c7, c12, and c10 and the energy value corresponding to the solution d9 to the nodes 100, 200, and 400. Upon receiving the solution d9, the nodes 100, 200, and 400 compare the energy value corresponding to the solution d9 with the energy values corresponding to the solutions held in their solution buffers, and preferentially hold the four of the solutions in ascending order of energy values.

The node 400 transmits the solution d10 corresponding to the smallest energy value among the solutions d10, c7, c12, and c10 and the energy value corresponding to the solution d10 to the nodes 100, 200, and 300. Upon receiving the solution d10, the nodes 100, 200, and 300 compare the energy value corresponding to the solution d10 with the energy values corresponding to the solutions held in their solution buffers, and preferentially hold the four of the solutions in ascending order of energy values.

As a result, for example, the solutions d10, d7, d8, and d9 are shared among the nodes 100, 200, 300, and 400.

The nodes 100, 200, 300, and 400 repeatedly update the solutions in the solution buffers thereafter, and output the solutions finally held in their solution buffers to the control device 50. Only a representative node of the nodes 100, 200, 300, and 400 may output the final solution to the control device 50. The final solution output to the control device 50 may be a solution corresponding to the smallest energy value held in each node, for example, the best solution, or may be all the solutions or a predetermined number of solutions in ascending order of energy values held in each node.

The flows for updating each solution buffer illustrated in FIGS. 24 to 27 are an example, and each of the nodes 100, 200, 300, and 400 may solve a subproblem in the node and transmit a solution from the node to other nodes asynchronously with the other nodes.

With the method illustrated in FIGS. 23 to 27, the nodes 100, 200, 300, and 400 only operate the best solution and update the partial solutions corresponding to the state variable groups they handle. Thus, there is an advantage in that solutions are less likely to be changed to a worse solution. Causing the search unit of each node to update energy values provides an advantage in that the energy values corresponding to solution candidates may be acquired by the search unit, and the search control unit 160 does not have to recalculate the energy values corresponding to the solution candidates when each node updates its solution buffer.

An example in which subproblems are assigned such that the state variable groups handled by the nodes 100, 200, 300, and 400 do not overlap each other has been described, but some of the state variable groups handled by the respective nodes may overlap each other as described below.

Figure 28:
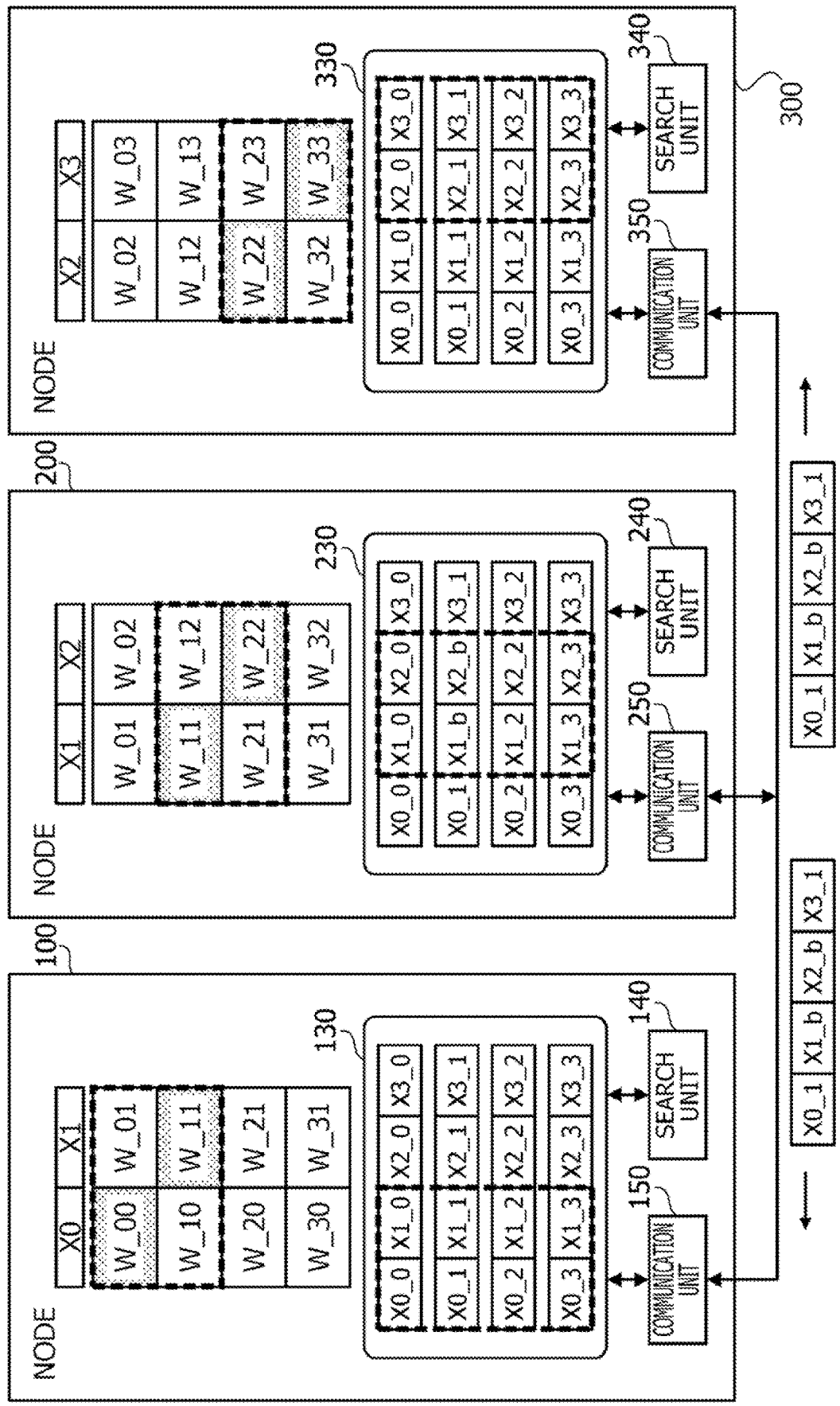
FIG. 28 is a diagram illustrating an example of how a problem is divided into subproblems.

FIG. 28 is a diagram illustrating an example of how a problem is divided into subproblems.

For example, the control device 50 divides the entire problem represented by the state variable groups X0, X1, X2, and X3 into three subproblems, and assigns the three subproblems to the nodes 100, 200, and 300. The state variable groups X0 and X1 are assigned to the node 100. The state variable groups X1 and X2 are assigned to the node 200. The state variable groups X2 and X3 are assigned to the node 300.

In this case, the node 100 holds weight coefficient groups W_00, W_10, W_20, W_30, W_01, W_11, W_21, and W_31, and uses them for a search for a solution to the subproblem. The solution to the subproblem assigned to the node 100, for example, the partial solution is represented by the state variables in the state variable groups X0 and X1. For example, the search unit 140 holds the weight coefficient groups W_00, W_10, W_01, and W_11 in the local memory of the search unit 140, and uses them for the search.

The node 200 holds weight coefficient groups W_01, W_11, W_21, W_31, W_02, W_12, W_22, and W_32, and uses them for a search for a solution to the subproblem. The solution to the subproblem assigned to the node 200, for example, the partial solution is represented by the state variables in the state variable groups X1 and X2. For example, the search unit 240 holds the weight coefficient groups W_11, W_21, W_12, and W_22 in the local memory of the search unit 240, and uses them for the search.

The node 300 holds weight coefficient groups W_02, W_12, W_22, W_32, W_03, W_13, W_23, and W_33, and uses them for a search for a solution to the subproblem. The solution to the subproblem assigned to the node 300, for example, the partial solution is represented by the state variables in the state variable groups X2 and X3. For example, the search unit 340 holds the weight coefficient groups W_22, W_32, W_23, and W_33 in the local memory of the search unit 340, and uses them for the search.

In FIG. 28, the energy values stored in the solution buffers 130, 230, and 330 and the search control units 160, 260, and 360 are not illustrated. The solutions and the energy values in the solution buffers 130, 230, and 330 may be updated by the search control units 160, 260, and 360, respectively.

For example, the node 200 acquires the partial solution "X1_b, X2_b" as a result of the search by the search unit 240, and stores the solution "X0_1, X1_b, X2_b, X3_1" including the partial solution "X1_b, X2_b" and the energy value corresponding to the solution in the solution buffer 230. The solution "X0_1, X1_b, X2_b, X3_1" is a solution corresponding to the smallest energy value in the solution buffer 230. The node 200 transmits the solution "X0_, X1_b, X2_b, X3_1" and the energy value corresponding to the solution to the nodes 100 and 300.

The node 100 receives the solution "X0_1, X1_b, X2_b, X3_1" and the energy value corresponding to the solution from the node 200, and replaces a solution held in the solution buffer 130 with the received solution in accordance with comparison between the energy value and the energy values corresponding to the solutions held in the solution buffer 130.

The node 300 receives the solution "X0_, X1_b, X2_b, X3_1" and the energy value corresponding to the solution from the node 200, and replaces a solution held in the solution buffer 330 with the received solution in accordance with comparison between the energy value and the energy values corresponding to the solutions held in the solution buffer 330.

The state variable groups handled by the respective nodes 100, 200, and 300 may partially overlap in this manner.

Each node may include a plurality of search units. Next, an example in which the node 100 includes a plurality of search units will be described.

Figure 29:
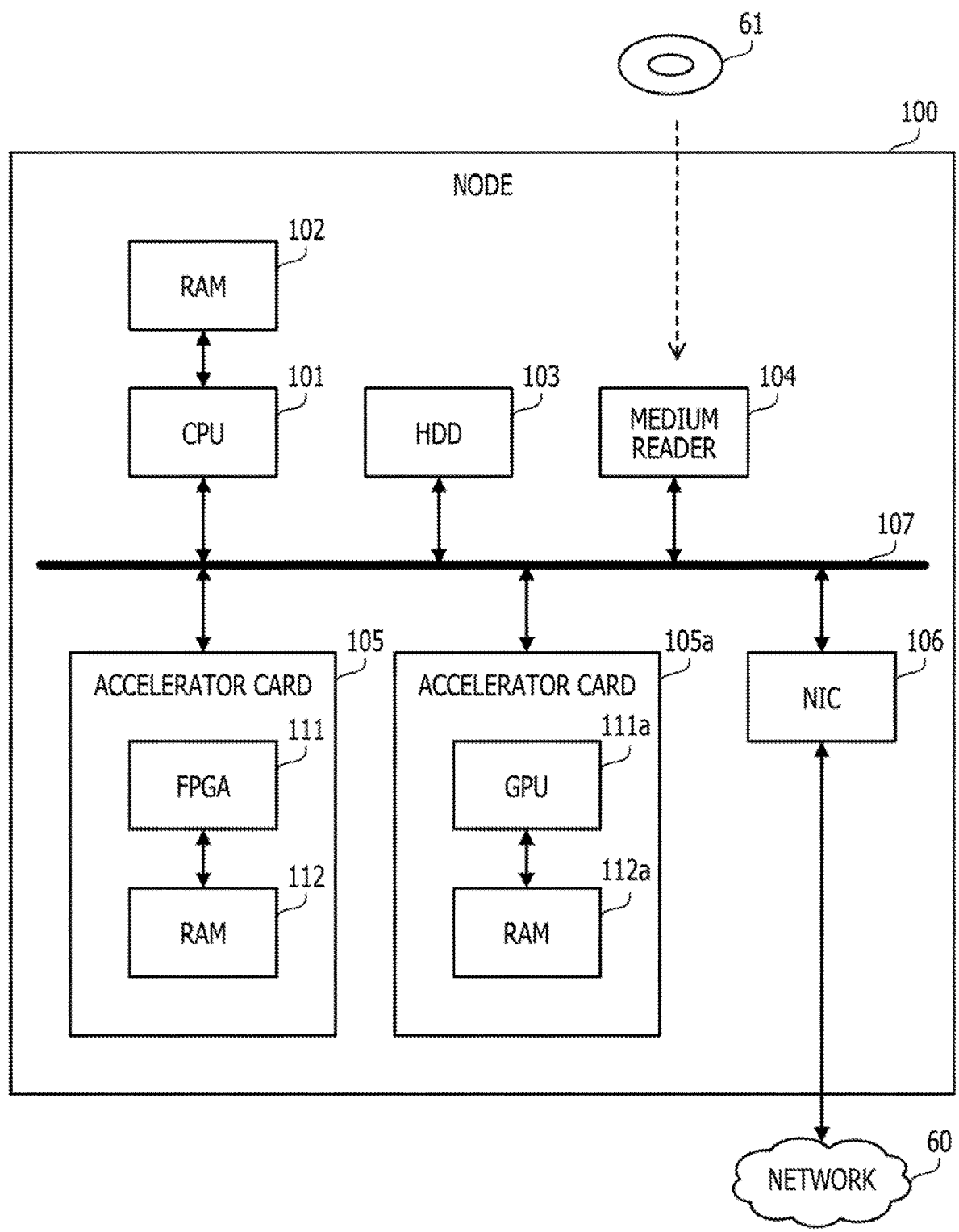
FIG. 29 is a diagram illustrating another hardware example of the nodes.

FIG. 29 is a diagram illustrating another hardware example of the nodes.

For example, the node 100 may further include an accelerator card 105a in addition to the hardware illustrated in FIG. 4. Like the accelerator card 105, the accelerator card 105a is a hardware accelerator that searches for a solution to a problem represented by the energy function of the Ising model.

The accelerator card 105a includes a GPU 111a and an RAM 112a. The GPU 111a implements a search function in the accelerator card 105a. The search function may be implemented by another type of integrated circuit such as an FPGA or an ASIC. The RAM 112a stores data used for the search by the GPU 111a and the solution to the subproblem found by the GPU 111a.

The accelerator card 105a may use the same search method as the method used by the accelerator card 105 or may use a search method difference from the method used by the accelerator card 105a. For example, the accelerator card 105 may use SA, whereas the accelerator card 105a may use tabu search. The node 100 may include three or more accelerator cards.

Figure 30:
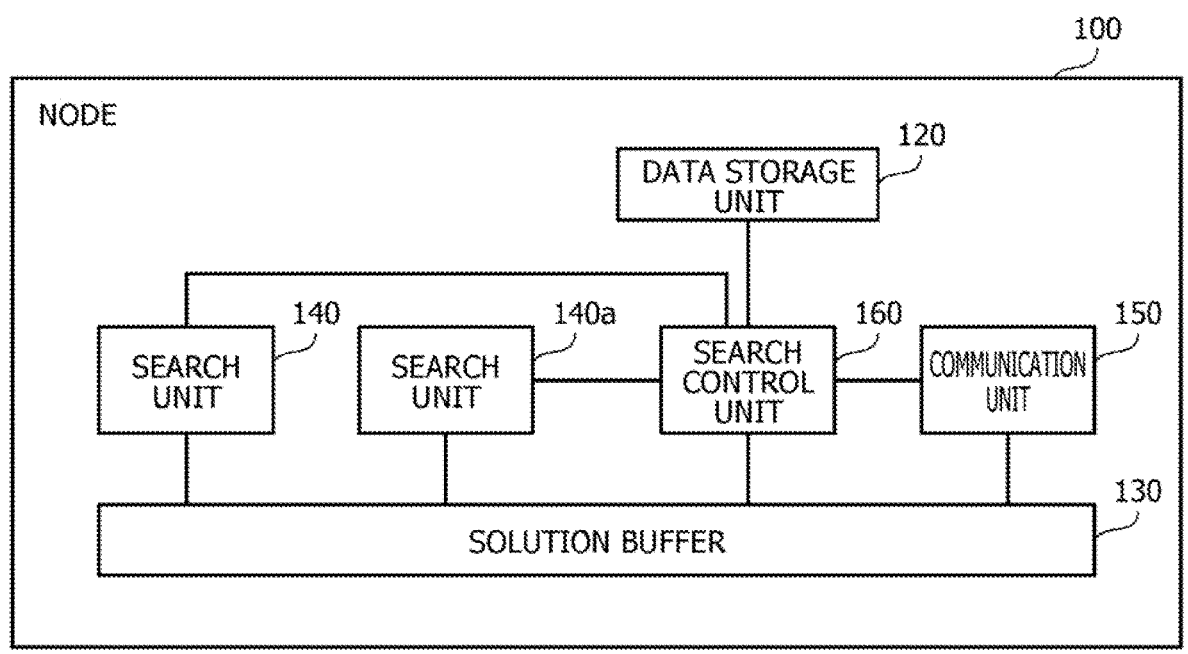
FIG. 30 is a diagram illustrating another example of functions of the nodes.
Figure 31:
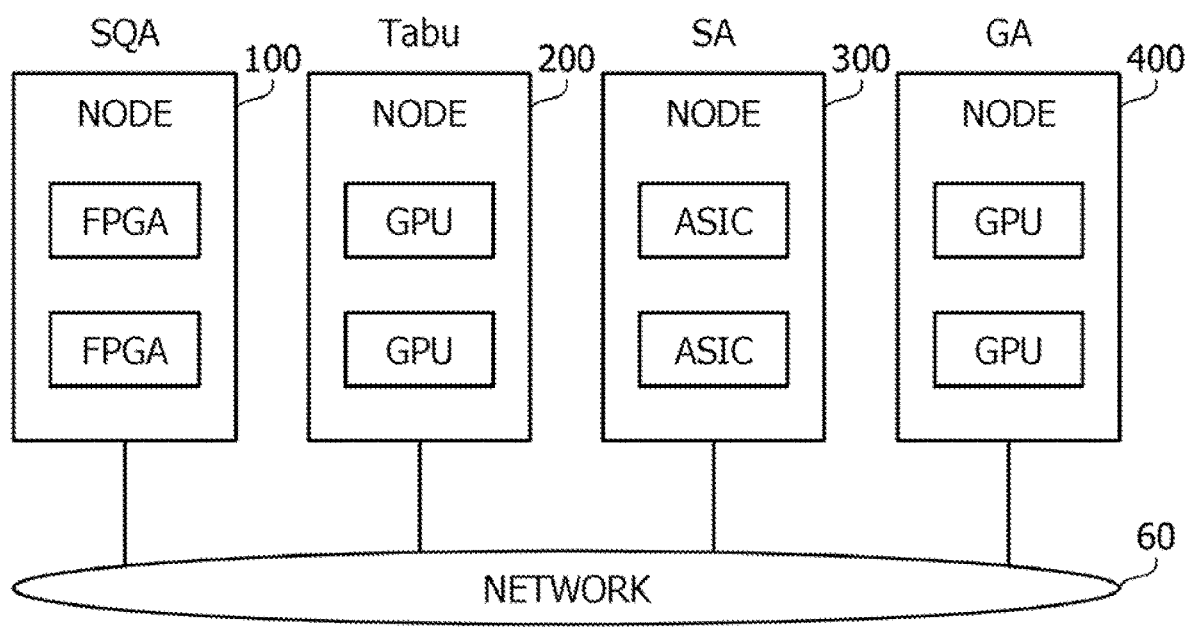
FIG. 31 is a diagram illustrating an example of an information processing system using a plurality of search methods.

FIG. 30 is a diagram illustrating another example of functions of the nodes.

For example, the node 100 may further Include a search unit 140a in addition to the functions Illustrated in FIG. 5. The search unit 140a is implemented by the accelerator card 105a.

The search unit 140a may handle the same subproblem as the one handled by the search unit 140 or may handle a subproblem different from the one handled by the search unit 140.

In a case where the search units 140 and 140a handle the same subproblem, the search units 140 and 140a may share the solution buffer 130. In a case where the search units 140 and 140a handle different subproblems, the search units 140 and 140a may share the solution buffer 130, or separate solution buffers may be assigned to the search units 140 and 140a. As an example of assigning separate solution buffers to the search units 140 and 140a, a first solution buffer and a second solution buffer may be provided in the RAM 102, with the first solution buffer assigned to the search unit 140 and the second solution buffer assigned to the search unit 140a.

In a case where the search units 140 and 140a share the solution buffer 130, the search control unit 160 updates the solution held in the solution buffer 130 based on the partial solution obtained as a result of the search by each of the search units 140 and 140a. The search control unit 160 transmits the solution held in the solution buffer 130 to other nodes.

In a case where separate solution buffers are assigned to the search units 140 and 140a, the search control unit 160 updates the solution held in the first solution buffer assigned to the search unit 140 based on the partial solution obtained as a result of the search by the search unit 140. The search control unit 160 updates the solution held in the second solution buffer assigned to the search unit 140a based on the partial solution obtained as a result of the search by the search unit 140a. When transmitting the solution in the first solution buffer to another node, the search control unit 160 updates the solution in the second solution buffer in accordance with comparison between the energy value corresponding to the solution and the energy values corresponding to the solutions held in the second solution buffer. Similarly, when transmitting the solution in the second solution buffer to another node, the search control unit 160 updates the solution in the first solution buffer in accordance with comparison between the energy value corresponding to the solution and the energy values corresponding to the solutions held in the first solution buffer.

For example, based on the solution held in the first solution buffer, the search control unit 160 fixes, for the search unit 140, the values of the state variables in a state variable group other than the state variable group handled by the search unit 140. Based on the solution held in the second solution buffer, the search control unit 160 fixes, for the search unit 140a, the values of the state variables in the state variable group other than the state variable group handled by the search unit 140a.

As described above, the node 100 may Include a plurality of search units. Uke the node 100, the nodes 200, 300, and 400 may include a plurality of accelerator cards and may include a plurality of search units implemented by the plurality of accelerator cards. As described above, at least one of the plurality of search units in one node may be implemented by software executed by the CPU of the node.

As described above, the plurality of search units in one node may use the same search method or different search methods. The nodes 100, 200, 300, and 400 may use different search methods from each other.

FIG. 311s a diagram illustrating an example of an information processing system using a plurality of search methods.

For example, the node 100 uses SQA. The node 200 uses tabu search. The node 300 uses SA. The node 400 uses GA. In this manner, the nodes 100, 200, 300, and 400 may use different search methods from each other. Alternatively, at least two nodes may use the same search method. For example, at least two of the nodes 100, 200, 300, and 400 may use SA and the other nodes may use SQA or tabu search. All of the nodes 100, 200, 300, and 400 may use the same search method.

As illustrated, the search methods may be different for the respective nodes, and a plurality of accelerators using a plurality of search methods may be mixed in one node. As described above, the accelerator is implemented by an FPGA, a GPU, an ASIC, or the like. As illustrated in the second embodiment, at least two types of integrated circuits among the FPGA, the GPU, the ASIC, and the like may be mixed in one node.

With the information processing system 2 described above, the solution finding performance may be improved. For example, the solution finding performance may be improved in the following manner.

In the information processing system 2, each of a plurality of nodes shares the best solution among a plurality of solutions it has obtained with other nodes. Based on the shared solution, a value of each state variable in a state variable group fixed in the next search by each node is determined. An even better solution is estimated to be likely to be in the proximity of a better solution. Thus, with a good solution found by each node shared with another node and with the value of each state variable in the state variable group to be fixed based on the shared solution determined, the search space may be narrowed to the proximity of a better solution, whereby the chance of any of the nodes finding the optimal solution may be increased. For example, the chance of any of the plurality of nodes finding the optimal solution, or a solution corresponding to an energy value smaller than a predetermined target value within a predetermined period of time increases. Thus, the solution finding performance of the information processing system 2 may be improved.

When the scale of the problem increases, all the subproblems may not be processable at once with the current number of nodes, due to limitation of a memory capacity usable for the search by each node (for example, the memory capacity of the local memory of the search unit) or the like.

For example, the calculation of the problem replaced with the Ising model uses a weight coefficient that represents the magnitude of interaction between state variables included in the energy function. When the number of state variables increases in accordance with an increase in the scale of the problem, the number of weight coefficients also increases. The total size of the weight coefficients may thus exceed the memory capacity usable for executing the search in a single search unit (for example, the capacity of the local memory of the search unit).

Therefore, for example, a problem to be solved may be divided into a plurality of subproblems by a predetermined control device, a plurality of subproblems may be assigned to a plurality of search units using the same search method, and the plurality of search units may be synchronized with each other to solve the respective subproblems.

However, when the scale of the problem increases, the number of search units prepared in advance may be insufficient for solving all the subproblems at once. An extensibility of a system that synchronously controls a plurality of search units is low, and thus it is difficult to add a new search unit to such a system.

For example, when the number of search units prepared in advance is insufficient for solving all the subproblems at once, one search unit may process several subproblems one by one, by switching the search target subproblem. In this case, for example, a plurality of weight coefficient groups corresponding to a plurality of subproblems to be processed are stored in an auxiliary storage device such as an HDD or an SSD of an information processing apparatus such as a node, and the weight coefficient group corresponding to the subproblem that is the current search target is stored in a local memory of the search unit. With this approach, the size of the weight coefficient stored in the local memory for performing the search is reduced, but the switching of the subproblems involves switching of the weight coefficients between the local memory and the auxiliary storage device. The switching of the weight coefficients takes time, and might be a cause of a delay.

With the information processing system 2, each of nodes solve the respective subproblems asynchronously with each other, and asynchronously share the good solutions they have obtained with the other nodes. Therefore, excellent extensibility of search units is achieved. Thus, when the number of search units is Insufficient for the scale of the problem, a search unit may be easily added.

Furthermore, a search method used by a certain node may be different from a search method used by another node. A plurality of search units in a single node may use different search methods. Since a search unit using any desired search method may be used, excellent extensibility of search units is achieved. Thus, when the number of search units is insufficient for the scale of the problem, a search unit may be easily added.

For example, when the number of search units prepared in advance is insufficient for solving all the subproblems at once, a search unit may be easily added so that switching between subproblems in one search unit may be reduced. Thus, the speed of the search by the information processing system 2 increases. As a result, the chance of finding the optimal solution, or a solution corresponding to a value of an energy function smaller than a predetermined target value within a predetermined period of time increases.

In this manner, with the information processing system 2, it is possible to improve the solution finding performance even for a problem having a relatively large scale.

The information processing system 2 described above executes, for example, the following processing. The following processing may also be executed by the information processing system 1.

The information processing system 2 searches for a solution to a problem represented by an energy function including a plurality of state variables. The information processing system 2 includes a plurality of nodes to which a plurality of respective subproblems generated by dividing a problem are assigned. The nodes 100, 200, 300, and 400 are examples of the plurality of nodes.

Each of the plurality of nodes searches for a partial solution represented by the state variable group corresponding to the subproblem assigned to the node among the plurality of state variables, and holds a plurality of solutions including a first solution to the problem, the first solution reflecting the partial solution. The solution held in the solution buffer 130 is an example of the plurality of solutions. The same applies to the solutions held in the solution buffers 230, 330, and 430.

A first node among the plurality of nodes transmits at least one solution of the plurality of solutions held by the first node to a second node among the plurality of nodes.

The second node updates at least part of the plurality of solutions held in the second node based on the solution received from the first node.

The first node and the second node thus cooperate to improve the solutions, whereby the solution finding performance is Improved. For example, a good solution found by the first node may be shared with the second node, and the second node may narrow the search space to the proximity of a better solution based on the shared solution. As a result, the chance of the second node finding the optimal solution, or a solution corresponding to a value of an energy function smaller than a target value within a predetermined period of time may increase.

The processing of updating at least part of the plurality of solutions held by the second node based on the solution received from the first node corresponds to the processing of causing the second node to update at least part of the plurality of solutions held by the second node by transmitting the solution from the first node to the second node.

The first node selects at least one solution to be transmitted to the second node based on the value of the energy function corresponding to each of the plurality of solutions held by the first node. For example, in the problem of minimizing the value of the energy function, the first node preferentially transmits a solution corresponding to a smaller value of the energy function to the second node.

Accordingly, a better solution found by the first node may be shared with the second node. As a result, for example, the accuracy of the second node narrowing the search space to the proximity of a good solution is improved.

The second node replaces at least part of the plurality of solutions held by the second node with the solution received from the first node, in accordance with comparison between the value of the energy function corresponding to the solution received from the first node and the values of the energy functions corresponding to the plurality of solutions held by the second node. For example, in the problem of minimizing the value of the energy function, a solution corresponding to a smaller value of the energy function is preferentially held.

The solutions held by the second node may thus be appropriately improved. As a result, for example, the accuracy of the second node narrowing the search space to the proximity of a good solution is improved.

The second node transmits at least one solution of the plurality of solutions held by the second node to the first node, and the first node updates at least part of the plurality of solutions held by the first node based on the solution received from the second node.

With the first node and the second node bidirectionally sharing the solutions, the chance of any of the first node and the second node finding the optimal solution, or a solution corresponding to a value of an energy function smaller than a target value may increase.

In the search for the partial solution, each of the plurality of nodes fixes state variables included in a state variable group other than the state variable group corresponding to the subproblem assigned to the node to a fixed value based on the plurality of solutions held by the node, and searches for the partial solution.

With the search space in each of the nodes narrowed to the proximity of a better solution based on the solutions shared by the nodes, the nodes cooperate to Improve the solutions, whereby the chance of any of the nodes finding the optimal solution, or a solution corresponding to a value of an energy function smaller than a target value within a predetermined period of time may increase.

Each of the plurality of nodes generates a first solution by replacing a part of the state variable group corresponding to the subproblem assigned to the node among the plurality of solutions held by the node with the partial solution found.

Accordingly, each node may acquire a solution better than the solutions held by the node based on the partial solution it has obtained. Since the solution candidates as a result of replacement with the partial solution are evaluated for all the solutions held by one node, the search result is likely to be quickly reflected on many good solutions.

Alternatively, each of the plurality of nodes may generate the first solution by combining, with the partial solution, a fixed value that is set for state variables included in a state variable group other than the state variable group corresponding to the subproblem assigned to the node among the plurality of state variables and that is used for the search for the partial solution.

Accordingly, each node may acquire a solution better than the solutions held by the node based on the partial solution it has obtained.

Each of the plurality of nodes also holds a part related to the state variables included in the state variable group corresponding to the subproblem assigned to the node, of the entire weight coefficients indicating the weight between two state variables among the plurality of state variables. For example, each of the plurality of nodes may not hold a part other than the part corresponding to the state variable group handled by the node, of the entire weight coefficients.

The size of the weight coefficients held by each node may thus be reduced, and memory saving in each node may be achieved.

The first node and the second node may asynchronously execute the search for the subproblem in the nodes and the transmission of a solution from one of the nodes to another one of the node.

Accordingly, even when the number of nodes becomes insufficient due to an increase in the scale of the problem, a new node may be easily added. Since nodes may be easily added, the possibility that the search unit of each node involves no switching of subproblems may increase, whereby a delay caused by the switching of the subproblems may be suppressed. For example, it is possible to easily improve the solution finding performance in response to an increase in the scale of the problem.

Each of the first node and the second node may search for the partial solution represented by the state variable group corresponding to the subproblem assigned to the node, with the first node and the second node using different search algorithms.

Accordingly, even when the number of nodes becomes insufficient due to an increase in the scale of the problem, a new node may be easily added. Since nodes may be easily added, the possibility that the search unit of each node involves no switching of subproblems may increase, whereby a delay caused by the switching of the subproblems may be suppressed. For example, it is possible to easily improve the solution finding performance in response to an increase in the scale of the problem.

The first node may be assigned with a first subproblem and a second subproblem among the plurality of subproblems, and may include a first search unit and a second search unit that execute the same search algorithm or different search algorithms. For example, the search units 140 and 140a are examples of the first search unit and the second search unit, respectively. The first search unit searches for a first partial solution represented by a first state variable group corresponding to the first subproblem. The second search unit searches for a second partial solution represented by a second state variable group corresponding to the second subproblem.

By providing two or more search units in one node and assigning two or more subproblems to one node as described above, it is also possible to efficiently search for solutions.

The information processing system 2 may further include the control unit 51. The control unit 51 assigns a plurality of subproblems to the plurality of nodes, and when the search for the partial solutions by the plurality of respective nodes and the transmission and reception of solutions between the nodes are repeatedly performed for a certain period of time, acquires at least one solution of the plurality of solutions held by each of the plurality of nodes and outputs the acquired solution.

Thus, a final solution obtained by using the plurality of nodes may be appropriately acquired. As described above, the control unit 51 acquires at least one solution held by the plurality of nodes in their solution buffers, and outputs the acquired solution. For example, the control unit 51 may preferentially output a solution corresponding to a smaller energy value. The control unit 51 may convert the acquired solution into the form of a solution to the combinatorial optimization problem, display the content of the solution as a result of the conversion on a display coupled to the control device 50 or transmit the content to a computer such as a client computer connected to the network 60.

Although the example in which the functions of the control unit 51 are provided in the control device 50 has been described, any one of the nodes 100, 200, 300, and 400 may have the functions of the control unit 51. For example, the CPU of any of the nodes 100, 200, 300, and 400 may implement the functions of the control unit 51 by executing a program stored in the RAM of the corresponding node.

Each of the plurality of nodes holds a predetermined number of solutions, among the plurality of solutions, according to the value of the energy function corresponding to each of the plurality of solutions. For example, each of the plurality of nodes holds only solutions corresponding to relatively good energy values among solutions it has obtained, so that the memory capacity for the solution buffer of each node may be reduced, whereby memory saving may be achieved.

The information processing according to the first embodiment may be achieved by causing the processing unit 12 to execute a program. The information processing according to the second embodiment may be achieved by causing the CPUs of the nodes 100, 200, 300, and 400 to execute a program. The programs may be recorded in the computer-readable recording medium 61.

For example, the programs may be circulated by distributing the recording medium 61 in which the programs are recorded. The programs may be stored in another computer, and the programs may be distributed through a network. For example, the computer may store (install), in a storage device such as the RAM 102 or the HDD 103, the programs recorded in the recording medium 61 or programs received from another computer, and may read the programs from the storage device to execute the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system for searching for a solution to a problem represented by an energy function including a plurality of state variables, the information processing system comprising:
a first node including:
a first accelerator card configured to search for a first partial solution represented by a first state variable group, among the plurality of state variables, corresponding to a first subproblem assigned to the first node, the first subproblem being generated by dividing the problem,
a first buffer memory configured to hold a plurality of first solutions including a first solution corresponding to the problem, the first solution reflecting the first partial solution,
a first processor configured to select one or more first solution to be transmitted to a second node based on a value of the energy function corresponding to each of the plurality of first solutions held in the first buffer memory, the selected one or more first solutions having lower energy function value than other solutions among the plurality of first solutions, and
a first interface circuit configured to transmit the one or more first solution among the plurality of first solutions; and
a second node including:
a second interface circuit configured to receive the one or more first solution from the first node,
a second buffer memory configured to hold a plurality of second solutions,
a second processor configured to replace at least one of the plurality of second solutions having a higher energy function value with the received one or more first solutions to update at least part of a plurality of second solutions held in the second buffer memory, and
a second hardware accelerator configured to subsequently search for a second partial solution based on one of the updated second solutions held in the second buffer memory.

2. The information processing system according to claim 1, wherein the second processor replaces at least part of the plurality of second solutions held by the second node with at least one of the one or more first solution received from the first node, in accordance with comparison between a value of the energy function corresponding to each of the one or more first solution and values of the energy functions corresponding to each of the plurality of second solutions.

3. The information processing system according to claim 1, wherein the second node further includes:
a second accelerator card configured to search for a second partial solution represented by a second state variable group, among the plurality of state variables, corresponding to a second subproblem assigned to the second node, the second subproblem being generated by dividing the problem, and
a second buffer memory configured to hold the plurality of second solutions including a second solution corresponding to the problem, the second solution reflecting the second partial solution.

4. The information processing system according to claim 3, wherein
the second interface circuit transmits one or more second solution among the plurality of second solutions to the first node, and
the first processor updates at least part of the plurality of first solutions held in the first node based on the one or more second solution received from the second node.

5. The information processing system according to claim 1, wherein the first processor fixes, in the search for the first partial solution, state variables included in a state variable group other than the first state variable group corresponding to the first subproblem assigned to the first node to a fixed value based on the plurality of first solutions held by the first node, and searches for the first partial solution.

6. The information processing system according to claim 1, wherein the first processor generates the first solution by replacing a part of the first state variable group corresponding to the subproblem assigned to the first node among the plurality of first solutions with the first partial solution.

7. The information processing system according to claim 1, wherein the processor node generates the first solution by combining, with the first partial solution, a fixed value that is set for state variables included in a state variable group other than the first state variable group corresponding to the first subproblem, the fixed being used for the search for the partial solution.

8. The information processing system according to claim 1, wherein the first buffer memory holds a first weight coefficient related to a first state variable included in the first state variable group, of entire weight coefficients indicating a weight between two state variables among the plurality of state variables.

9. The information processing system according to claim 1, wherein the first processor asynchronously executes the search for the first subproblem in the first nodes and transmission of the one or more first solution.

10. The information processing system according to claim 3, wherein
the first accelerator card searches for the first partial solution using first search algorithms, and
the second accelerator card searches for the second partial solution using second search algorithms different from the first search algorithms.

11. The information processing system according to claim 1, wherein the first node is assigned with the first subproblem and a second subproblem among the plurality of subproblems, and
the first accelerator is further configured to:
search for the first partial solution represented by the first state variable group corresponding to the first subproblem using a first search algorithm, and
search for a second partial solution represented by a second state variable group corresponding to the second subproblem using a second search algorithm, the second search algorithm is same or different from the first search algorithm.

12. The information processing system according to claim 1, wherein the first processor is further configured to:
assign a plurality of subproblems including the first subproblem to a plurality of nodes including the first node and the second node, acquire at least one first solution of the plurality of first solutions held by the first node or at least one second solution of the plurality of second solutions held by the second node, and output the acquired solution.

13. The information processing system according to claim 1, wherein the first buffer memory holds a predetermined number of solutions, among the plurality of first solutions, according to a value of the energy function corresponding to each of the plurality of first solutions.

14. An information processing apparatus searching for a solution to a problem represented by an energy function including a plurality of state variables, the information processing apparatus comprising:

an accelerator card configured to search for a first partial solution represented by a first state variable group, among the plurality of state variables, corresponding to a first subproblem assigned to the first node, the first subproblem being generated by dividing the problem;

a memory configured to hold a plurality of first solutions including a first solution corresponding to the problem, the first solution reflecting the first partial solution;

a processor configured to select one or more first solutions to be transmitted to a second node based on a value of the energy function corresponding to each of the plurality of first solutions held in the memory, the selected one or more first solutions having lower energy function values than other solutions among the plurality of first solutions; and an interface circuit configured to transmit the selected one or more first solutions to a second node, the transmission causing the second node to replace one of a plurality of second solutions having a higher energy function value with at least one of the transmitted one or more first solutions to subsequently search for a second partial solution at the second node.

15. The information processing apparatus according to claim 14, wherein the first interface circuit is further configured to receive one or more second solution among a plurality of second solutions held by the node from the node, and the processor is further configured to update at least part of the plurality of first solutions held in the storage unit based on the one or more second solution.

16. A non-transitory computer-readable storage medium storing a program that causes a processor included in an apparatus to execute a process, the process comprising:

searching, by an accelerator card, for a first partial solution represented by a first state variable group, among a plurality of state variables, corresponding to a first subproblem assigned to a first node, the first subproblem being generated by dividing a problem, the problem represented by an energy function including the plurality of state variables;

holding a plurality of first solutions including a first solution corresponding to the problem in a buffer memory, the first solution reflecting the first partial solution;

selecting, by the processor, one or more first solutions to be transmitted to a second node based on a value of the energy function corresponding to each of the plurality of first solutions held in the buffer memory, the selected one or more first solutions having lower energy function values than other solutions among the plurality of first solutions, and transmitting to a second node the selected one or more first by an interface circuit to cause the second node to replace at least one of a plurality of second solutions having a higher energy function value with at least one of the received one or more first solutions to subsequently search for a second partial solution based on the replaced solution.

17. The non-transitory computer-readable storage medium according to claim 16, further comprising updating, by the processor, at least part of the plurality of first solutions held in the first node based on one or more second solution among a plurality of second solutions held by a second node, the one or more second solution being received from the second node.

* * * * *